(12) United States Patent
Peng et al.

(10) Patent No.: US 12,203,500 B2
(45) Date of Patent: Jan. 21, 2025

(54) CAPTIVE FASTENER AND METHOD OF ASSEMBLING THE SAME

(71) Applicant: Southco, Inc., Concordville, PA (US)

(72) Inventors: Jingyao Peng, Shenzhen (CN); Thomas V. Aukzemas, Lincoln University, PA (US); Xuexian Qin, Shenzhen (CN); Richard E. Schlack, Newark, DE (US); Bing Hua Chiang, Taiwan (CN); Chuanjun Li, Xiantao (CN); Xiaoying Liao, Dongguan (CN)

(73) Assignee: Southco, Inc., Concordville, PA (US)

( * ) Notice: Subject to any disclaimer, the term of this patent is extended or adjusted under 35 U.S.C. 154(b) by 177 days.

(21) Appl. No.: 17/917,809

(22) PCT Filed: Apr. 9, 2021

(86) PCT No.: PCT/US2021/026656
§ 371 (c)(1),
(2) Date: Oct. 7, 2022

(87) PCT Pub. No.: WO2021/207652
PCT Pub. Date: Oct. 14, 2021

(65) Prior Publication Data
US 2023/0138689 A1 May 4, 2023

Related U.S. Application Data

(60) Provisional application No. 63/007,618, filed on Apr. 9, 2020.

(51) Int. Cl.
*F16B 41/00* (2006.01)
*F16B 5/02* (2006.01)

(52) U.S. Cl.
CPC .......... *F16B 41/002* (2013.01); *F16B 5/0208* (2013.01); *F16B 41/00* (2013.01)

(58) Field of Classification Search
CPC ........ F16B 5/0092; F16B 5/02; F16B 5/0208; F16B 5/10; F16B 19/109; F16B 21/02; F16B 41/00; F16B 41/002
(Continued)

(56) References Cited

U.S. PATENT DOCUMENTS 3,245,450 A  4/1966 Sauter
3,346,032 A  10/1967 Gulistan
(Continued)

FOREIGN PATENT DOCUMENTS

CN  101865198 A  10/2010
CN  106438607 A  2/2017
(Continued)

OTHER PUBLICATIONS

International Search Report and Written Opinion for International Application No. PCT/US2021/026656, dated Jun. 24, 2021, 26 pages.

*Primary Examiner* — Roberta S Delisle
(74) *Attorney, Agent, or Firm* — Buchanan Ingersoll & Rooney PC

(57) ABSTRACT

A captive fastener attachable to a panel along a fastener axis is provided. The captive fastener includes a fastener having a head portion and a shaft extending from the head portion and along the fastener axis. The captive fastener also includes a knob having a proximal end portion engaged to the head portion of the fastener and an annular portion extending radially around the fastener axis and the shaft of the fastener. A ferrule is associated with the knob, the ferrule defining an opening extending along the fastener axis and receiving the shaft of the fastener. The ferrule has a proximal end portion configured to prevent separation of the knob from the ferrule along the fastener axis and a distal end portion configured for engagement to the panel. A spring is positioned to bias the knob or the fastener proximally (Continued)

relative to the ferrule and to inhibit tilting of the knob or the fastener relative to the fastener axis. The proximal end portion of the ferrule having been positioned to be associated with the knob in an insertion direction along the fastener axis, and the head portion of the fastener having been inserted within the knob for engagement to the knob in the insertion direction. The engagement between the proximal portion of the knob and the head portion of the fastener is configured to resist axial movement of the knob relative to the fastener along the fastener axis, rotational movement of the knob relative to the fastener about the fastener axis, and pivotal movement of the knob relative to the fastener axis.

71 Claims, 57 Drawing Sheets

(58) Field of Classification Search
USPC .......................... 411/347, 352, 360, 550, 552
See application file for complete search history.

(56) References Cited

U.S. PATENT DOCUMENTS

| | | | |
|---|---|---|---|
| 4,616,967 A * | 10/1986 | Molina | ................ F16B 5/0208 411/105 |
| 5,382,124 A | 1/1995 | Frattarola | |
| 5,851,095 A | 12/1998 | Ellis et al. | |
| 6,033,168 A | 3/2000 | Creely et al. | |
| 6,079,923 A | 6/2000 | Ross et al. | |
| 6,280,131 B1 | 8/2001 | Ellis et al. | |
| 6,814,530 B2 | 11/2004 | Franco et al. | |
| 7,179,037 B2 * | 2/2007 | Aukzemas | ............ F16B 41/002 411/352 |
| 7,213,321 B2 | 5/2007 | Franco et al. | |
| 8,066,461 B2 * | 11/2011 | Travers | ................ F16B 5/0208 411/413 |
| 8,161,616 B2 | 4/2012 | Bentrim et al. | |
| 8,240,944 B2 * | 8/2012 | Chang | ....................... G09F 3/06 403/348 |
| 2004/0240962 A1 | 12/2004 | Teng et al. | |
| 2011/0302759 A1 * | 12/2011 | Chiu | ..................... F16B 5/0208 29/428 |
| 2012/0099943 A1 * | 4/2012 | Chiu | ..................... F16B 5/0208 411/347 |
| 2012/0237315 A1 * | 9/2012 | Chiu | ..................... F16B 5/0208 411/166 |
| 2012/0263555 A1 | 10/2012 | Wang | |
| 2017/0146050 A1 | 5/2017 | Wang | |
| 2023/0340978 A1 * | 10/2023 | Wu | ....................... F16B 5/0208 |

FOREIGN PATENT DOCUMENTS

| | | |
|---|---|---|
| CN | 210087753 U | 2/2020 |
| KR | 20110116363 A | 10/2011 |

* cited by examiner

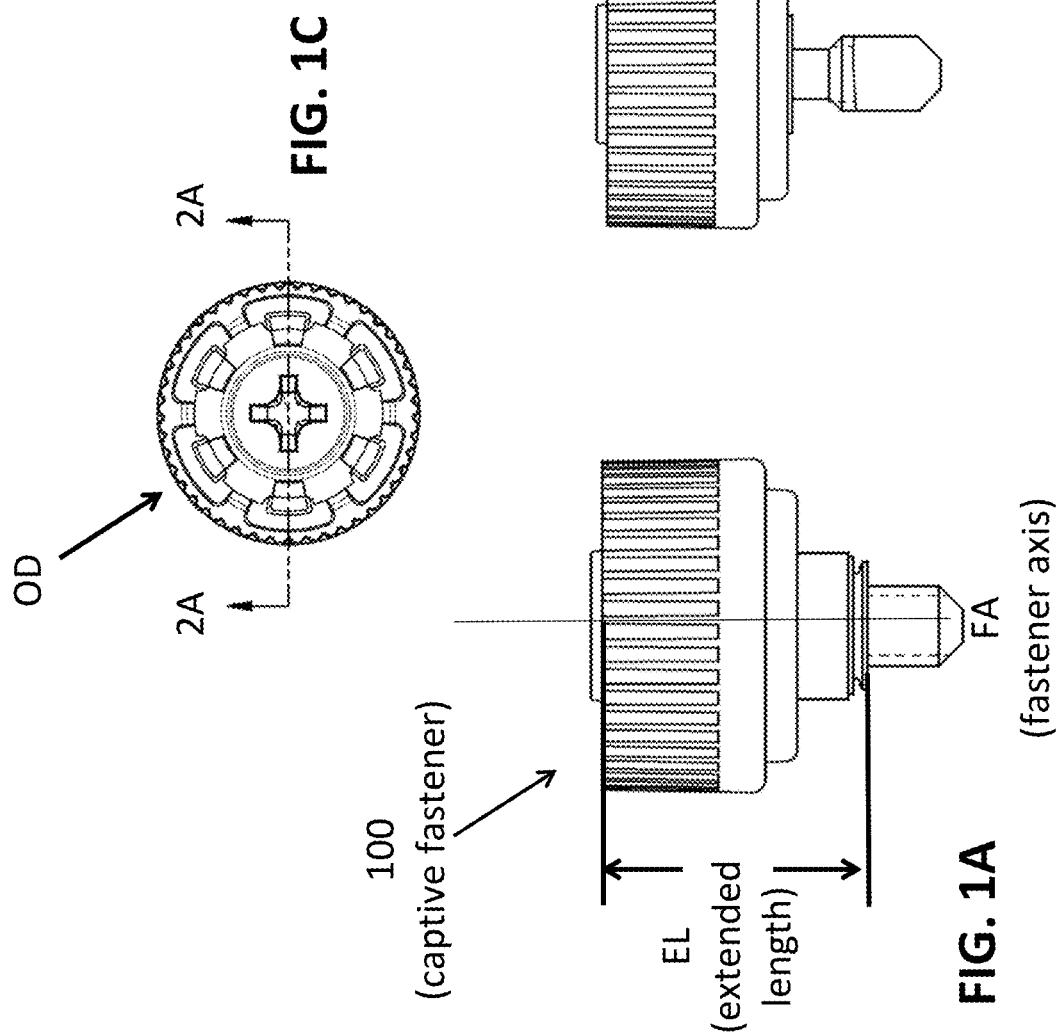

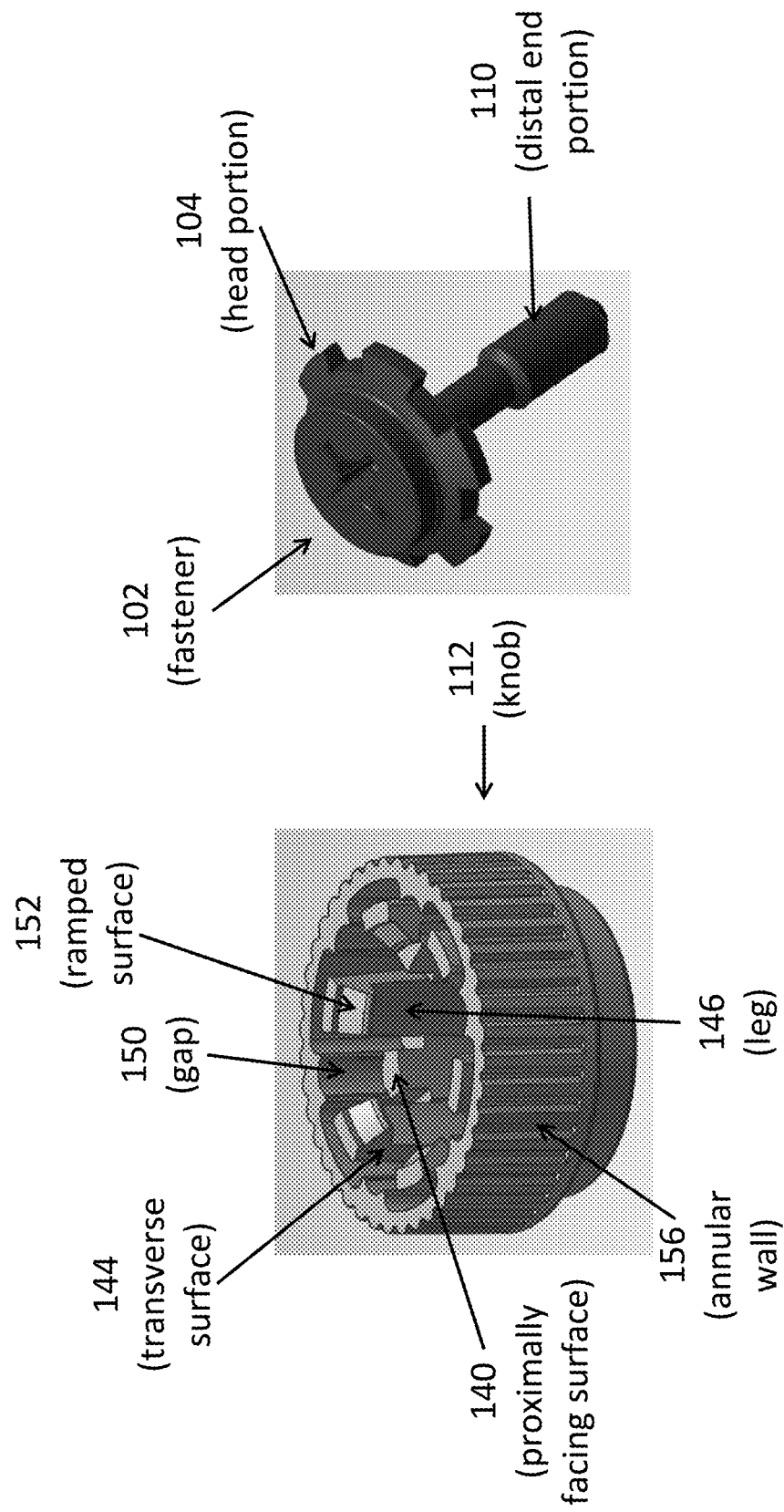

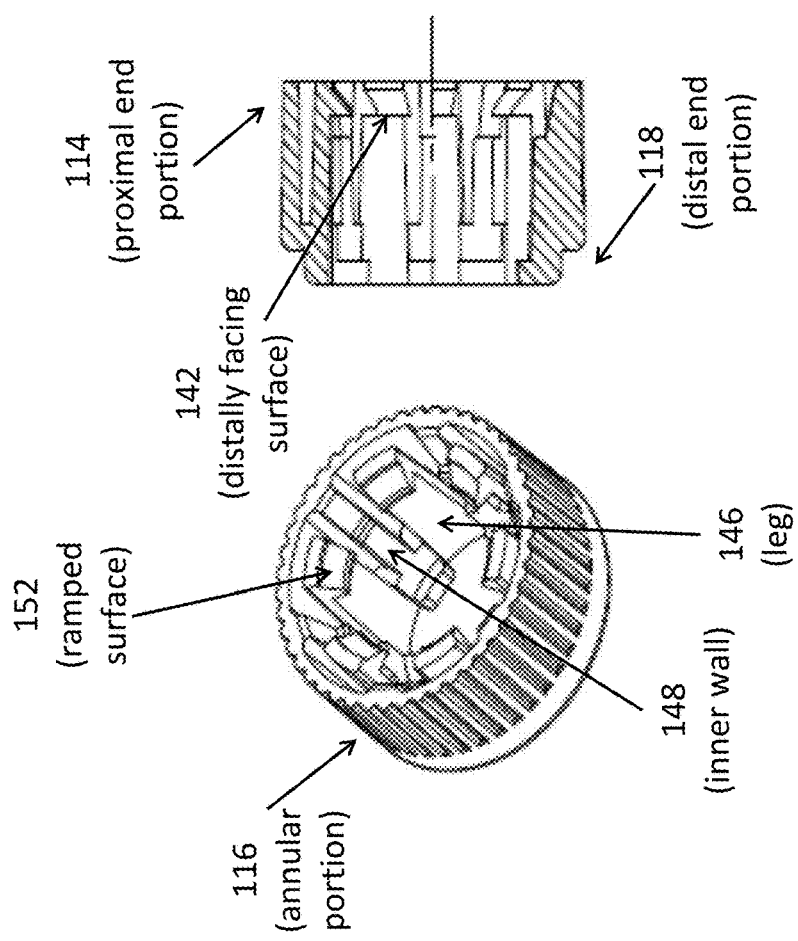
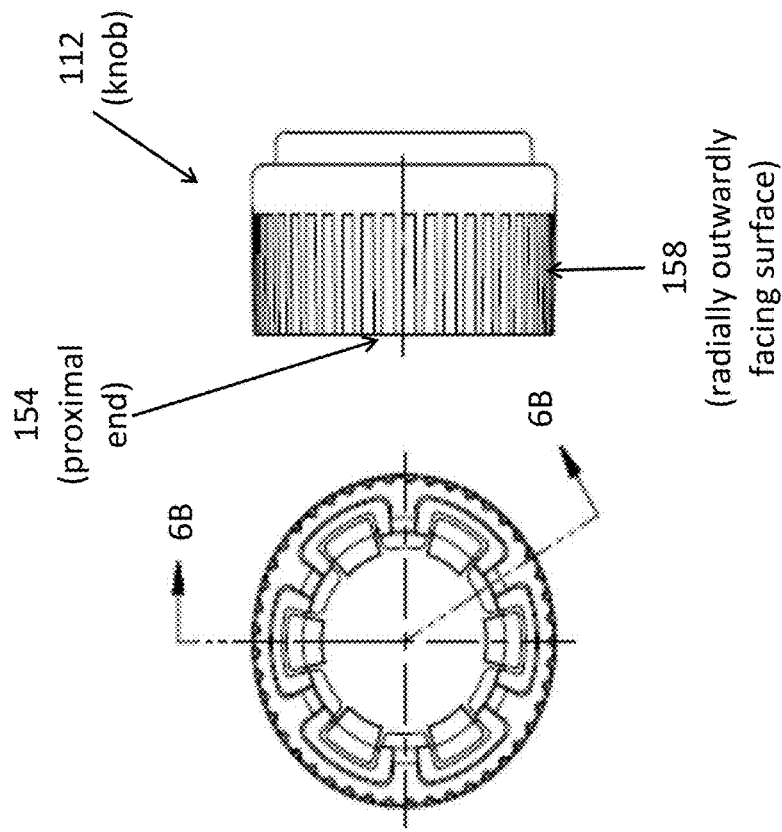

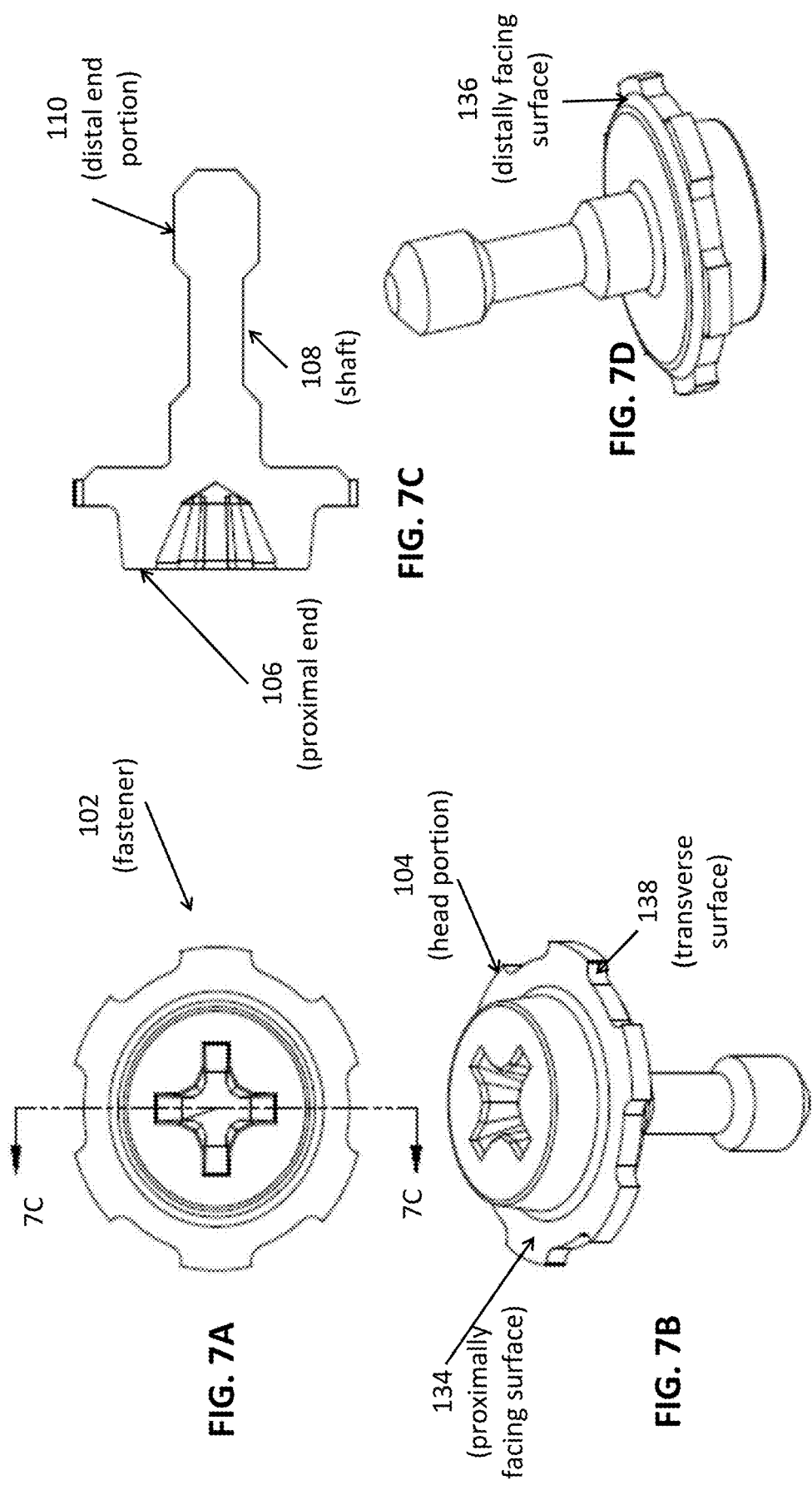

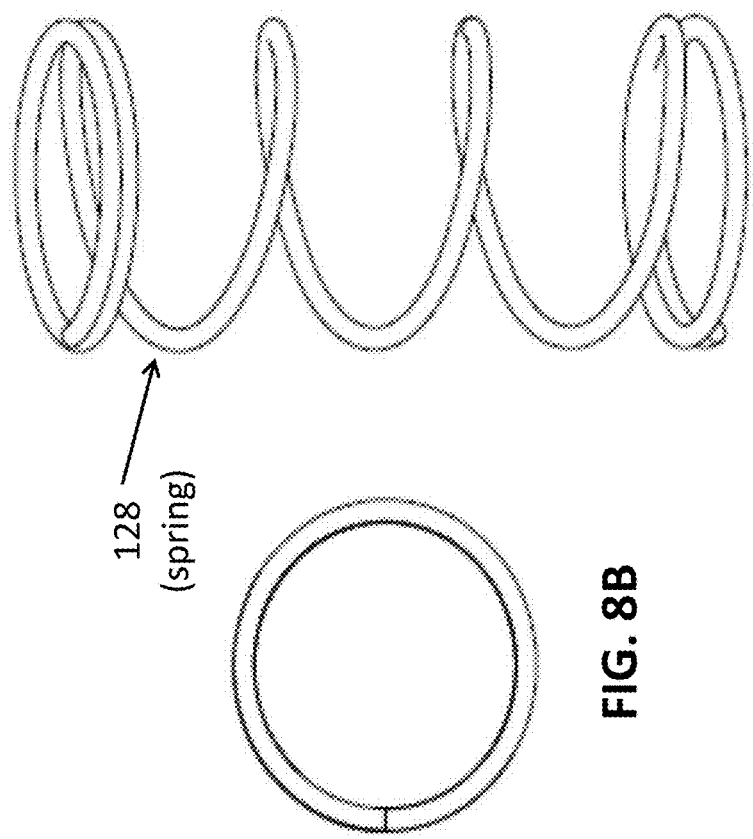
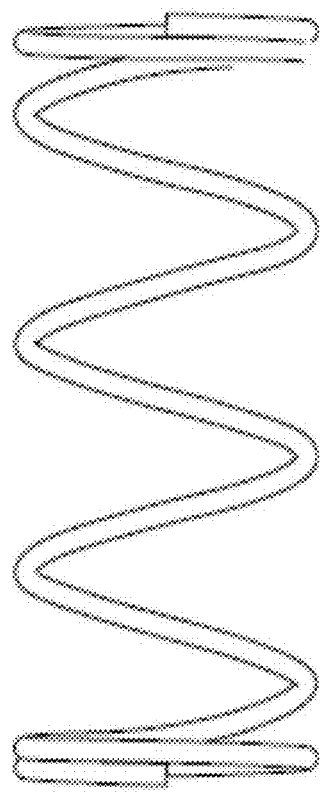
FIG. 8C
128 (spring)
FIG. 8B
FIG. 8A

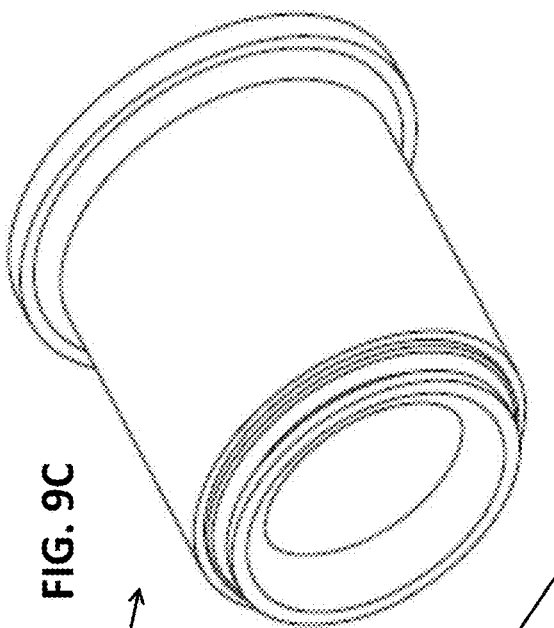
FIG. 9C
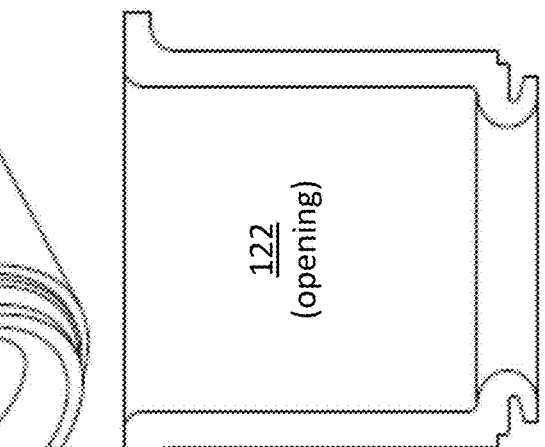
FIG. 9D
120 (ferrule)
126 (distal end portion)
132 (radial extension)
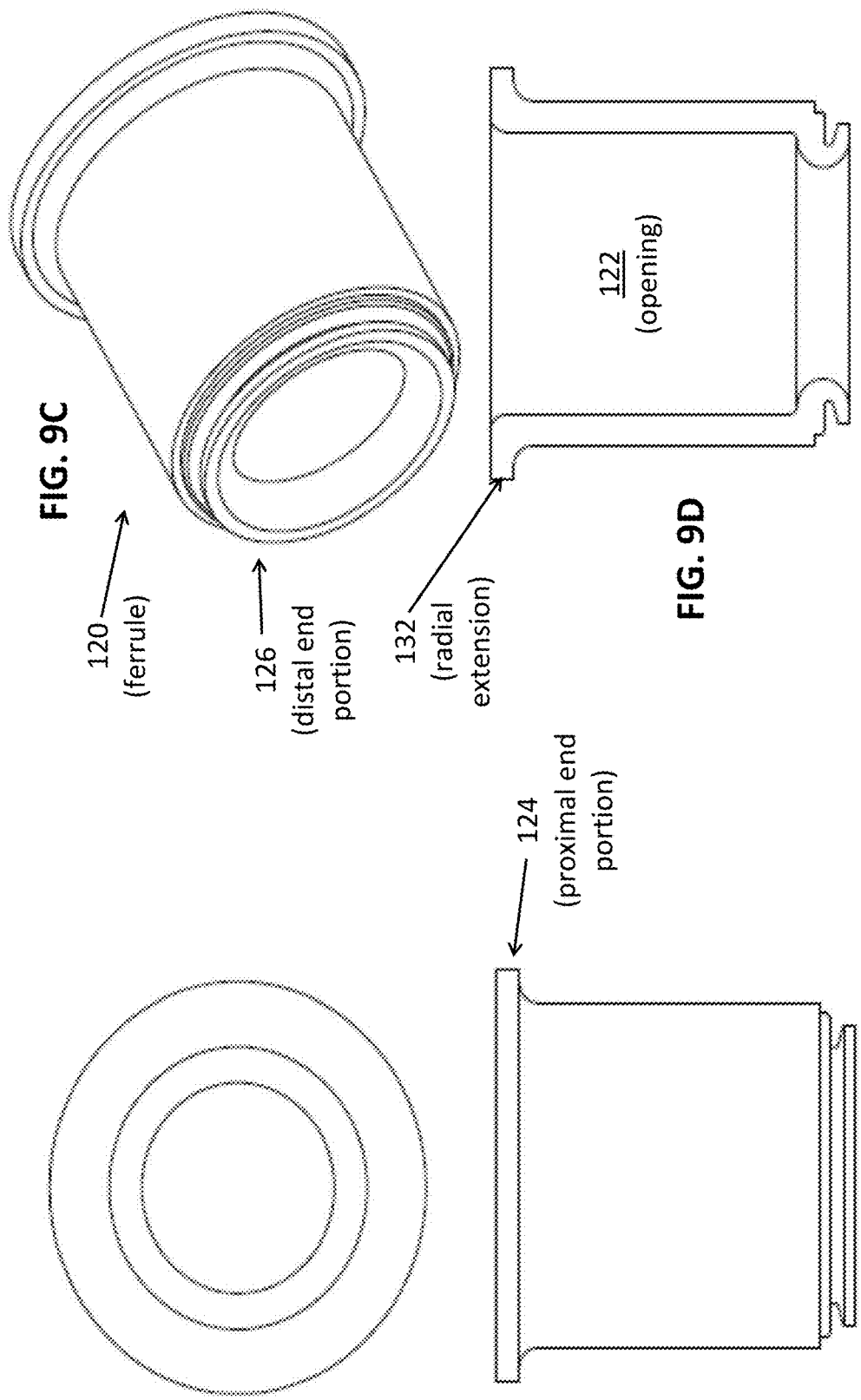
124 (proximal end portion)
122 (opening)
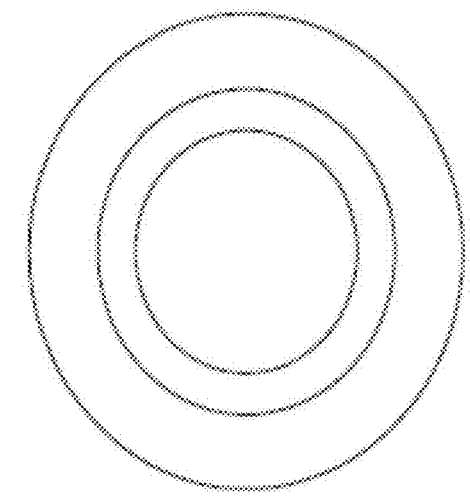
FIG. 9A
FIG. 9B

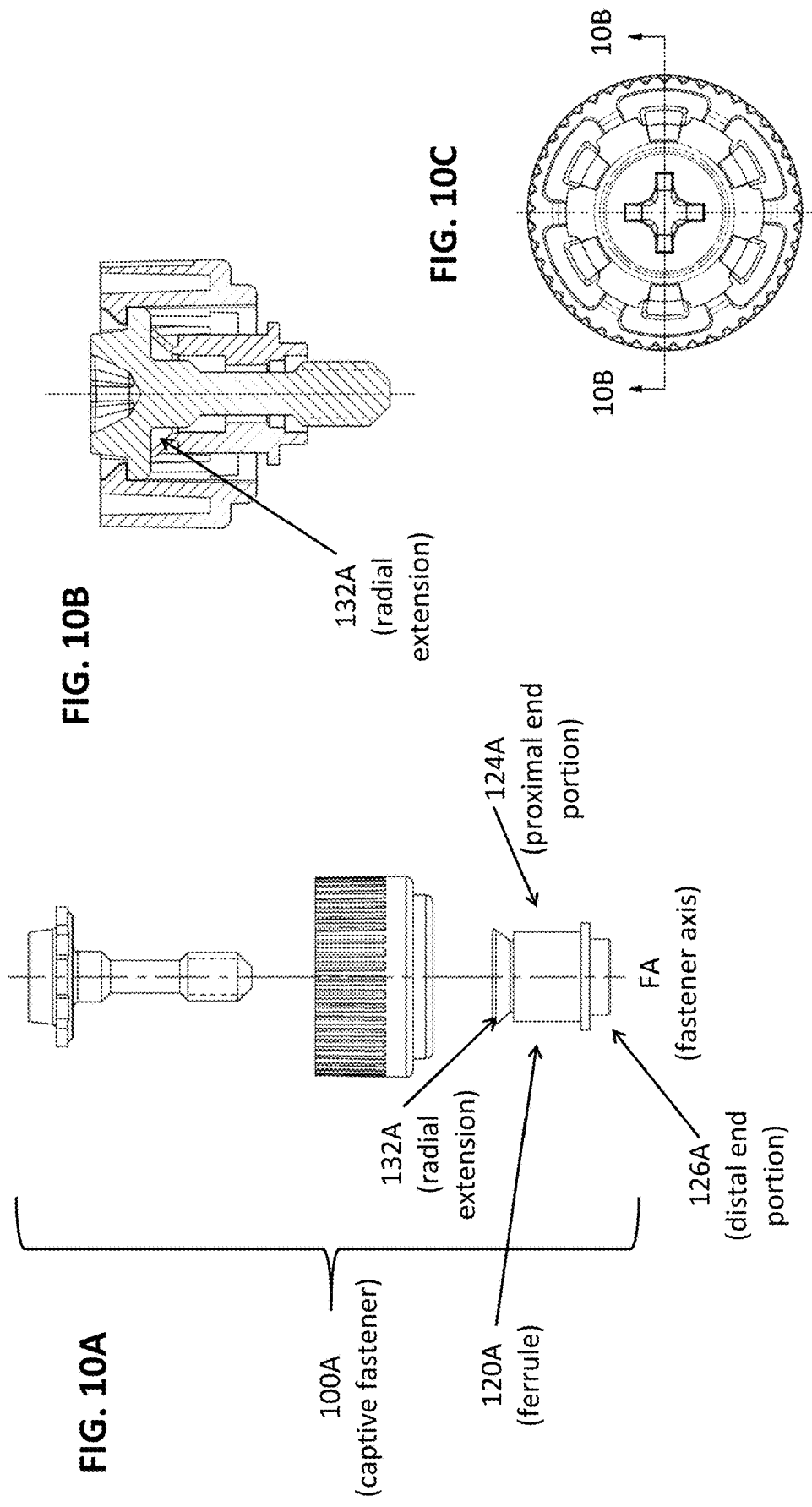

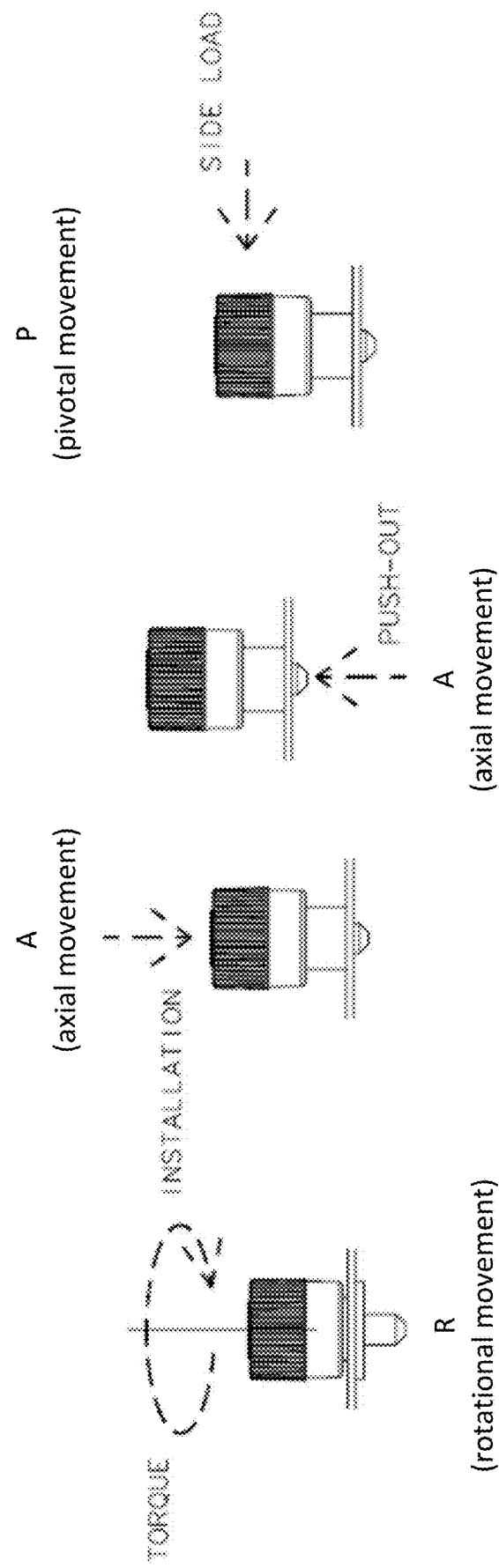

100B (captive fastener)

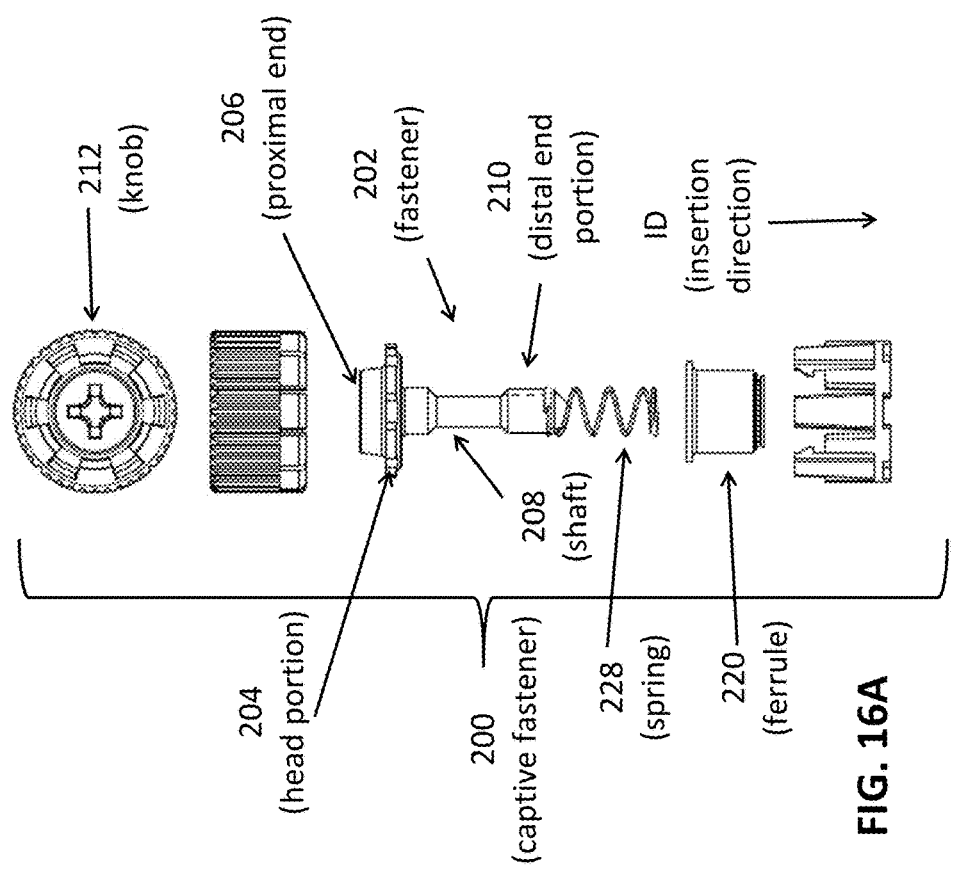
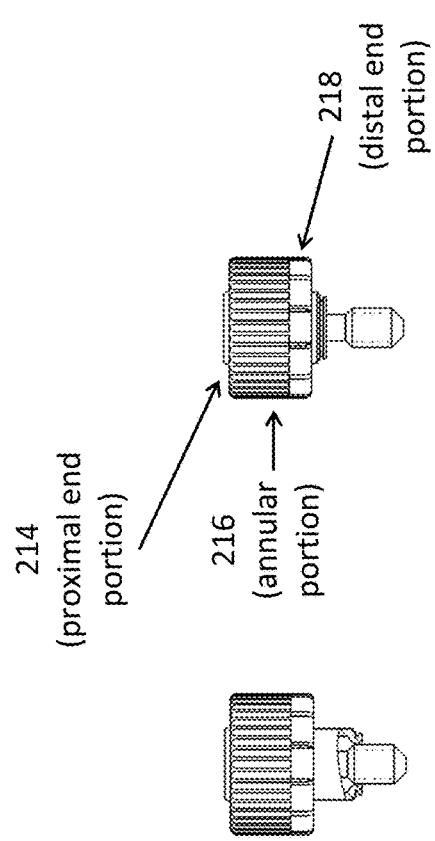
FIG. 16A
FIG. 16B
FIG. 16C

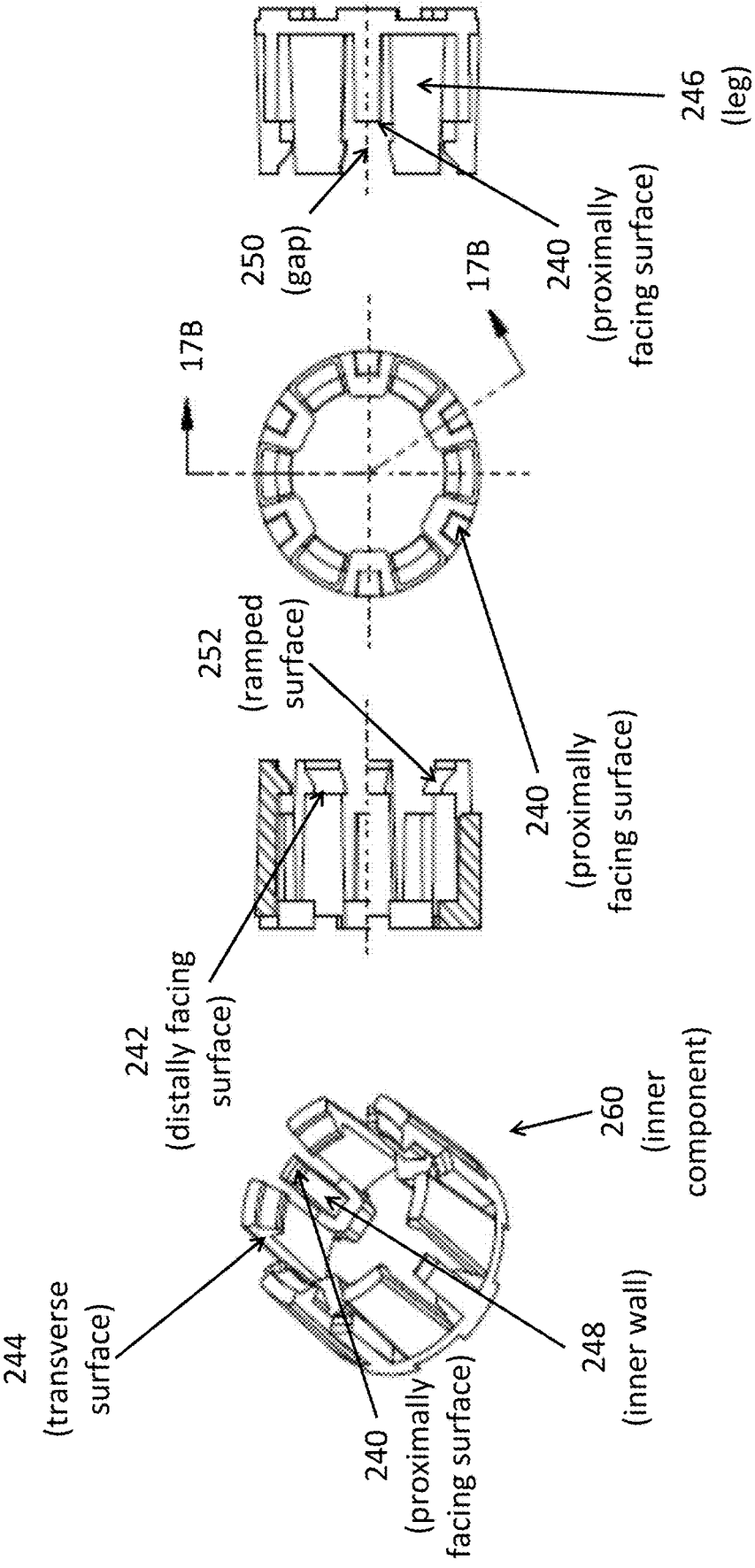

300 (captive fastener)

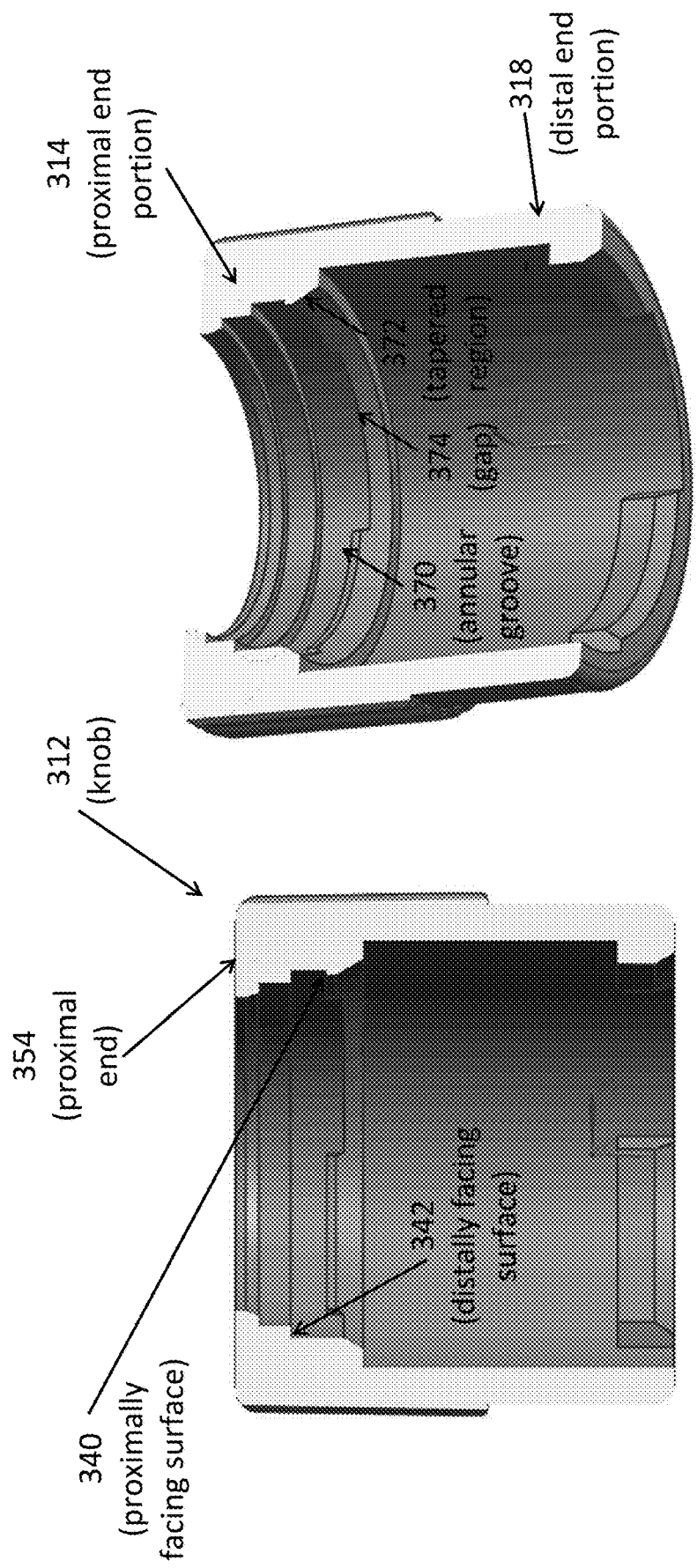

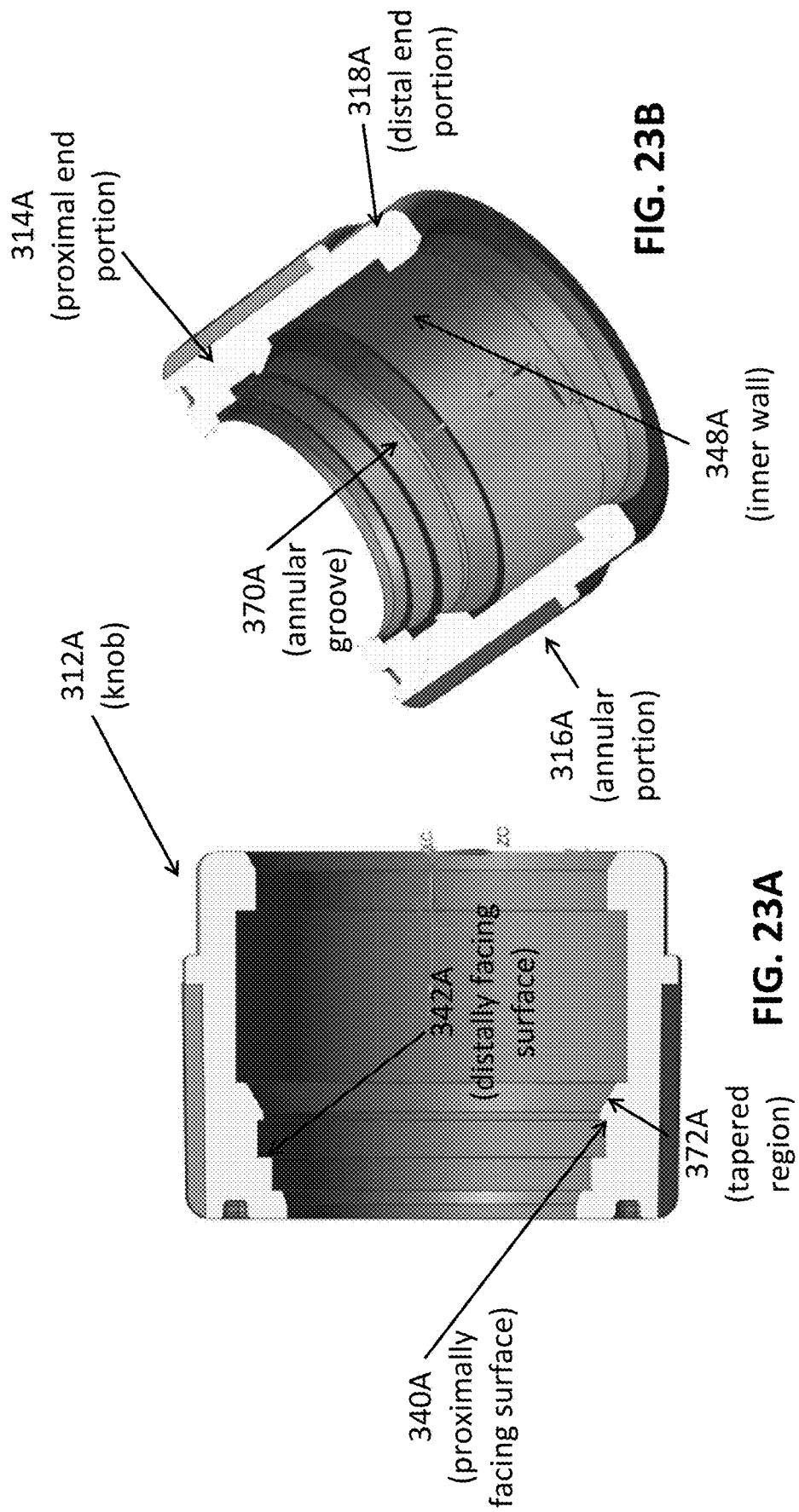

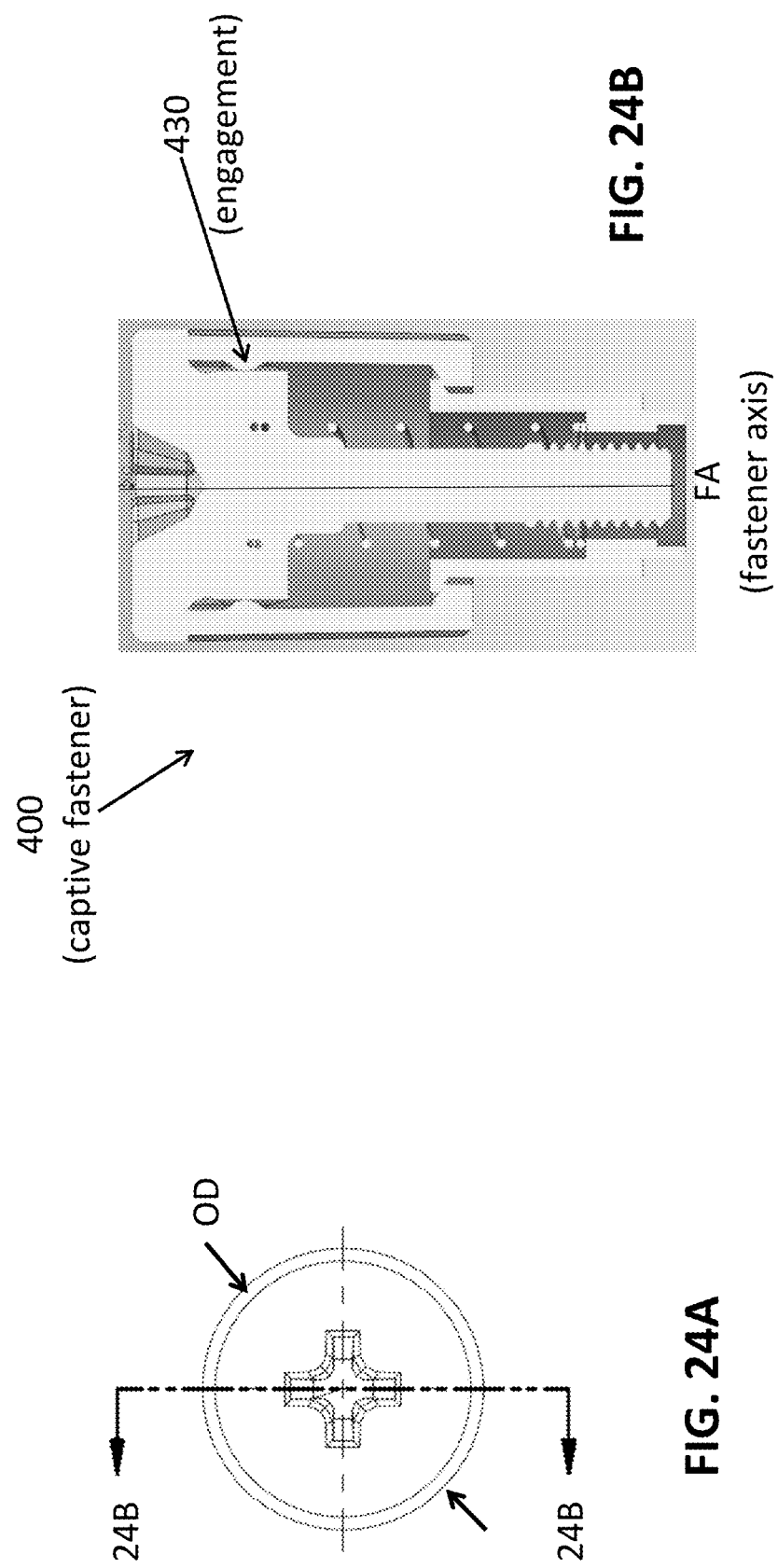

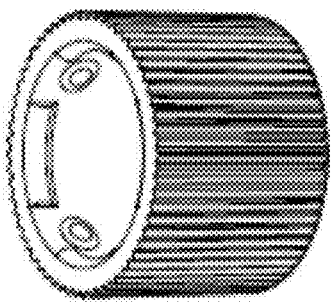
FIG. 28D
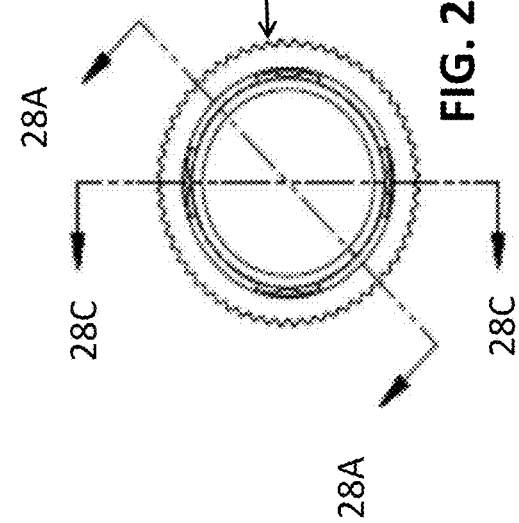
FIG. 28C
416 (annular portion)
418 (distal end portion)
414 (proximal end portion)
442 (distally facing surface)
440 (proximally facing surface)
412 (knob)
FIG. 28B
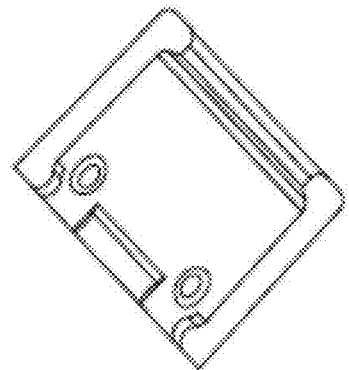
FIG. 28A

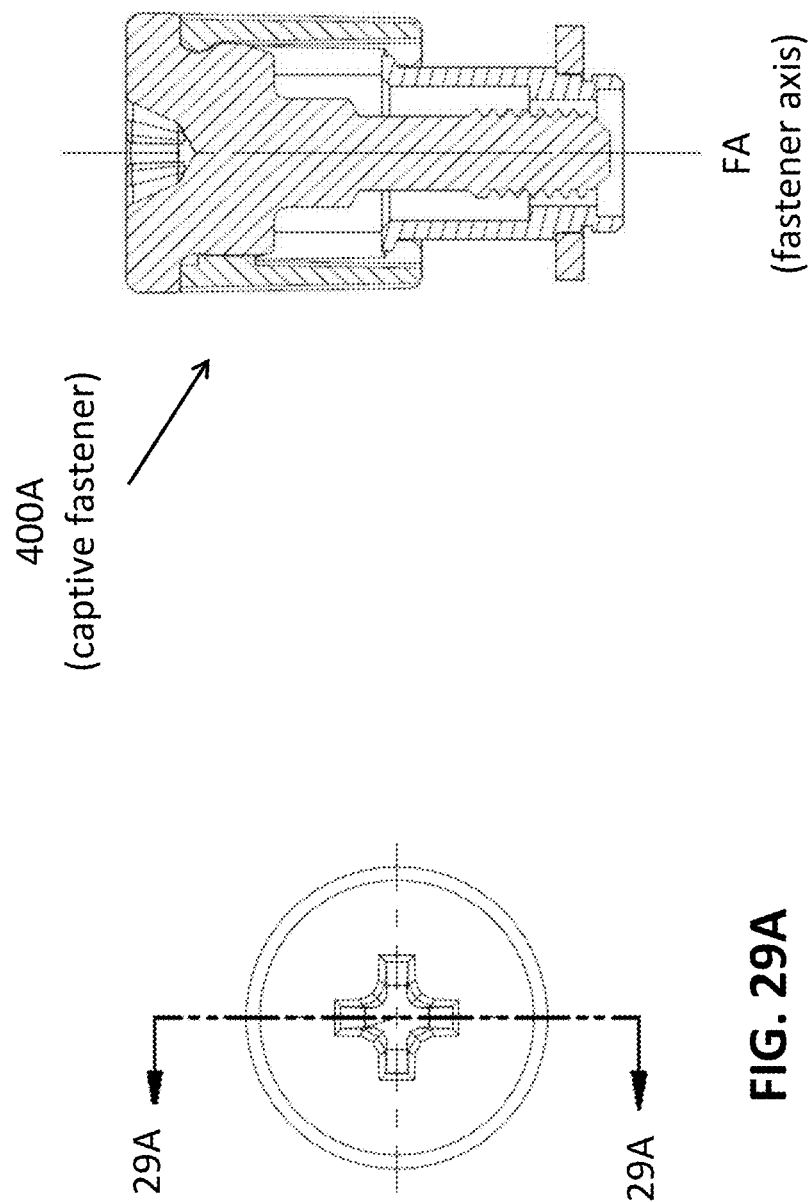

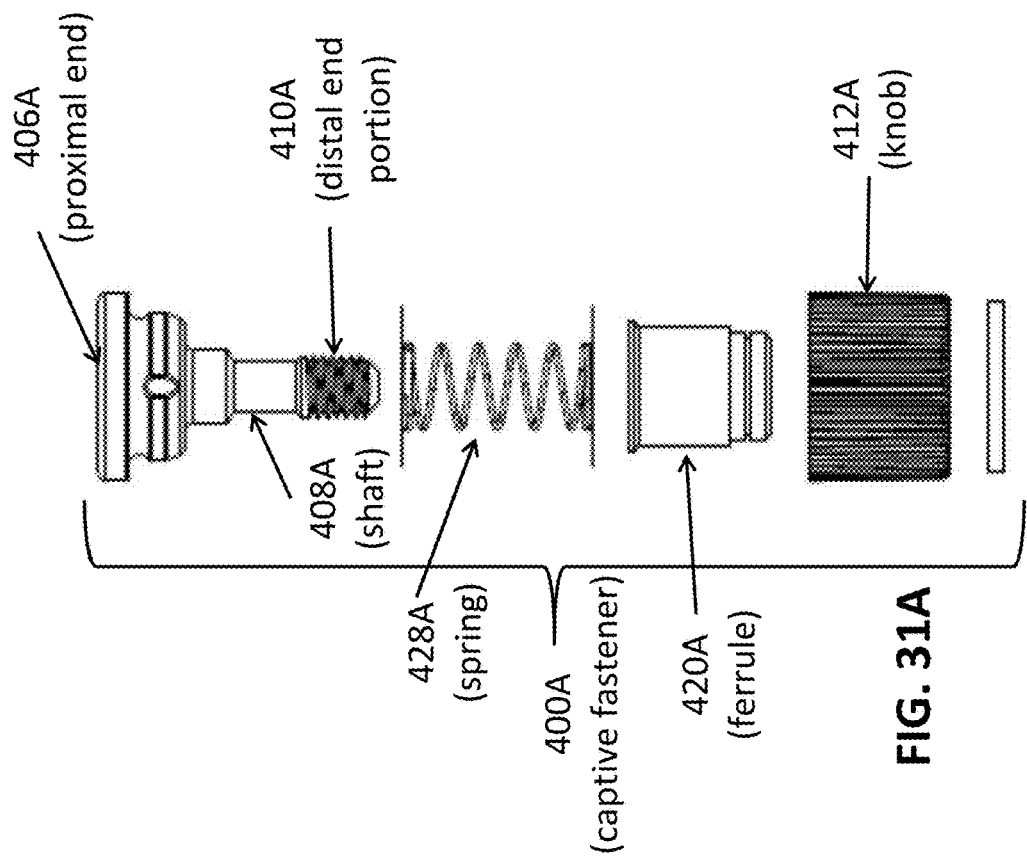

432A (radial extension)
420A (ferrule)
426A (distal end portion)

424A (proximal end portion)
422A (opening)

421A (washer)

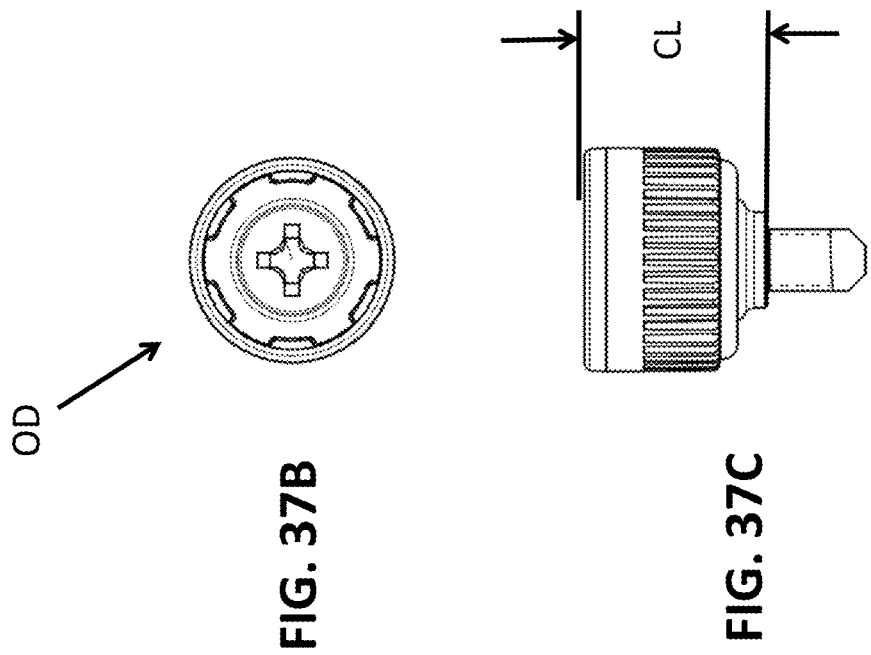
FIG. 37B
FIG. 37C
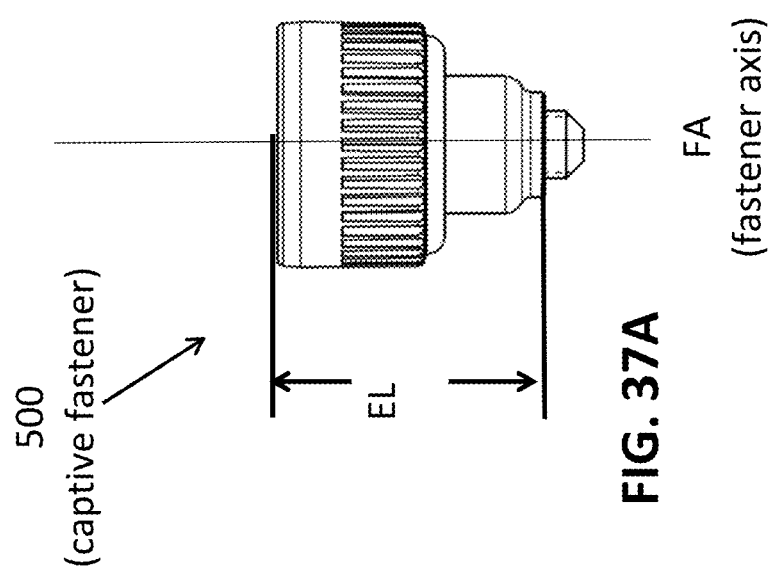
FIG. 37A

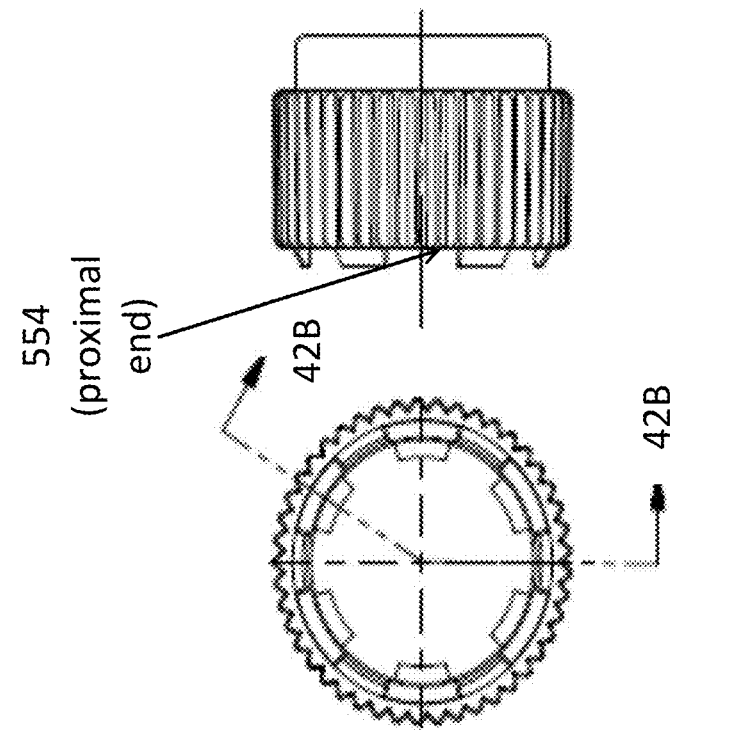
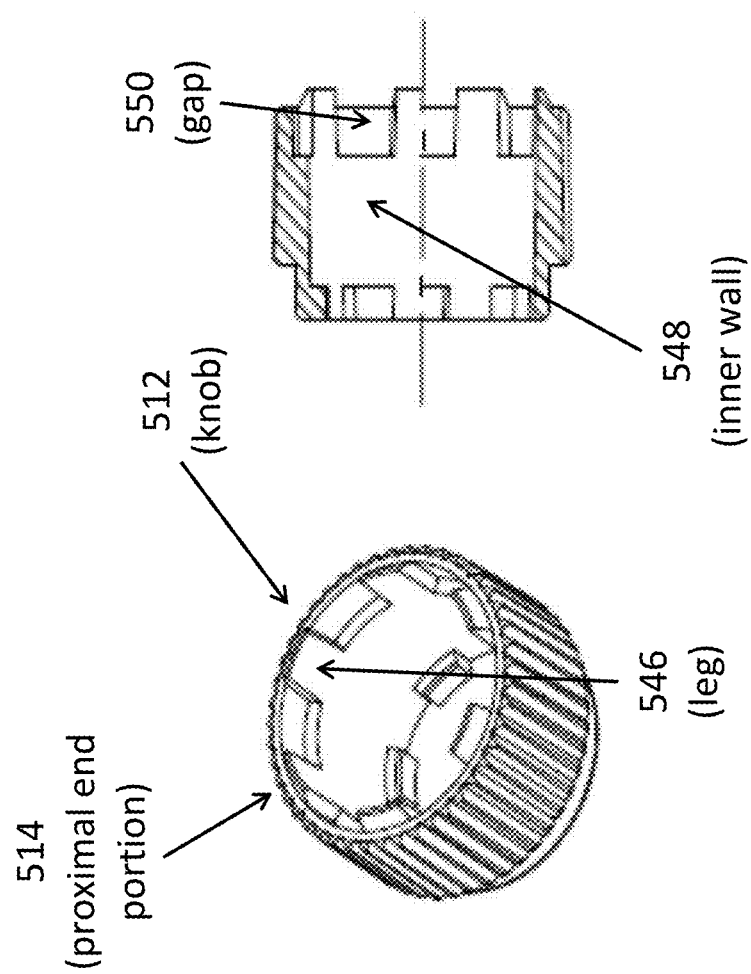
FIG. 42A  FIG. 42B  FIG. 42C  FIG. 42D

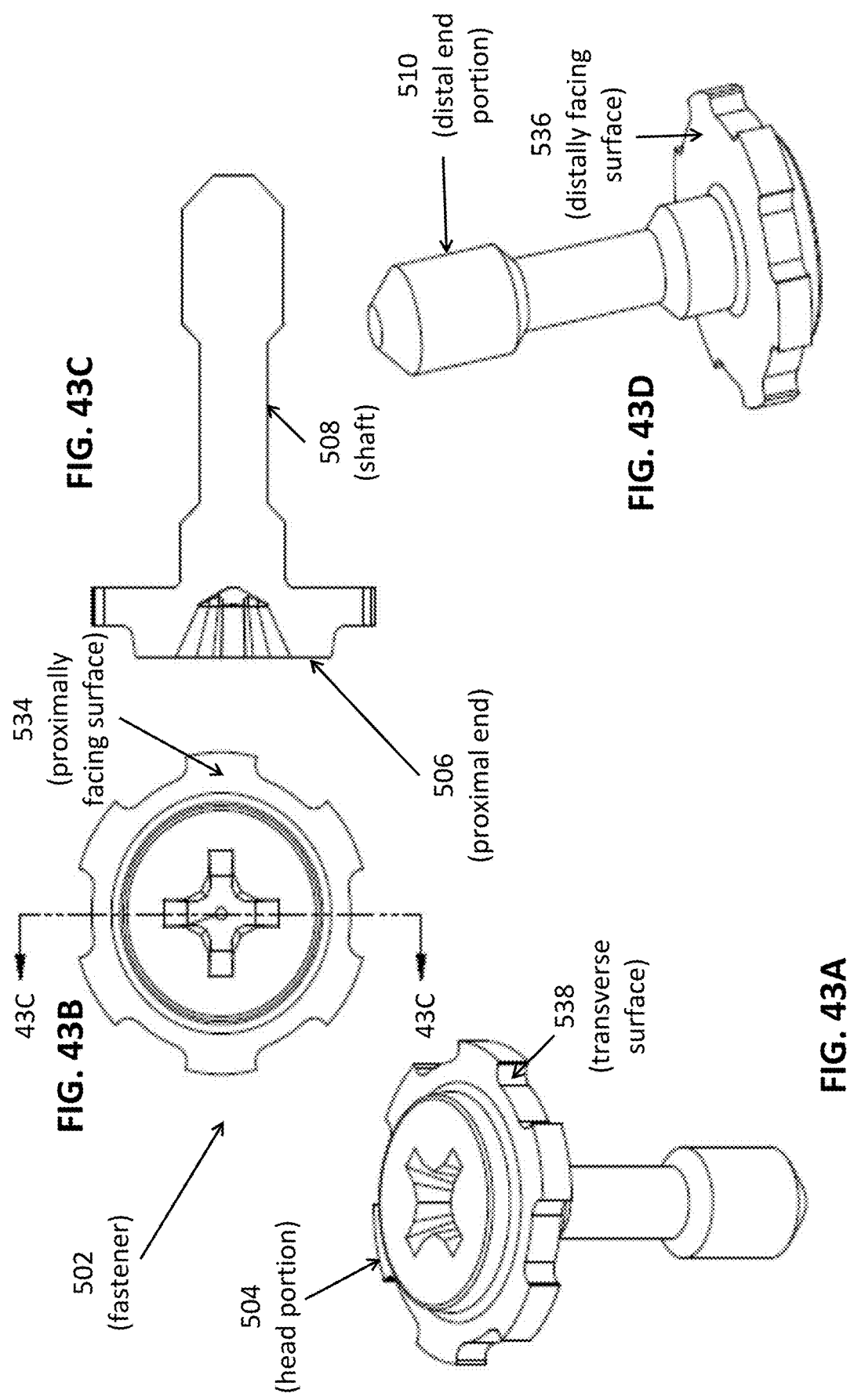

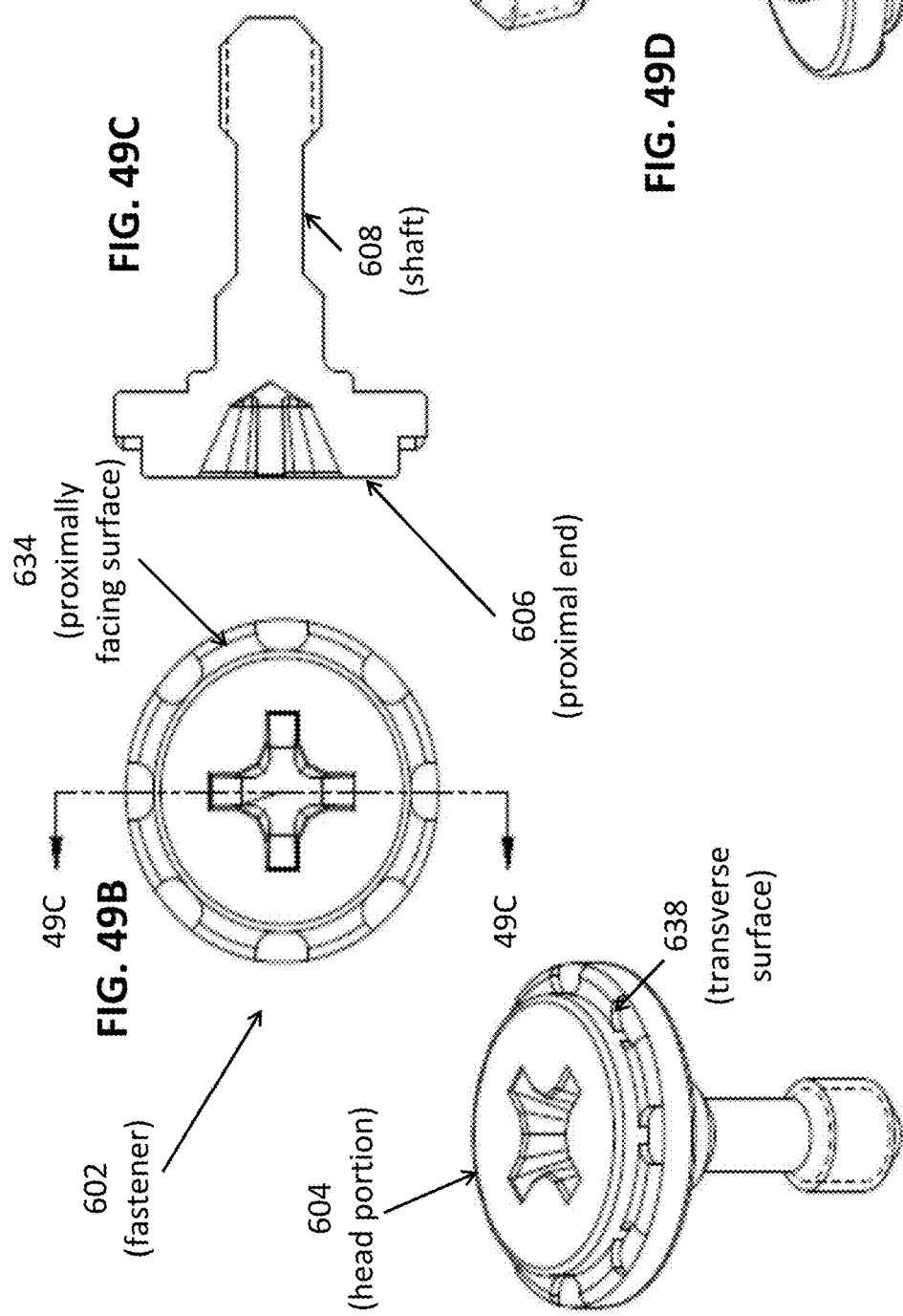

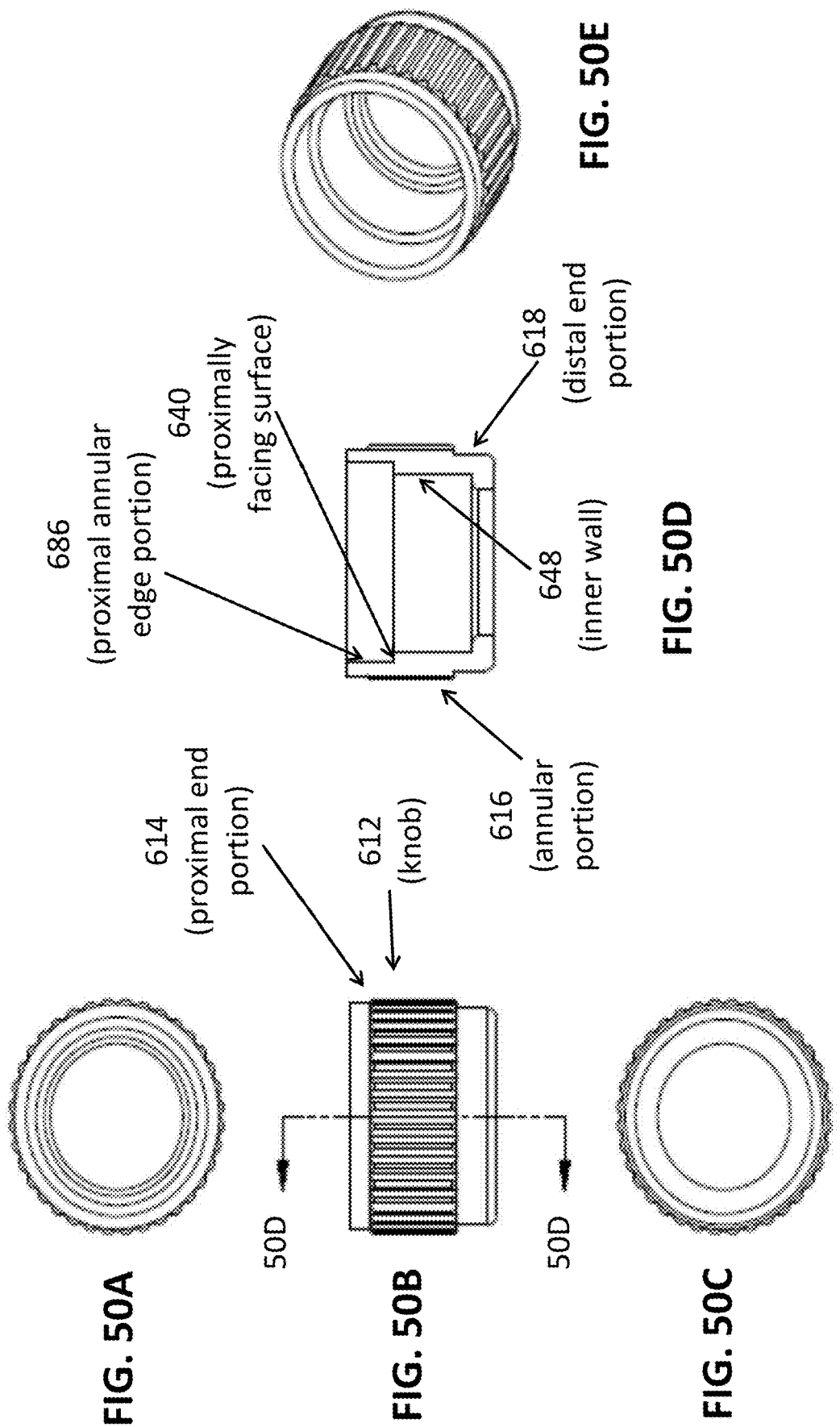

700
(captive fastener)

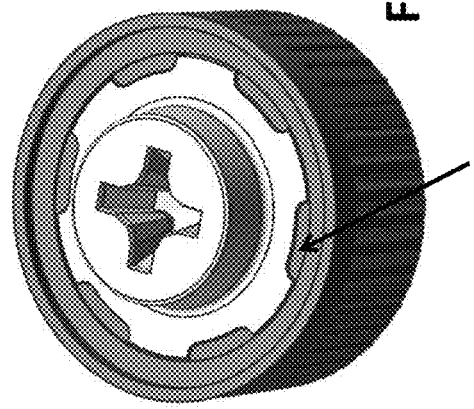
FIG. 52B
Anti-rotate future
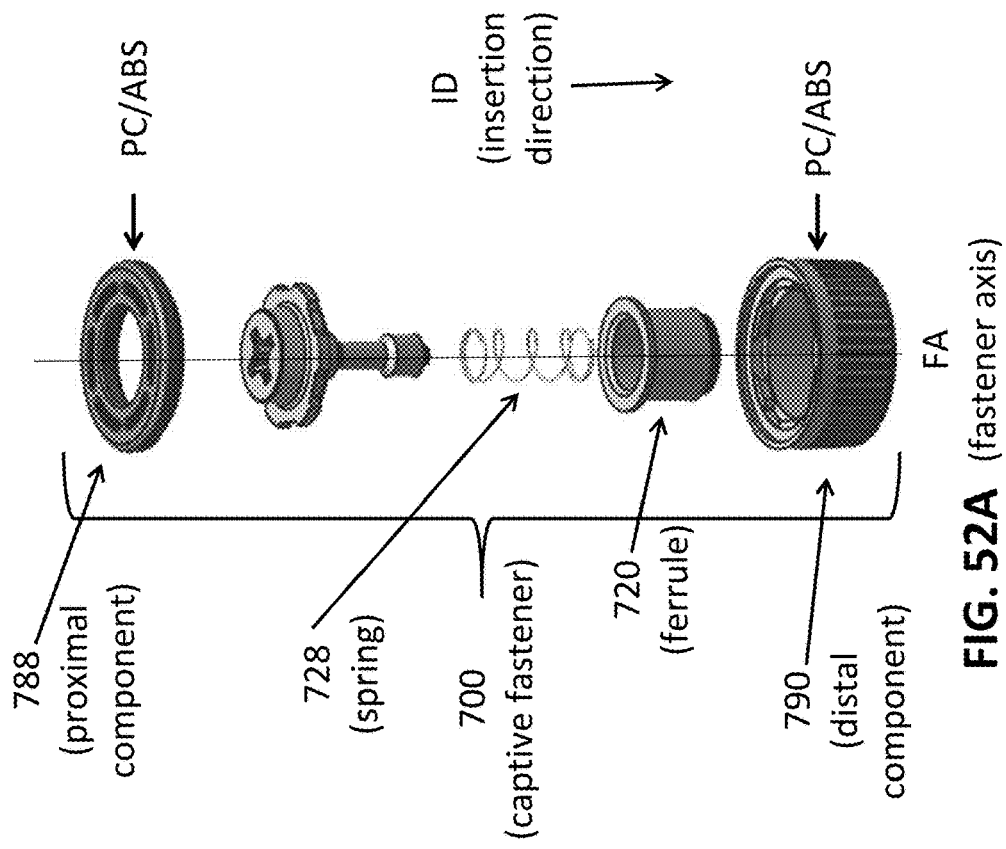
FIG. 52A (fastener axis)
788 (proximal component)
728 (spring)
700 (captive fastener)
720 (ferrule)
790 (distal component)
PC/ABS
ID (insertion direction)
FA

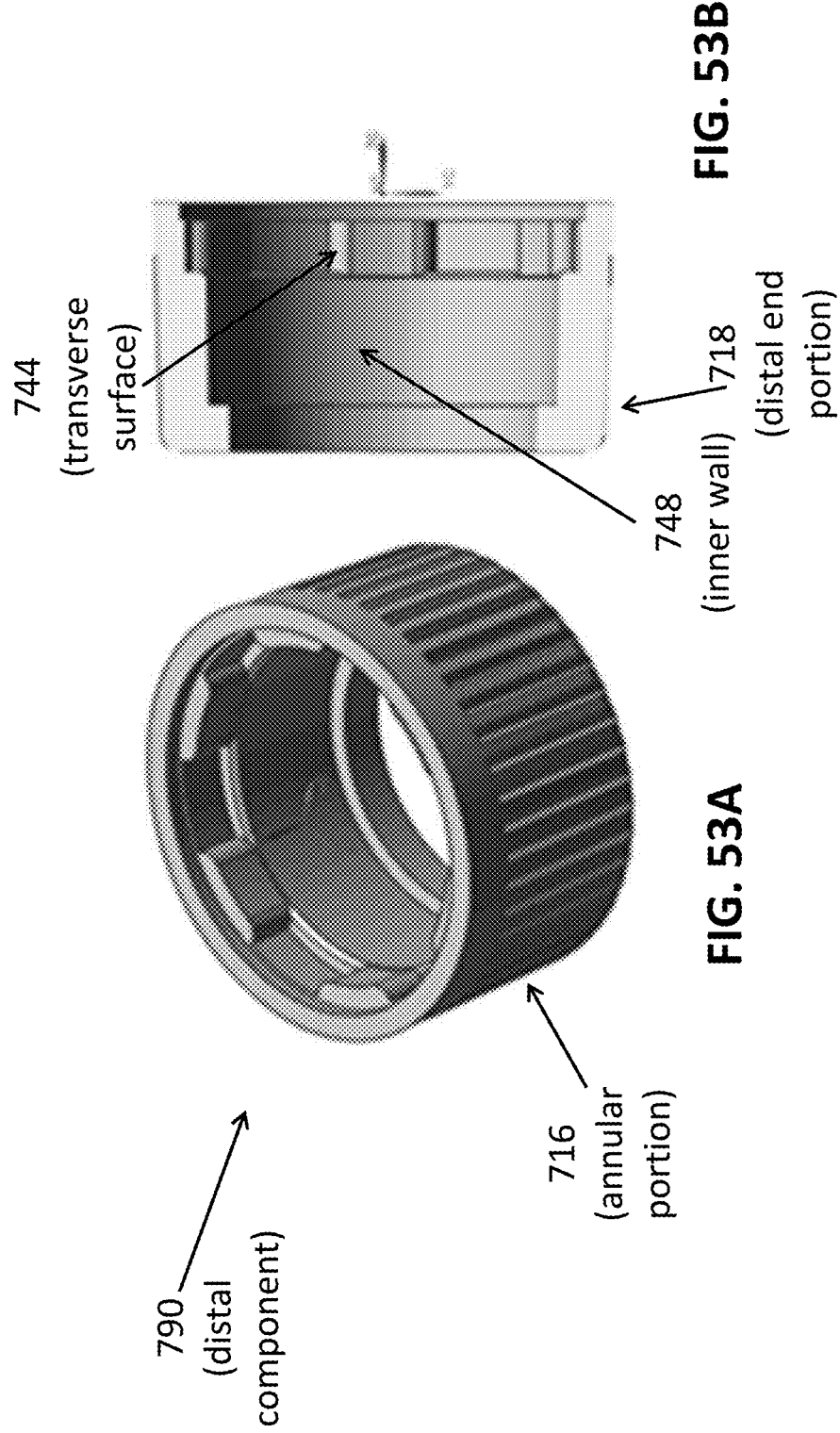

788 (proximal component)

792 (annular protrusion)

712 (knob)

700 (captive fastener)

720 (ferrule)

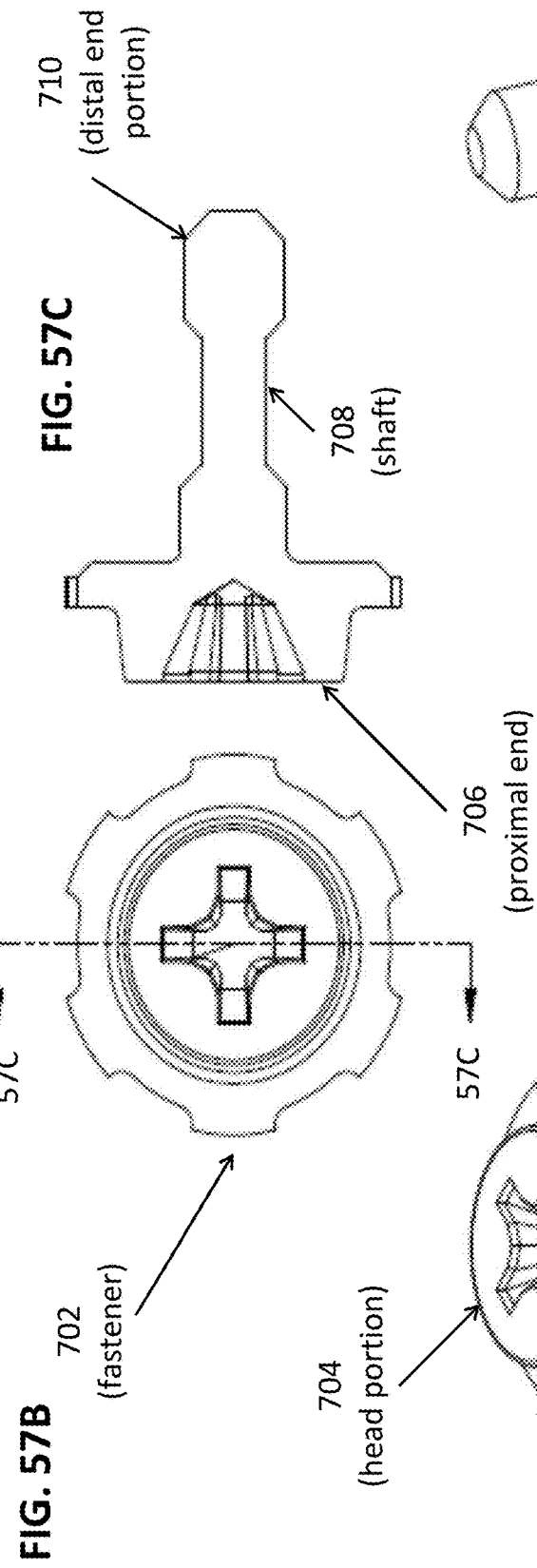

CAPTIVE FASTENER AND METHOD OF ASSEMBLING THE SAME

CROSS-REFERENCE TO RELATED APPLICATIONS

This application a U.S. national phase patent application of PCT Patent Application No. PCT/US2021/026656, filed Apr. 9, 2021, which claims priority to U.S. Provisional Patent Application No. 63/007,618, filed on Apr. 9, 2020, titled "CAPTIVE FASTENER AND METHOD OF ASSEMBLING THE SAME," the entire disclosures of which are incorporated by reference herein for all purposes.

BACKGROUND OF THE INVENTION

This invention relates to captive fasteners of the type generally used to attach a first panel to a second panel, frame or other surface when it is desired to keep the fastener in position without loose items of hardware. The captive fastener is mounted such that the fastener stays attached to a panel even when the fastener is disengaged from another panel or surface surface.

Captive fasteners have been disclosed in, for example, U.S. Pat. Nos. 5,382,124, 5,851,095, and 6,280,131, the disclosures of which are incorporated herein by reference. Though the captive fasteners disclosed in these patents represent improvements over prior fasteners, there remains a need for captive fasteners with further improvements in terms of at least one of performance, ease of assembly, reduction of manufacturing cost, and/or functionality.

SUMMARY OF THE INVENTION

According to preferred principles of a fastener provided by the invention, a captive fastener attachable to a panel along a fastener axis is provided. The captive fastener includes a fastener having a head portion at a proximal end of the fastener and a shaft extending from the head portion and along the fastener axis to a distal end portion of the fastener. The captive fastener also includes a knob formed separately from the fastener and assembled to the fastener, the knob having a proximal end portion engaged to the head portion of the fastener and an annular portion extending radially around the fastener axis and the shaft of the fastener and distally from the head portion of the fastener to a distal end portion of the knob.

A ferrule is associated with the knob, the ferrule defining an opening extending along the fastener axis and receiving the shaft of the fastener. The ferrule has a proximal end portion configured to prevent separation of the knob from the ferrule along the fastener axis and a distal end portion configured for engagement to the panel. A spring is positioned to bias the knob or the fastener proximally relative to the ferrule and to inhibit tilting of the knob or the fastener relative to the fastener axis. The proximal end portion of the ferrule having been positioned to be associated with the knob in an insertion direction along the fastener axis, and the head portion of the fastener having been inserted within the knob for engagement to the knob in the insertion direction.

The engagement between the proximal portion of the knob and the head portion of the fastener is configured to resist axial movement of the knob relative to the fastener along the fastener axis, rotational movement of the knob relative to the fastener about the fastener axis, and pivotal movement of the knob relative to the fastener axis.

According to a first aspect of the invention in which snap-in assembly, for example, is made possible, the proximal end portion of the knob is mechanically engaged to the head portion of the fastener. The head portion of the fastener has a proximally facing surface facing toward the proximal end of the fastener, a distally facing surface facing toward the distal end portion of the fastener, and a transverse surface extending transverse to the proximally facing surface and the distally facing surface of the head portion of the fastener. The knob has a proximally facing surface facing toward a proximal end of the knob, a distally facing surface facing toward a distal end of the knob, and a transverse surface extending transverse to the proximally facing surface and the distally facing surface of the knob.

At least one of the proximally facing surface of the knob and the distally facing surface of the knob is movable radially relative to the fastener axis between an engaging position, in which the proximally facing surface of the knob can engage the distally facing surface of the head portion of the fastener and the distally facing surface of the knob can engage the proximally facing surface of the head portion of the fastener, thereby capable of restricting movement of the head portion of the fastener relative to the knob along the fastener axis, and an extended position, in which at least one of the proximally facing surface of the knob or the distally facing surface of the knob is disengaged from the head portion of the fastener, thereby permitting movement of the head portion of the fastener relative to the knob along the fastener axis. The transverse surface of the head portion of the fastener abuts the transverse surface of the knob, thereby restricting rotational movement of the knob relative to the fastener about the fastener axis.

In a first embodiment of this first aspect of the invention, the knob includes a leg defining the distally facing surface of the knob or the proximally facing surface of the knob, the leg of the knob being moveable radially outwardly to move the distally facing surface of the knob or the proximally facing surface of the knob from the engaging position to the extended position, thereby permitting insertion of the head portion of the fastener into the knob, and from the extended position to the engaging position, thereby resisting withdrawal of the head portion of the fastener from the knob.

An second embodiment of this first aspect of the invention, the knob includes an inner component and an outer component fixed to the inner component, the inner component of the knob defining at least one of the distally facing surface of the knob or the proximally facing surface of the knob, and the outer component of the knob defining a radially outwardly facing surface positioned for gripping the knob.

In a third embodiment of this first aspect of the invention, the knob includes an inner wall defining an annular groove sized to accommodate the head portion of the fastener and defining the distally facing surface of the knob and the proximally facing surface of the knob, thereby resisting withdrawal of the head portion of the fastener from the knob upon insertion of the head portion of the fastener into the annular groove defined in the inner wall of the knob.

In a fourth embodiment of this first aspect of the invention, the head portion of the fastener defines an annular groove providing the proximally facing surface and the distally facing surface of the head portion of the fastener, and the knob includes an inner wall having an inwardly extending protrusion providing the proximally facing surface of the knob and the distally facing surface of the knob. The inwardly extending protrusion of the knob is positioned to extend into the annular groove of the head portion of the fastener, thereby permitting a pressed insertion of the head portion of the fastener within the inner wall of the knob and resisting withdrawal of the head portion of the fastener from the knob.

According to a second aspect of the invention in which heat stake assembly, for example, is made possible, the proximal end portion of the knob is deformed into the engagement with the head portion of the fastener. The head portion of the fastener has a proximally facing surface facing toward the proximal end of the fastener, a distally facing surface facing toward the distal end portion of the fastener, and a transverse surface extending transverse to the proximally facing surface of the head portion of the fastener and the distally facing surface of the head portion of the fastener. The knob has an engagement surface and a transverse surface extending transverse to the engagement surface of the knob.

The engagement surface of the knob is deformable from an extended position, in which the engagement surface of the knob is disengaged from the head portion of the fastener, thereby permitting movement of the head portion of the fastener relative to the knob along the fastener axis, and a deformed position, radially inward from the extended position, in which the engagement surface of the knob engages the head portion of the fastener, thereby restricting movement of the head portion of the fastener relative to the knob along the fastener axis. The transverse surface of the head portion of the fastener abuts the transverse surface of the knob, thereby restricting rotation of the knob relative to the fastener about the fastener axis.

In a fifth embodiment according to this second aspect of the invention, the knob includes a leg defining the engagement surface. The leg of the knob is deformable radially inwardly relative to the fastener axis to move the engagement surface of the knob from the extended position to the deformed position, thereby resisting withdrawal of the head portion of the fastener from the knob.

In a sixth embodiment according to this aspect of the invention, the knob includes a proximal annular edge portion defining the engagement surface. The proximal annular edge portion of the knob is deformable radially inwardly to deform the engagement surface from the extended position to the deformed position, thereby resisting withdrawal of the head portion of the fastener from the knob.

In a seventh embodiment according to this aspect of the invention, the knob includes a proximal component and a distal component. The proximal component defines the engagement surface of the knob and the distal component defines the transverse surface of the knob. The proximal component of the knob is heat bonded to the distal component of the knob, thereby resisting separation of the proximal component of the knob from the distal component of the knob and withdrawal of the head portion of the fastener from the knob.

According to another aspect of the invention in which snap-in assembly, for example, is made possible, a method is provided for assembling a captive fastener by mechanically engaging the proximal end portion of the knob to the head portion of the fastener. The method includes moving at least one of the proximally facing surface of the knob and the distally facing surface of the knob radially outwardly relative to the fastener axis to the extended position, in which at least one of the proximally facing surface of the knob or the distally facing surface of the knob is disengaged from the head portion of the fastener; inserting the head portion of the fastener into the proximal end portion of the knob; returning the at least one of the proximally facing surface of the knob and the distally facing surface of the knob radially inwardly relative to the fastener axis from the extended position to the engaging position, such that the proximally facing surface of the knob engages the distally facing surface of the head portion of the fastener and the distally facing surface of the knob engages the proximally facing surface of the head portion of the fastener, thereby restricting movement of the head portion of the fastener relative to the knob along the fastener axis; abutting the transverse surface of the head portion of the fastener against the transverse surface of the knob, thereby restricting rotational movement of the knob relative to the fastener about the fastener axis; positioning a spring to bias the knob or the fastener proximally and to inhibit tilting of the knob or the fastener relative to the fastener axis; and associating a ferrule with the knob such that the opening defined in the ferrule extends along the fastener axis and receives the shaft of the fastener, and such that the proximal end portion of the ferrule prevents separation of the knob from the ferrule along the fastener axis.

In a first embodiment of this method, the moving step includes moving a leg defining the distally facing surface of the knob or the proximally facing surface of the knob radially outwardly to the extended position, thereby permitting insertion of the head portion of the fastener into the knob, and the returning step includes returning the leg from the extended position to the engaging position, thereby resisting withdrawal of the head portion of the fastener from the knob.

In a second embodiment, the method includes mechanically coupling an outer component of the knob to an inner component of the knob or to the head portion of the fastener, thereby preventing separation of the outer component of the knob from the inner component of the knob along the fastener axis.

In a third embodiment of the method, the inserting step includes press inserting the head portion of the fastener into an annular groove defined in an inner wall of the knob.

In a fourth embodiment of this method, the inserting step includes extending an inwardly extending protrusion of the knob into an annular groove of the head portion of the fastener, thereby permitting pressed insertion of the head portion of the fastener into the inner wall of the knob and resisting withdrawal of the head portion of the fastener from the knob.

According to yet another aspect of the invention in which heat stake assembly, for example, is made possible, a method is provided for assembling a captive fastener by deforming the proximal end portion of the knob into the engagement with the head portion of the fastener. The method includes inserting the head portion of the fastener into the proximal end portion of the knob; deforming the engagement surface of the knob radially inwardly relative to the fastener axis from the extended position, in which the engagement surface of the knob is disengaged from the head portion of the fastener, to the deformed position, in which the engagement surface of the knob engages the head portion of the fastener, such that the proximally facing surface of the knob engages the distally facing surface of the head portion of the fastener and the engagement surface of the knob engages the proximally facing surface of the head portion of the fastener, thereby restricting movement of the head portion of the fastener relative to the knob along the fastener axis; abutting the transverse surface of the head portion of the fastener against the transverse surface of the knob, thereby restricting rotational movement of the knob relative to the fastener about the fastener axis; positioning a spring to bias the knob or the fastener proximally and to inhibit tilting of the knob or the fastener relative to the fastener axis; and associating a ferrule with the knob such that the opening defined in the ferrule extends along the fastener axis and receives the shaft of the fastener, and such that the proximal end portion of the ferrule prevents separation of the knob from the ferrule along the fastener axis.

According to a fifth embodiment, this method includes abutting the distally facing surface of the engagement surface against the proximally facing surface of the head portion of the fastener, thereby restricting movement of the head portion of the fastener relative to the knob along the fastener axis.

According to a sixth embodiment, the deforming step of this method includes deforming a proximal annular edge portion of the knob defining the engagement surface radially inwardly to move the engagement surface from the extended position to the deformed position, thereby resisting withdrawal of the head portion of the fastener from the knob.

According to a seventh embodiment, this method further includes heat bonding a proximal component of the knob to a distal component of the knob, thereby resisting separation of the proximal portion of the knob from the distal component of the knob and withdrawal of the head portion of the fastener from the knob.

BRIEF DESCRIPTION OF THE DRAWINGS

FIG. 1A is a side view of a captive fastener according to a first embodiment of the invention, in an extended configuration.

FIG. 1B is a side view of the captive fastener shown in FIG. 1A, in a compressed configuration.

FIG. 1C is a top view of the captive fastener shown in FIG. 1A.

FIG. 4A is a perspective view of a knob component of the captive fastener shown in FIG. 1A.

FIG. 4B is a perspective view of a fastener component of the captive fastener shown in FIG. 1A. is

FIG. 6A is a perspective view of the knob component of the captive fastener shown in FIG. 1A.

FIG. 6B is a cross-sectional side view of the knob component of the captive fastener shown in FIG. 1A, taken through line 6B-6B in FIG. 6C.

FIG. 6C is a top view of the knob component of the captive fastener shown in FIG. 1A.

FIG. 6D is a side view of the knob component of the captive fastener shown in FIG. 1A.

FIG. 7A is a top view of the fastener component of the captive fastener shown in FIG. 1A.

FIG. 7B is a perspective view of the fastener component of the captive fastener shown in FIG. 1A.

FIG. 7C is a cross-sectional side view of the fastener component of the captive fastener shown in FIG. 1A, taken through line 7C-7C in FIG. 7A.

FIG. 7D is another perspective view of the fastener component of the captive fastener shown in FIG. 1A.

FIG. 8A is a side view of a spring component of the captive fastener shown in FIG. 1A.

FIG. 8B is an end view of a spring component of the captive fastener shown in FIG. 1A.

FIG. 8C is a perspective view of a spring component of the captive fastener shown in FIG. 1A.

FIG. 9A is a top view of a ferrule component of the captive fastener shown in FIG. 1A.

FIG. 9B is a side view of a ferrule component of the captive fastener shown in FIG. 1A.

FIG. 9C is a perspective view of a ferrule component of the captive fastener shown in FIG. 1A.

FIG. 9D is a cross-sectional side view of a ferrule component of the captive fastener shown in FIG. 1A.

FIG. 10A is an exploded view of a variation of the captive fastener shown in FIG. 1A.

FIG. 10B is a cross-sectional side view of the variation of the captive fastener shown in FIG. 10A, taken through line 10B-10B in FIG. 10C.

FIG. 10C is a top view of the variation of the captive fastener shown in FIG. 10A.

FIG. 12A is a side view of the captive fastener shown in FIG. 1A, illustrating rotational movement.

FIG. 12B is a side view of the captive fastener shown in FIG. 1A, illustrating axial movement in a distal direction.

FIG. 12C is a side view of the captive fastener shown in FIG. 1A, illustrating axial movement in a proximal direction.

FIG. 12D is a side view of the captive fastener shown in FIG. 1A, illustrating pivotal movement.

FIGS. 15 through 18B are views of the captive fastener shown in FIG. 14, including components and variations of the captive fastener.

FIGS. 20A through 23B are views of the captive fastener shown in FIGS. 19A and 19B, including components and variations of the captive fastener.

FIGS. 24A and 24B are top and cross-sectional side views of a captive fastener according to a fourth embodiment of the invention.

FIGS. 25A through 36D are views of the captive fastener shown in FIGS. 24A and 24B, including components and variations of the captive fastener.

FIGS. 37A through 37C are side and top views of a captive fastener according to a fifth embodiment of the invention.

FIGS. 38A through 43D are views of the captive fastener shown in FIGS. 37A through 37C, including components and variations of the captive fastener.

FIGS. 45 through 50E are views of the captive fastener shown in FIGS. 44A and 44B, including components and variations of the captive fastener.

FIGS. 52A through 57D are views of the captive fastener shown in FIG. 51A, including components and variations of the captive fastener.

DETAILED DESCRIPTION OF EMBODIMENTS OF THE INVENTION

Figure 2B:
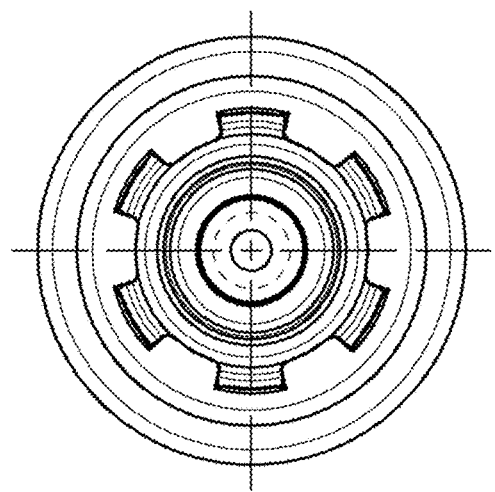
FIG. 2B is a bottom view of the captive fastener shown in FIG. 1A.

Although the invention is illustrated and described herein with reference to specific embodiments, the invention is not intended to be limited to the details shown. Rather, various modifications may be made in the details within the scope and range of equivalents of the claims and without departing from the invention.

Also, like numbers are intended to refer to like features or components in various embodiments of the invention. Also, designators such as "A" are intended to indicate variations of related components or features.

Referring generally to embodiments of captive fasteners selected for illustration in FIGS. 1A through 57D, a captive fastener 100, 200, 300, 400, 500, 600, 700 is attachable to a panel (not shown) along a fastener axis FA. The captive fastener 100, 200, 300, 400, 500, 600, 700 includes a fastener 102, 202, 302, 402, 502, 602, 702 having a head portion 104, 204, 304, 404, 504, 604, 704 at a proximal end 106, 206, 306, 406, 506, 606, 706 of the fastener 102, 202, 302, 402, 502, 602, 702 and a shaft 108, 208, 308, 408, 508, 608, 708 extending from the head portion 104, 204, 304, 404, 504, 604, 704 and along the fastener axis FA to a distal end portion 110, 210, 310, 410, 510, 610, 710 of the fastener 102, 202, 302, 402, 502, 602, 702.

Although the fasteners selected for illustration have a distal end portion with a threaded fastener arrangement, the fasteners can be provided with any form of engagement feature. For example, a threaded shaft can be replaced with a quarter-turn or bayonet or other fastener arrangement, depending on the preference of the user of the captive fastener. Accordingly, a captive screw can be provided according to this invention, but other fastener types are also contemplated.

A knob 112, 212, 312, 412, 512, 612, 712 is formed separately from the fastener 102, 202, 302, 402, 502, 602, 702 and assembled to the fastener 102, 202, 302, 402, 502, 602, 702. The knob 112, 212, 312, 412, 512, 612, 712 has a proximal end portion 114, 214, 314, 414, 514, 614, 714 engaged to the head portion 104, 204, 304, 404, 504, 604, 704 of the fastener 102, 202, 302, 402, 502, 602, 702 and an annular portion 116, 216, 316, 416, 516, 616, 716 extending radially around the fastener axis FA and the shaft 108, 208, 308, 408, 508, 608, 708 of the fastener 102, 202, 302, 402, 502, 602, 702 and distally from the head portion 104, 204, 304, 404, 504, 604, 704 of the fastener 102, 202, 302, 402, 502, 602, 702 to a distal end portion 114, 214, 314, 414, 514, 614, 714 of the knob 112, 212, 312, 412, 512, 612, 712.

A ferrule 120, 220, 320, 420, 520, 620, 720 is associated with the knob 112, 212, 312, 412, 512, 612, 712. The ferrule 120, 220, 320, 420, 520, 620, 720 defines an opening 122, 222, 322, 422, 522, 622, 722 extending along the fastener axis FA and receiving the shaft 108, 208, 308, 408, 508, 608, 708 of the fastener 102, 202, 302, 402, 502, 602, 702. The ferrule 120, 220, 320, 420, 520, 620, 720 has a proximal end portion 124, 224, 324, 424, 524, 624, 724 configured to prevent separation of the knob 112, 212, 312, 412, 512, 612, 712 from the ferrule 120, 220, 320, 420, 520, 620, 720 along the fastener axis FA and a distal end portion 126, 226, 326, 426, 526, 626, 726 configured for engagement to the panel (not shown).

A spring 128, 228, 328, 428, 528, 628, 728 is positioned to bias the knob 112, 212, 312, 412, 512, 612, 712 or the fastener 102, 202, 302, 402, 502, 602, 702 proximally relative to the ferrule 120, 220, 320, 420, 520, 620, 720 and to inhibit tilting of the knob 112, 212, 312, 412, 512, 612, 712 or the fastener 102, 202, 302, 402, 502, 602, 702 relative to the fastener axis FA. Although a spring is preferably included in each of the embodiments, the spring is not always shown in the accompanying figures. One skilled in the art will understand the positioning of springs in the various embodiments.

The proximal end portion 124, 224, 324, 424, 524, 624, 724 of the ferrule 120, 220, 320, 420, 520, 620, 720 has been positioned to be associated with the knob 112, 212, 312, 412, 512, 612, 712 in an insertion direction ID along the fastener axis FA. Similarly, the head portion 104, 204, 304, 404, 504, 604, 704 of the fastener 102, 202, 302, 402, 502, 602, 702 has been inserted within the knob 112, 212, 312, 412, 512, 612, 712 for engagement to the knob 112, 212, 312, 412, 512, 612, 712 in the insertion direction ID.

Although the embodiments selected for illustration in the figures include particular springs or ferrules or knobs or fasteners in various combinations, these components can be "mixed and matched" to suit a particular preference, a particular application, or a particular processing method. Accordingly, the various knob, fastener, spring, and ferrule configurations can be selected and assembled in unlimited combinations.

In one embodiment selected for illustration, the captive fastener can be assembled manually or by automated processes in which components of the captive fastener are brought together into assembly along a common axis such as fastener axis FA. In this way, the process steps can be aligned along a common axis for ease of assembly and efficiency. Also, the forces necessary to assemble the components can be applied along the common axis such that components can be pressed or otherwise engaged or coupled by urging one component against another. For example, referring to a first embodiment, the proximal end portion 124 of the ferrule 120 is positioned to be associated with the knob 112 along the fastener axis FA. Similarly, the head portion 104 of the fastener 102 is inserted within the knob 112 for engagement to the knob 112 along the fastener axis FA. In the same way, all remaining components can be brought together along the same fastener axis FA, including the spring. Depending on the preferences of the manufacturer of the captive fastener, the fastener axis FA can be oriented vertically or horizontally or at any angle to facilitate assembly.

In another embodiment selected for illustration, the captive fastener can be assembled manually or by automated processes in which components of the captive fastener are brought together into assembly in a common insertion direction ID. In this way, the process steps can be performed in or from a common insertion direction for ease of assembly and efficiency. Also, the forces necessary to assemble the components can be applied in the common insertion direction such that components can be pressed or otherwise engaged or coupled by urging one component against another from a common direction. For example, referring to a first embodiment, the proximal end portion 124 of the ferrule 120 is positioned to be associated with the knob 112 in an insertion direction ID. Similarly, the head portion 104 of the fastener 102 is inserted within the knob 112 for engagement to the knob 112 in the same insertion direction ID. Depending on the assembly and embodiment of the captive fastener, the insertion direction ID can be a proximal or distal direction such that all process steps can be performed from in the proximal direction or the distal direction.

The engagement 130, 230, 330, 430, 530, 630, 730 between the proximal portion of the knob 112, 212, 312, 412, 512, 612, 712 and the head portion 104, 204, 304, 404, 504, 604, 704 of the fastener 102, 202, 302, 402, 502, 602, 702 is configured to resist axial movement A of the knob 112, 212, 312, 412, 512, 612, 712 relative to the fastener 102, 202, 302, 402, 502, 602, 702 along the fastener axis FA, rotational movement R of the knob 112, 212, 312, 412, 512, 612, 712 relative to the fastener 102, 202, 302, 402, 502, 602, 702 about the fastener axis FA, and pivotal movement P of the knob 112, 212, 312, 412, 512, 612, 712 relative to the fastener axis FA.

In the captive fastener 100, 200, 300, 400, 500, 600, 700, the fastener 102, 202, 302, 402, 502, 602, 702 is metallic, and the knob 112, 212, 312, 412, 512, 612, 712 is non-metallic. Nevertheless, both the fastener and the knob can be metallic or non-metallic. Also, the metallic or non-metallic materials can be selected from a wide variety of acceptable materials, depending on the application of the captive fastener, the preference of the end user, or the preference of the manufacturer. Examples of suitable materials are described in U.S. Pat. Nos. 5,382,124, 5,851,095, and 6,280,131, the disclosures of which are incorporated herein by reference.

The proximal end portion 124, 224, 324, 424, 524, 624, 724 of the ferrule 120, 220, 320, 420, 520, 620, 720 and the head portion 104, 204, 304, 404, 504, 604, 704 of the fastener 102, 202, 302, 402, 502, 602, 702 are inserted within the knob 112, 212, 312, 412, 512, 612, 712 in the insertion direction ID, the insertion direction ID being a distal direction from the proximal end portion 114, 214, 314, 414, 514, 614, 714 of the knob 112, 212, 312, 412, 512, 612, 712 along the fastener axis FA.

Alternatively, the proximal end portion 124, 224, 324, 424, 524, 624, 724 of the ferrule 120, 220, 320, 420, 520, 620, 720 and the head portion 104, 204, 304, 404, 504, 604, 704 of the fastener 102, 202, 302, 402, 502, 602, 702 can be inserted within the knob 112, 212, 312, 412, 512, 612, 712 in the insertion direction ID, the insertion direction ID being a proximal direction from the distal end portion 118, 218, 318, 418, 518, 618, 718 of the knob 112, 212, 312, 412, 512, 612, 712 along the fastener axis FA.

The proximal end portion 124, 224, 324, 424, 524, 624, 724 of the ferrule 120, 220, 320, 420, 520, 620, 720 includes a radial extension 132, 232, 332, 432, 532, 632, 732 extending radially outwardly relative to the fastener axis FA for engagement with the knob 112, 212, 312, 412, 512, 612, 712 to prevent the separation of the knob 112, 212, 312, 412, 512, 612, 712 from the ferrule 120, 220, 320, 420, 520, 620, 720.

The radial extension 132, 232, 332, 432, 532, 632, 732 of the proximal end portion 124, 224, 324, 424, 524, 624, 724 of the ferrule 120, 220, 320, 420, 520, 620, 720 is optionally deformed from an extended position, in which the proximal end portion 124, 224, 324, 424, 524, 624, 724 of the ferrule 120, 220, 320, 420, 520, 620, 720 is insertable within the knob 112, 212, 312, 412, 512, 612, 712, thereby permitting movement of the proximal end portion 124, 224, 324, 424, 524, 624, 724 of the ferrule 120, 220, 320, 420, 520, 620, 720 into the knob 112, 212, 312, 412, 512, 612, 712 in the insertion direction ID along the fastener axis FA, to an engaging position, in which the proximal end portion 124, 224, 324, 424, 524, 624, 724 of the ferrule 120, 220, 320, 420, 520, 620, 720 cannot be removed from within the knob 112, 212, 312, 412, 512, 612, 712 in a direction opposite the insertion direction ID, thereby preventing the separation of the knob 112, 212, 312, 412, 512, 612, 712 from the ferrule 120, 220, 320, 420, 520, 620, 720 along the fastener axis FA.

Embodiments of the invention include captive fasteners in which the proximal end portion of the knob is mechanically engaged or coupled to the head portion of the fastener, such as for example by snap-in assembly. Such mechanical engagement is optionally provided by a snap-in or press insertion engagement. In such embodiments, insert molding, heat bonding, and/or crimping processes can be eliminated. For example, such embodiments can be assembled simply by coupling separate, pre-formed components. This makes possible the mass production of the components, which can be subsequently assembled with one another in a separate operation. Accordingly, the engaging step for engagement between the knob and the fastener can be completed without permanently deforming the knob.

Referring generally to the embodiments shown in FIGS. 1A-36D for illustration, the head portion 104, 204, 304, 404 of the fastener 102, 202, 302, 402 has a proximally facing surface 134, 234, 334, 434 facing toward the proximal end of the fastener 102, 202, 302, 402, a distally facing surface 136, 236, 336, 436 facing toward the distal end portion 110, 210, 310, 410 of the fastener 102, 202, 302, 402, and a transverse surface 138, 238, 338, 438 extending transverse to the proximally facing surface 134, 234, 334, 434 and the distally facing surface 136, 236, 336, 436 of the head portion 104, 204, 304, 404 of the fastener 102, 202, 302, 402.

The knob 112, 212, 312, 412 has a proximally facing surface 140, 240, 340, 440 facing toward a proximal end of the knob 112, 212, 312, 412, a distally facing surface 142, 242, 342, 442 facing toward a distal end of the knob 112, 212, 312, 412, and a transverse surface 144, 244, 344, 444 extending transverse to the proximally facing surface 140, 240, 340, 440 and the distally facing surface 142, 242, 342, 442 of the knob 112, 212, 312, 412.

At least one of the proximally facing surface 140, 240, 340, 440 of the knob 112, 212, 312, 412 and the distally facing surface 142, 242, 342, 442 of the knob 112, 212, 312, 412 are movable radially relative to the fastener axis FA between two positions:

(1) an engaging position, in which the proximally facing surface 140, 240, 340, 440 of the knob 112, 212, 312, 412 engages the distally facing surface 136, 236, 336, 436 of the head portion 104, 204, 304, 404 of the fastener 102, 202, 302, 402 and the distally facing surface 142, 242, 342, 442 of the knob 112, 212, 312, 412 engages the proximally facing surface 134, 234, 334, 434 of the head portion 104, 204, 304, 404 of the fastener 102, 202, 302, 402, thereby restricting movement of the head portion 104, 204, 304, 404 of the fastener 102, 202, 302, 402 relative to the knob 112, 212, 312, 412 along the fastener axis FA; and (2) an extended position, in which at least one of the proximally facing surface 140, 240, 340, 440 of the knob 112, 212, 312, 412 or the distally facing surface 142, 242, 342, 442 of the knob 112, 212, 312, 412 is disengaged from the head portion 104, 204, 304, 404 of the fastener 102, 202, 302, 402, thereby permitting movement of the head portion 104, 204, 304, 404 of the fastener 102, 202, 302, 402 relative to the knob 112, 212, 312, 412 along the fastener axis FA.

The transverse surface 138, 238, 338, 438 of the head portion 104, 204, 304, 404 of the fastener 102, 202, 302, 402 abuts the transverse surface 144, 244, 344, 444 of the knob 112, 212, 312, 412, thereby restricting rotational movement of the knob 112, 212, 312, 412 relative to the fastener 102, 202, 302, 402 about the fastener axis FA.

In the first embodiment and variations thereof illustrated in FIGS. 1A to 13 relating to the captive fastener 100, the knob 112 includes a moveable portion such as a tab or a flexible region to define the distally facing surface of the knob and/or the proximally facing surface of the knob. In this embodiment, a leg 146 defines the distally facing surface 142 of the knob 112 or the proximally facing surface 140 of the knob 112. The leg 146 of the knob 112 is moveable radially outwardly to move the distally facing surface 142 of the knob 112 or the proximally facing surface 140 of the knob 112 from (1) the engaging position to the extended position, thereby permitting insertion of the head portion 104 of the fastener 102 into the knob 112, and (2) from the extended position to the engaging position, thereby resisting withdrawal of the head portion 104 of the fastener 102 from the knob 112.

The knob 112 includes an inner wall 148 defining the proximally facing surface 140 of the knob 112 or the distally facing surface 142 of the knob 112, thereby restricting movement of the head of the fastener 102 relative to the knob 112 along the fastener axis FA.

In the captive fastener 100, the leg 146 of the knob 112 defines the distally facing surface 142 of the knob 112, and the inner wall 148 of the knob 112 defines the proximally facing surface 140 of the knob 112. The distally facing surface 142 of the leg 146 of the knob 112 abuts the proximally facing surface 134 of the head portion 104 of the fastener 102, and the proximally facing surface 140 of the inner wall 148 of the knob 112 abuts the distally facing surface 136 of the head portion 104 of the fastener 102.

In the captive fastener 100, the knob 112 includes two or more legs, for example six legs in this embodiment, at least one of the legs defining the transverse surface 144 of the knob 112. The adjacent legs are separated by a gap 150.

The transverse surface 138 of the head portion 104 of the fastener 102 extends into the gap 150 between adjacent legs, and the transverse surface 138 of the head portion 104 of the fastener 102 abuts the transverse surface 144 of the leg 146 of the knob 112, thereby restricting rotational movement of the knob 112 relative to the fastener 102 about the fastener axis FA.

The knob 112 is configured for snap-in engagement of the head portion 104 of the fastener 102 by the leg 146 of the knob 112 in the engaging position, thereby resisting withdrawal of the head portion 104 of the fastener 102 from the knob 112. For example, insertion of the head portion of the fastener can be achieved by snapping it into the knob using an insertion force. For example, legs or tabs or flexible sections can temporarily deform as the fastener is installed and then snap back into position without permanent deformation. Once snapped into position, the fastener cannot be unintentionally removed from the knob in the axial direction. Also, once snapped into position, the fastener cannot be unintentionally rotated relative to the knob about the axis.

The leg 146 of the knob 112 further defines a ramped surface 152 tapering from a radially outward portion of the leg 146 to a radially inward portion of the leg 146, the ramped surface 152 of the leg 146 of the knob 112 being positioned to facilitate the movement of the leg 146 of the knob 112 radially outwardly during the insertion of the head portion 104 of the fastener 102 into the knob 112.

The ramped surface 152 of the leg 146 of the knob 112 faces a proximal end 154 of the knob 112. In this embodiment, the proximal end portion 124 of the ferrule 120 and the head portion 104 of the fastener 102 have both been inserted within the knob 112 in the insertion direction ID. In this case, the insertion direction ID is a distal direction from the proximal end portion 114 of the knob 112 along the fastener axis FA.

The knob 112 also includes an annular wall 156 positioned radially outwardly from the leg 146 of the knob 112 and at least partially enclosing the leg 146 of the knob 112. The annular wall 156 defines a radially outwardly facing surface 158 positioned for gripping the knob 112.

Referring specifically to particular figures illustrating the first embodiments and variations thereof, FIG. 1A is a side view of a captive fastener 102 according to a first embodiment of the invention, in an extended configuration, and FIG. 1B is a side view of the captive fastener shown in FIG. 1A, in a compressed configuration. These figures illustrate compression of the ferrule into the knob against the bias of the spring. In a disengaged position in which the fastener is not engaged to another panel, the captive fastener will be in the extended position of FIG. 1A with an extended length EL. In an engaged position in which the fastener is engaged to another panel, the captive fastener will be in the compressed position of FIG. 1B with a compressed length CL. FIG. 1C is a top view of the captive fastener shown in FIG. 1A.

Figure 2A:
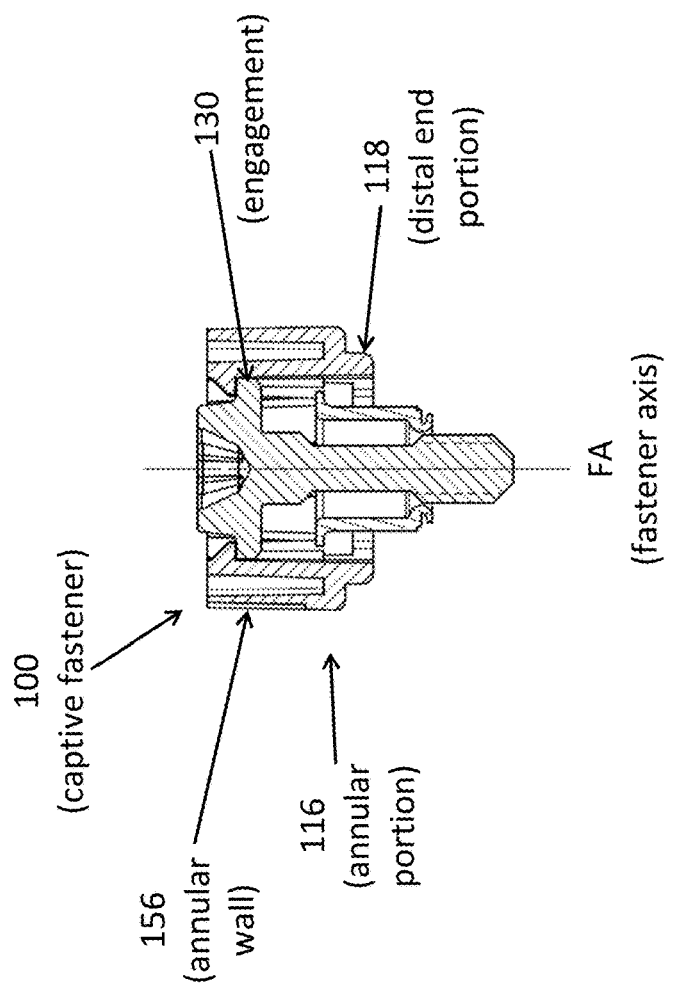
FIG. 2A is a cross-sectional side view of the captive fastener shown in FIG. 1A, taken through line 2A-2A in FIG. 1C.

FIG. 2A is a cross-sectional side view of the captive fastener shown in FIG. 1A. Engagement 130 after snap-in assembly of the fastener and the knob is illustrated. FIG. 2B is a bottom view of the captive fastener shown in FIG. 1A.

Figure 3:
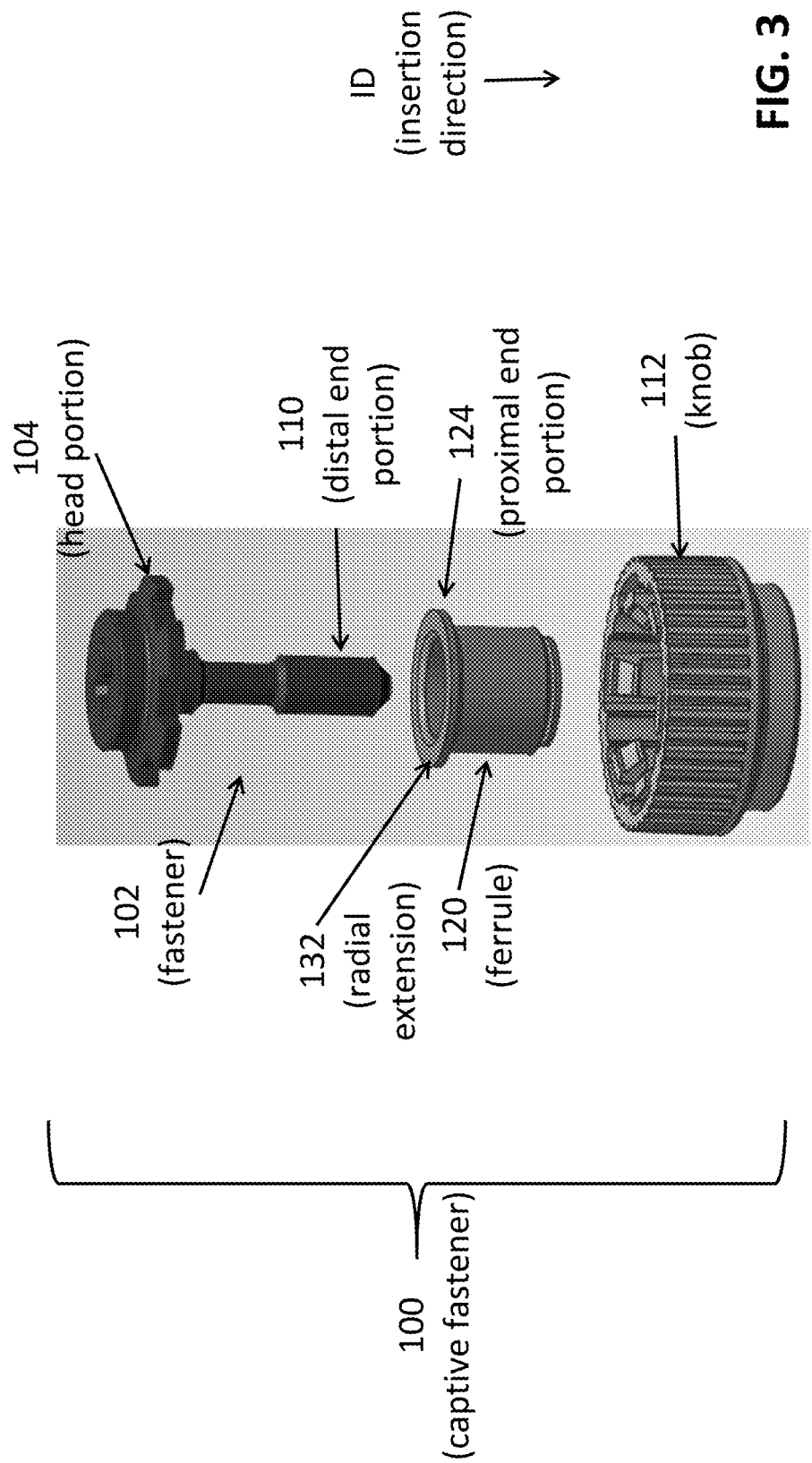
FIG. 3 is an exploded view of the captive fastener shown in FIG. 1A.

FIG. 3 is an exploded view of the captive fastener shown in FIG. 1A. As illustrated in FIG. 3 the fastener and knob are inserted in a distal direction illustrated as insertion direction ID.

FIG. 4A is a perspective view of a knob component of the captive fastener shown in FIG. 1A. FIG. 4B is a perspective view of a fastener component of the captive fastener shown in FIG. 1A.

Figure 5C:
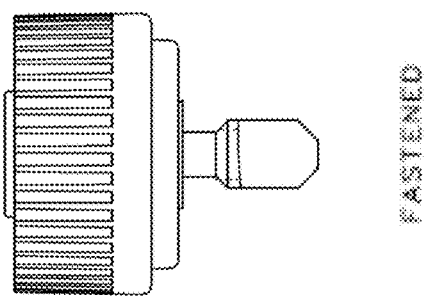
FIG. 5C is a side view of the captive fastener shown in FIG. 1A, in a fastened condition.
Figure 5B:
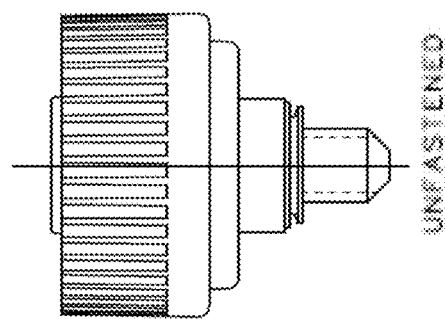
FIG. 5B is a side view of the captive fastener shown in FIG. 1A, in an unfastened condition.
Figure 5A:
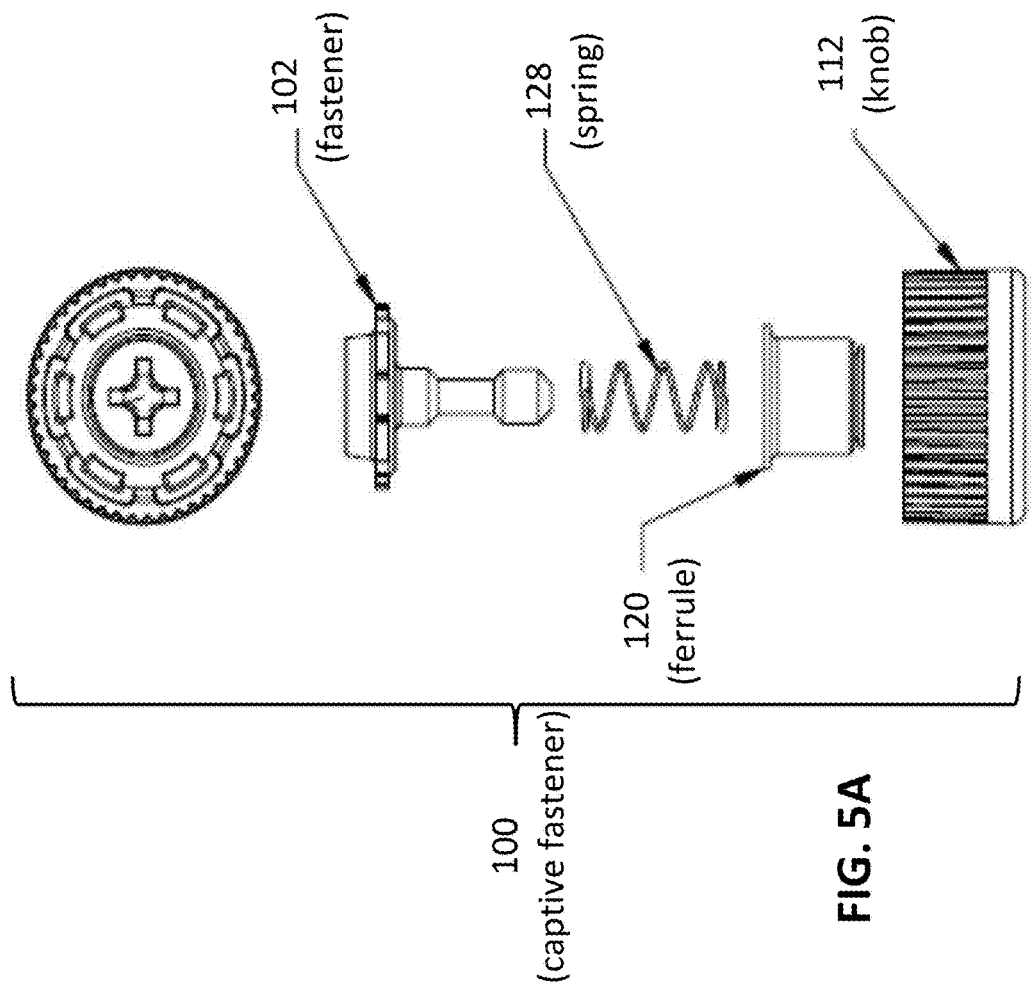
FIG. 5A is an exploded view of the captive fastener shown in FIG. 1A.

FIG. 5A is an exploded view of the captive fastener shown in FIG. 1A. FIG. 5B is a side view of the captive fastener shown in FIG. 1A, in an unfastened condition corresponding generally to the extended position described above. FIG. 5C is a side view of the captive fastener shown in FIG. 1A, in a fastened condition corresponding generally to the compressed position described above.

FIG. 6A is a perspective view of the knob component of the captive fastener shown in FIG. 1A. FIG. 6B is a cross-sectional side view of the knob component of the captive fastener shown in FIG. 1A. FIG. 6C is a top view of the knob component of the captive fastener shown in FIG. 1A. And FIG. 6D is a side view of the knob component of the captive fastener shown in FIG. 1A.

FIG. 7A is a top view of the fastener component of the captive fastener shown in FIG. 1A. FIG. 7B is a perspective view of the fastener component of the captive fastener shown in FIG. 1A. FIG. 7C is a cross-sectional side view of the fastener component of the captive fastener shown in FIG. 1A. And FIG. 7D is another perspective view of the fastener component of the captive fastener shown in FIG. 1A.

FIG. 8A is a side view of a spring component of the captive fastener shown in FIG. 1A. FIG. 8B is an end view of a spring component of the captive fastener shown in FIG. 1A. And FIG. 8C is a perspective view of a spring component of the captive fastener shown in FIG. 1A.

FIG. 9A is a top view of a ferrule component of the captive fastener shown in FIG. 1A. FIG. 9B is a side view of a ferrule component of the captive fastener shown in FIG. 1A. FIG. 9C is a perspective view of a ferrule component of the captive fastener shown in FIG. 1A. And FIG. 9D is a cross-sectional side view of a ferrule component of the captive fastener shown in FIG. 1A. In this embodiment, the distal end portion of the ferrule is configured for press-in engagement to a panel such as a thin panel component that may be formed from sheet metal.

FIG. 10A is an exploded view of a variation of the captive fastener shown in FIG. 1A. FIG. 10B is a cross-sectional side view of the variation of the captive fastener shown in FIG. 10A. FIG. 10C is a top view of the variation of the captive fastener shown in FIG. 10A. In this variation, the ferrule 120A has a distal end portion 126A configured for SMT (Surface Mount Technology) engagement to a printed circuit board or other substrate.

Figure 11B:
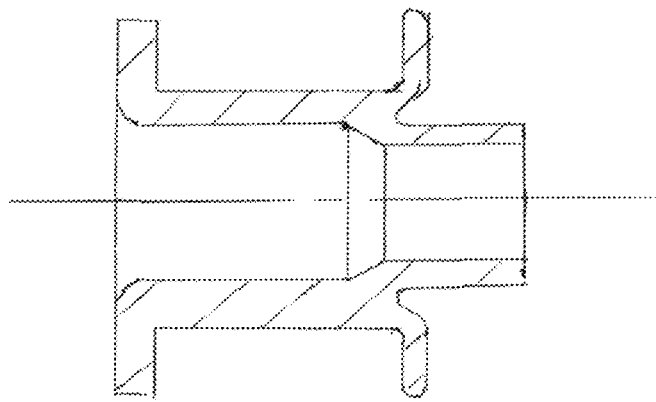
FIG. 11B is a cross-sectional side view of the variation of a ferrule component of the captive fastener shown in FIG. 1A, subsequent to assembly.
Figure 11A:
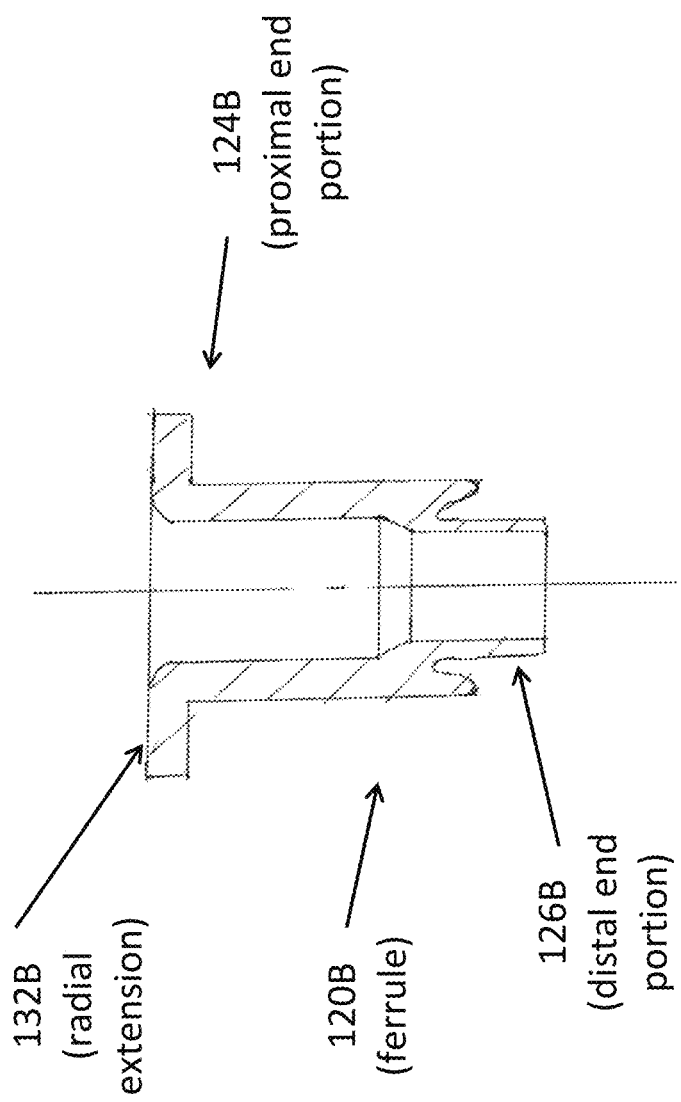
FIG. 11A is a cross-sectional side view of a variation of a ferrule component of the captive fastener shown in FIG. 1A, prior to assembly.

FIG. 11A is a cross-sectional side view of a variation of a ferrule component of the captive fastener shown in FIG. 1A, prior to assembly. FIG. 11B is a cross-sectional side view of the variation of a ferrule component of the captive fastener shown in FIG. 1A, subsequent to assembly. In this embodiment, the ferrule 120B can be inserted into a knob in a distal direction, with the distal end portion 126B collapsed as shown in FIG. 11A so that it can pass through the center of the knob. Upon insertion, the distal end portion 126B can be deformed from the collapsed position as shown in FIG. 11A to an expanded position shown in FIG. 11B so that it can be positioned against the surface of a panel to which it is to be attached, such as by SMT. This deformation of the distal end portion 126B can be achieved by press force along the fastener axis FA an in the insertion direction ID.

FIG. 12A is a side view of the captive fastener shown in FIG. 1A, illustrating rotational movement. FIG. 12B is a side view of the captive fastener shown in FIG. 1A, illustrating axial movement in a distal direction. FIG. 12C is a side view of the captive fastener shown in FIG. 1A, illustrating axial movement in a proximal direction. And FIG. 12D is a side view of the captive fastener shown in FIG. 1A, illustrating pivotal movement. These figures illustrate the qualities and forms of the engagement between the knob and the fastener.

Figure 13:
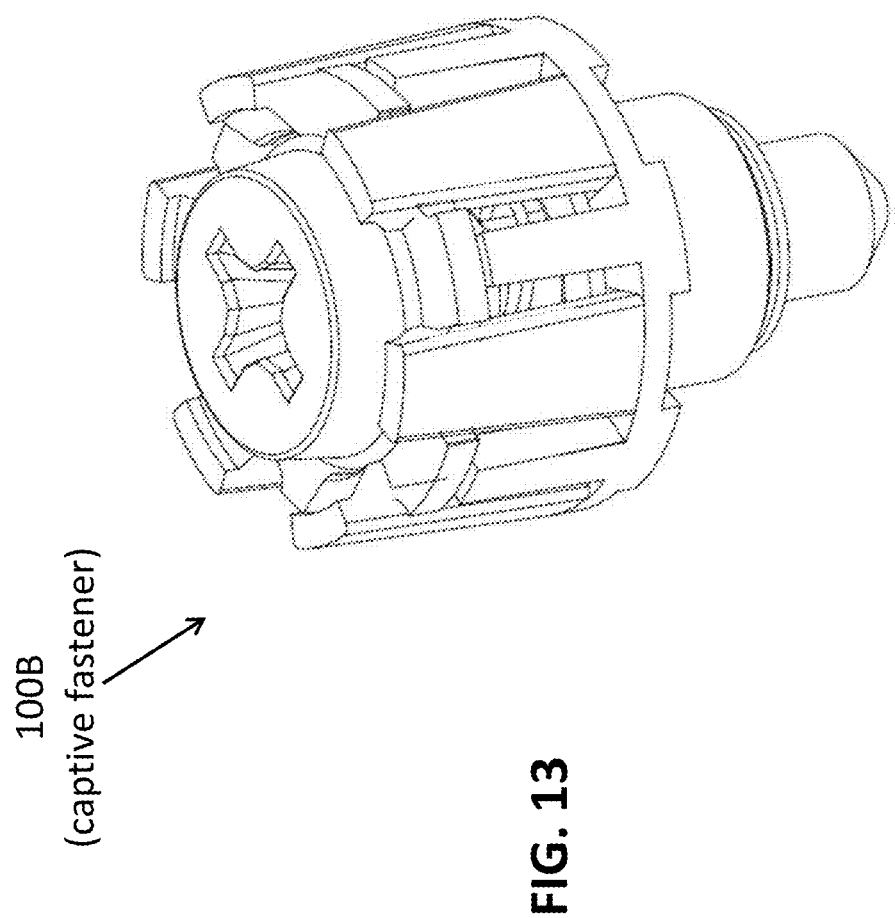
FIG. 13 is a perspective view of another variation of the captive fastener shown in FIG. 1A.

FIG. 13 is a perspective view of another variation of the captive fastener shown in FIG. 1A. In this variant, the knob of the captive fastener 100B is modified to remove the annular wall 156 of the knob 112. This allows for a smaller diameter OD of the captive fastener 100B if required or preferred for a particular application. In addition, knurls (not shown) or other surface features for gripping can be optionally provided on the outer surface of the knob or on a proximally or distally facing surface of the knob.

In the second embodiment and variations thereof illustrated in FIGS. 14 to 18B relating to the captive fastener 200, the knob 212 includes an inner component 260 and an outer component 262 fixed to the inner component 260. The inner component 260 of the knob 212 defines at least one of the distally facing surface 242 of the knob 212 or the proximally facing surface 240 of the knob 212, and the outer component 262 of the knob 212 defines a radially outwardly facing surface 258 positioned for gripping the knob 212. Accordingly, captive fastener 200 differs from captive fastener 100 primarily by providing a two-piece knob.

The inner component 260 of knob 212 includes a leg 246 defining the distally facing surface 242 of the knob 212 or the proximally facing surface 240 of the knob 212. The leg 246 of the inner component 260 of the knob 212 is moveable radially outwardly to move the distally facing surface 242 of the knob 212 or the proximally facing surface 240 of the knob 212 (1) from the engaging position to the extended position, thereby permitting insertion of the head portion 204 of the fastener 202 into the knob 212, and (2) from the extended position to the engaging position, thereby resisting withdrawal of the head portion 204 of the fastener 202 from the knob 212.

The inner component 260 of the knob 212 includes an inner wall 248 defining the proximally facing surface 240 of the knob 212 or the distally facing surface 242 of the knob 212, thereby restricting movement of the head portion of the fastener 202 relative to the knob 212 along the fastener axis FA.

The outer component 262 of the knob 212 has at least one facing surface positioned for mechanical coupling of the outer component 262 of the knob 212 to the inner component 260 of the knob 212 or to the head portion 204 of the fastener 202, thereby preventing separation of the outer component 262 of the knob 212 from the inner component 260 of the knob 212 along the fastener axis FA.

The facing surface of the outer component 262 of the knob 212 includes a distally facing surface 266 positioned to contact the proximally facing surface 234 of the head portion 204 of the fastener 202.

The facing surface of the outer component 262 of the knob 212 also includes a proximally facing surface 264 positioned to contact a distal end portion of the inner component 260 of the knob 212. Optionally, the distal end portion may have a plurality of slots 231, as shown for example, in FIG. 14.

The facing surface 264 of the outer component 262 of the knob 212 is moveable (1) radially outwardly from an engaging position to contact the distal end portion of the inner component 260 of the knob 212 to an extended position, thereby permitting insertion of the inner component 260 of the knob 212 into the outer component 262 of the knob 212, and (2) from the extended position to the engaging position, thereby resisting withdrawal of the inner component 260 of the knob 212 from the outer component 262 of the knob 212.

The knob 212 is configured for snap-in engagement of the inner component 260 of the knob 212 in the outer component 262 of the knob 212 with the facing surface of the outer component 262 of the knob 212 in the engaging position, thereby resisting withdrawal of the inner component 260 of the knob 212 from the outer component 262 of the knob 212.

The outer component 262 of the knob 212 has a transverse surface 268 positioned for contact with the inner component 260 of the knob 212 and/or the head portion 204 of the fastener 202, thereby preventing rotation of the outer component 262 of the knob 212 relative to the inner component 260 of the knob 212 about the fastener axis FA.

Figure 14:
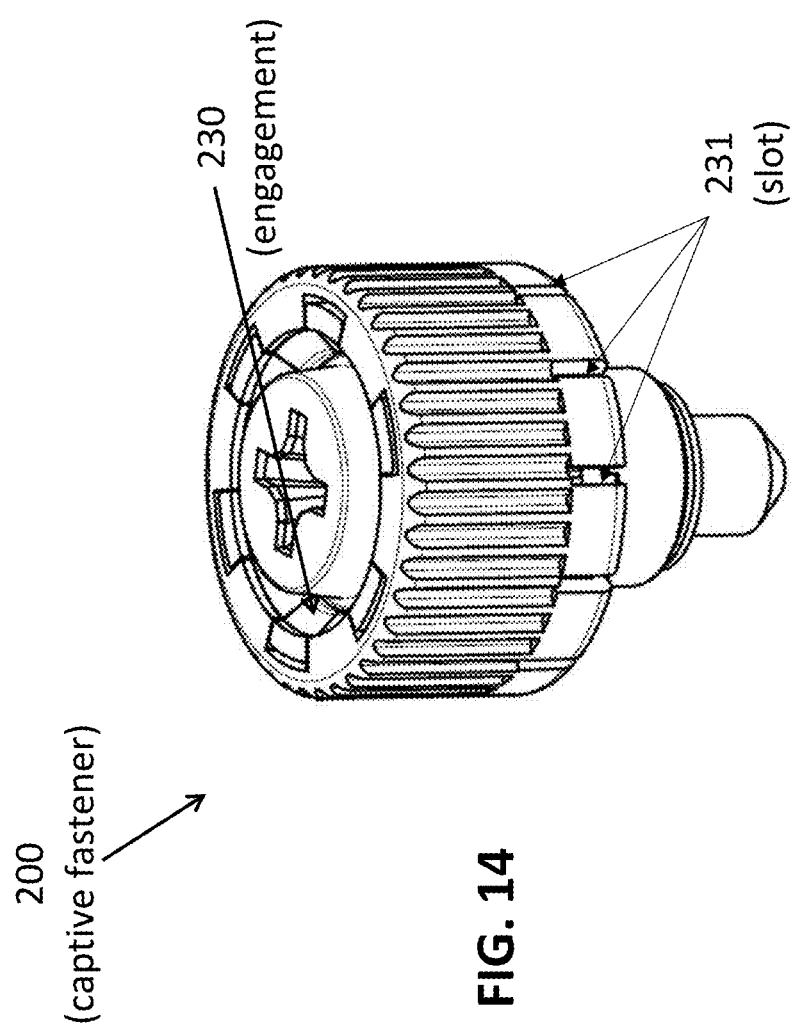
FIG. 14 is a perspective view of a captive fastener according to a second embodiment of the invention.
Figure 15:
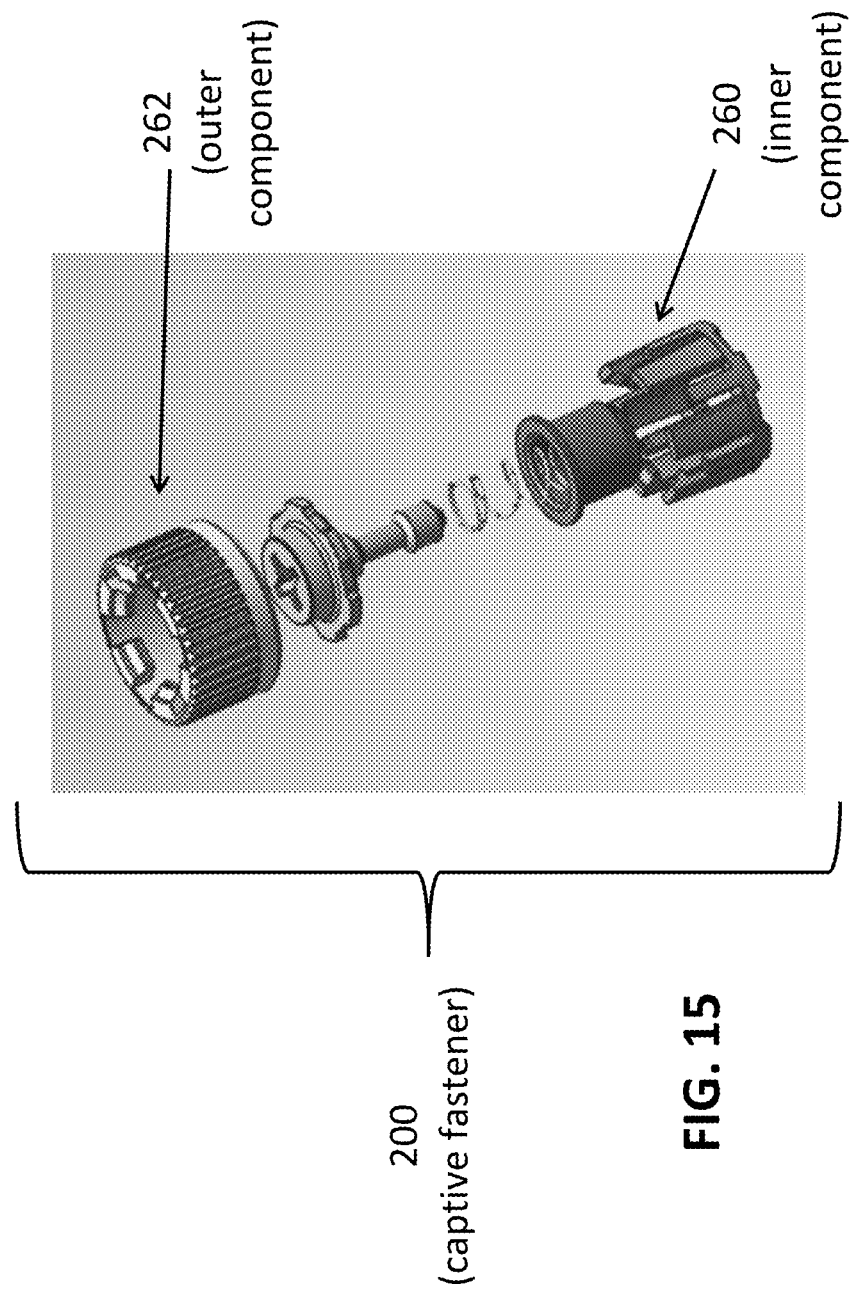
Figure 18B:
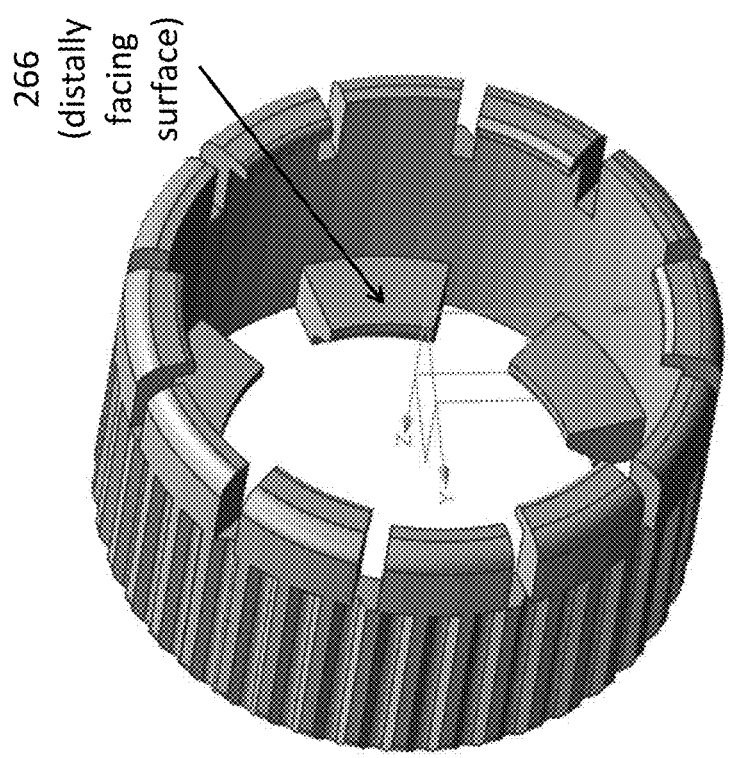
Figure 18A:
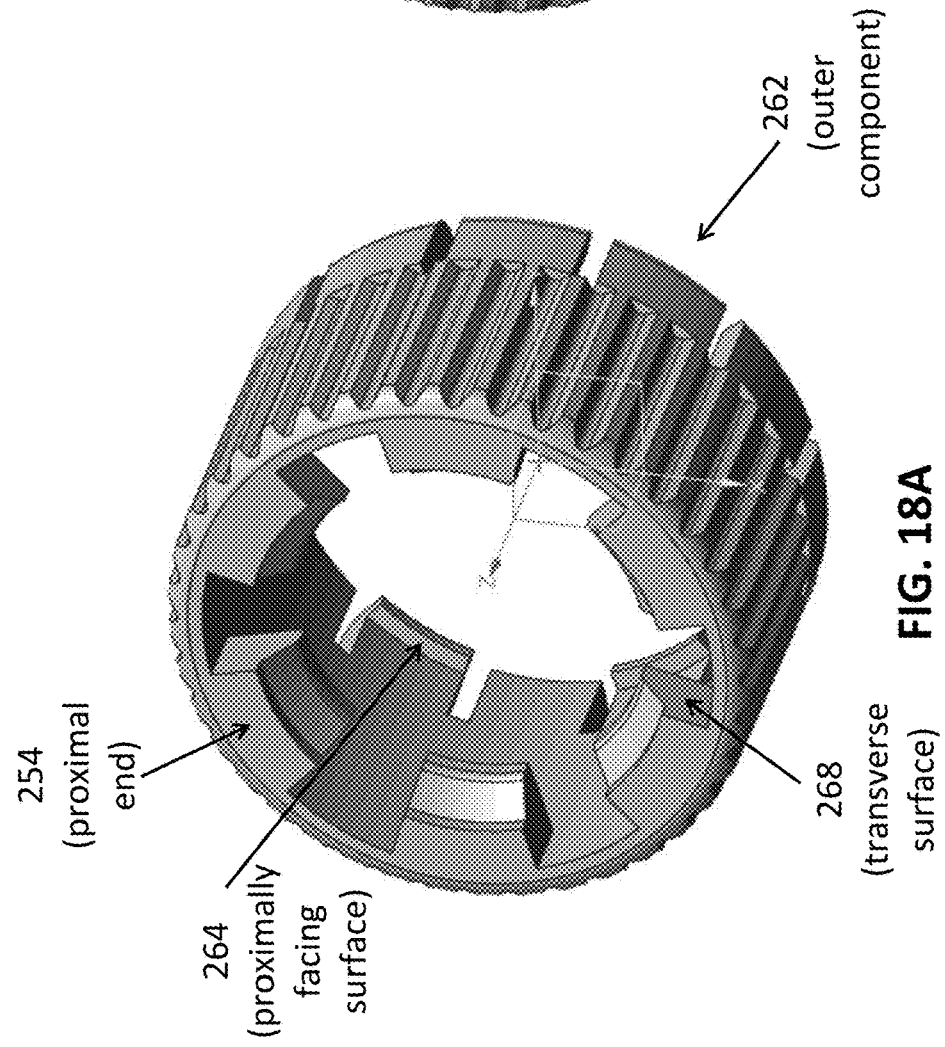

Referring specifically to particular figures illustrating the first embodiment and variations thereof, FIG. 14 is a perspective view of a captive fastener according to the second embodiment of the invention. FIGS. 15 through 18B are views of the captive fastener shown in FIG. 14, including components and variations of the captive fastener.

In the third embodiment and variations thereof illustrated in FIGS. 19A to 23B relating to the captive fastener 300, the knob 312 includes an inner wall 348 defining an annular groove 370, 370A sized to accommodate the head portion 304 of the fastener 302 and defining the distally facing surface 342 of the knob 312 and the proximally facing surface 340 of the knob 312, thereby resisting withdrawal of the head portion 304 of the fastener 302 from the knob 312 upon insertion of the head portion 304 of the fastener 302 into the annular groove 370, 370A defined in the inner wall 348 of the knob 312. Generally speaking, the proximally facing surface 334 may instead extend radially outward or extend in a proximal direction (e.g. upward).

The annular groove 370, 370A defined in the inner wall 348 of the knob 312 is a continuous groove such that at least one of the distally facing surface 342 of the knob 312 and the proximally facing surface 340 of the knob 312 is a continuous surface.

The inner wall 348 of the knob 312 further defines a tapered region 372, 372A adjacent the annular groove 370, 370A and tapering from a larger portion sized to accommodate the head portion 304 of the fastener 302 to a smaller portion sized to resist passage of the head portion 304 of the fastener 302, thereby permitting a pressed insertion of the head portion 304 of the fastener 302 into the annular groove 370, 370A defined in the inner wall 348 of the knob 312.

The smaller portion of the tapered region 372 of the inner wall 348 of the knob 312 defines gaps extending into the annular groove 370, thereby facilitating the is pressed insertion of the head portion 304 of the fastener 302 into the annular groove 370 defined in the inner wall 348 of the knob 312.

The tapered region 372, 372A defined in the inner wall 348 of the knob 312 being positioned adjacent the proximally facing surface 340 defined by the annular groove 370, 370A of the knob 312, thereby permitting the pressed insertion of the head portion 304 of the fastener 302 into the annular groove 370, 370A defined in the inner wall 348 of the knob 312 in the insertion direction ID. In this case, the insertion direction ID is a proximal direction from the distal end portion of the knob 312 along the fastener axis FA.

A perimeter edge of the head portion 304 of the fastener 302 defines the transverse surface 338 of the head portion 304 of the fastener 302. The transverse surface 344 of the knob 312 is formed within the annular groove 370, 370A defined in the inner wall 348 of the knob 312 upon the insertion of the head portion 304 of the fastener 302 into the annular groove 370, 370A. For example, the knob can be formed of non-metallic material or metallic material that can cold flow or deform in response to the insertion of the fastener and the contours of the transverse surface of the fastener. In one embodiment, the transverse surface of the knob is formed after assembly of the fastener into the knob.

Figure 19B:
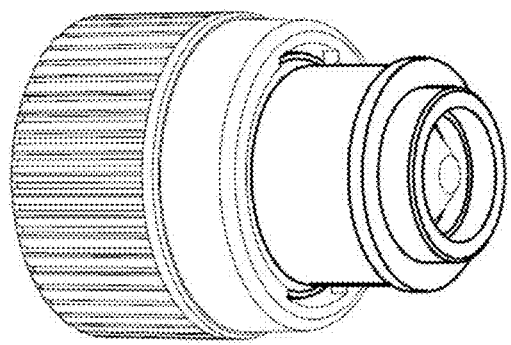
FIGS. 19A and 19B are perspective views of a captive fastener according to a third embodiment of the invention.
Figure 19A:
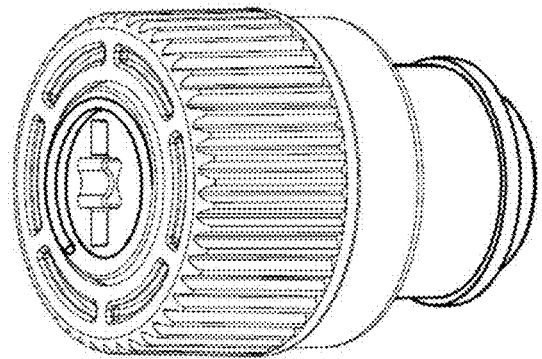
Figure 20B:
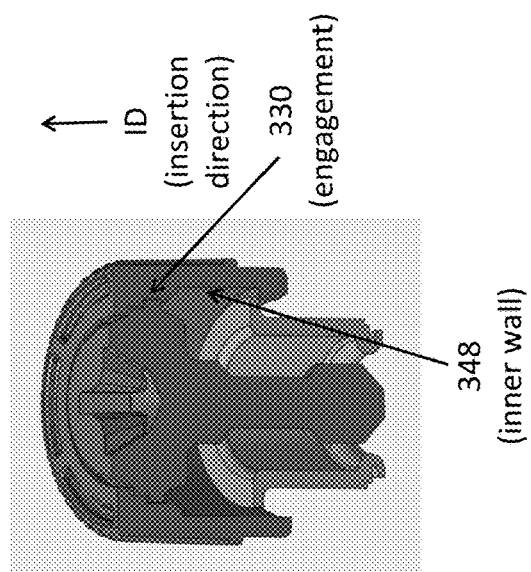
Figure 20C:
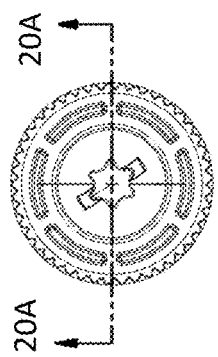
Figure 20A:
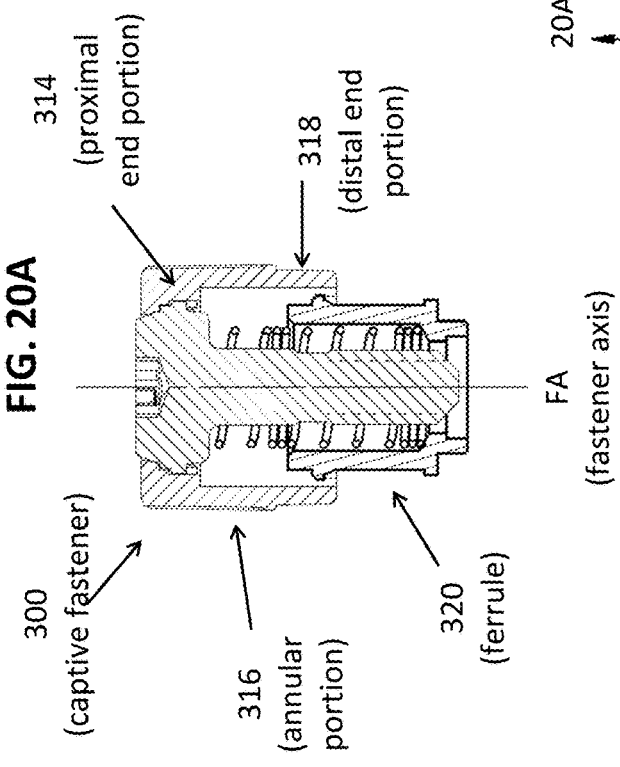
Figure 22B:
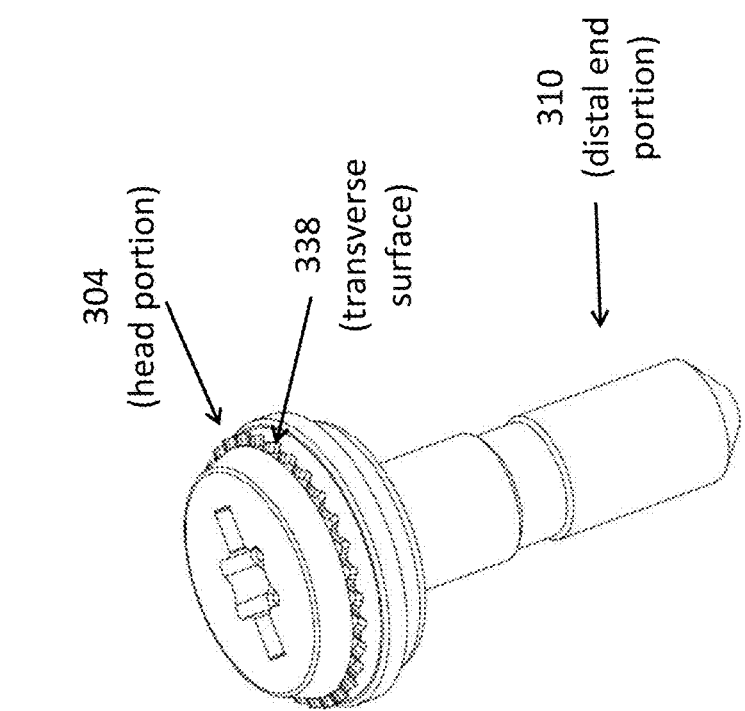
Figure 22A:
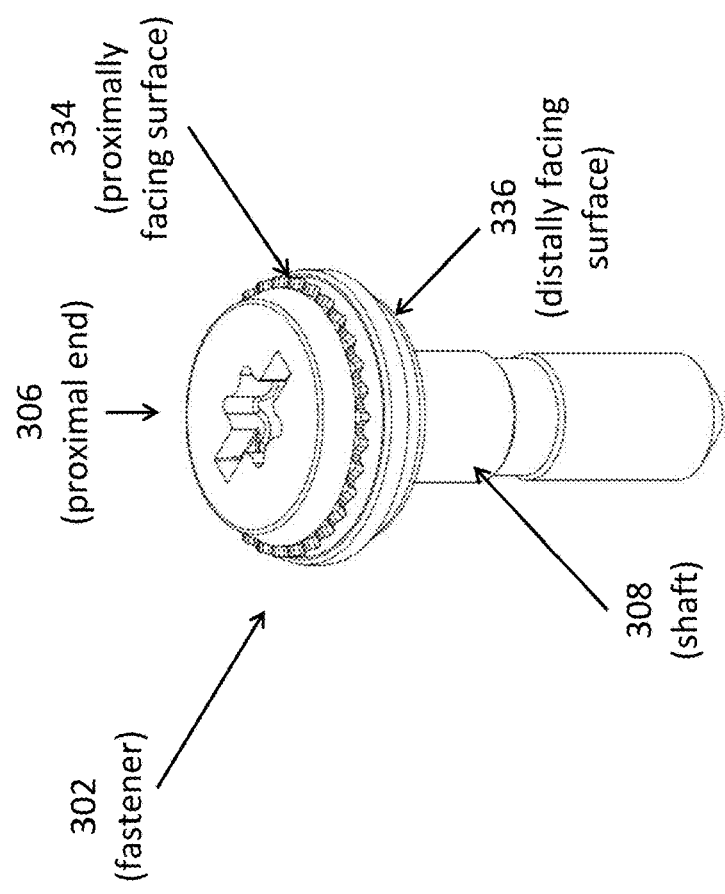
Figure 25A:
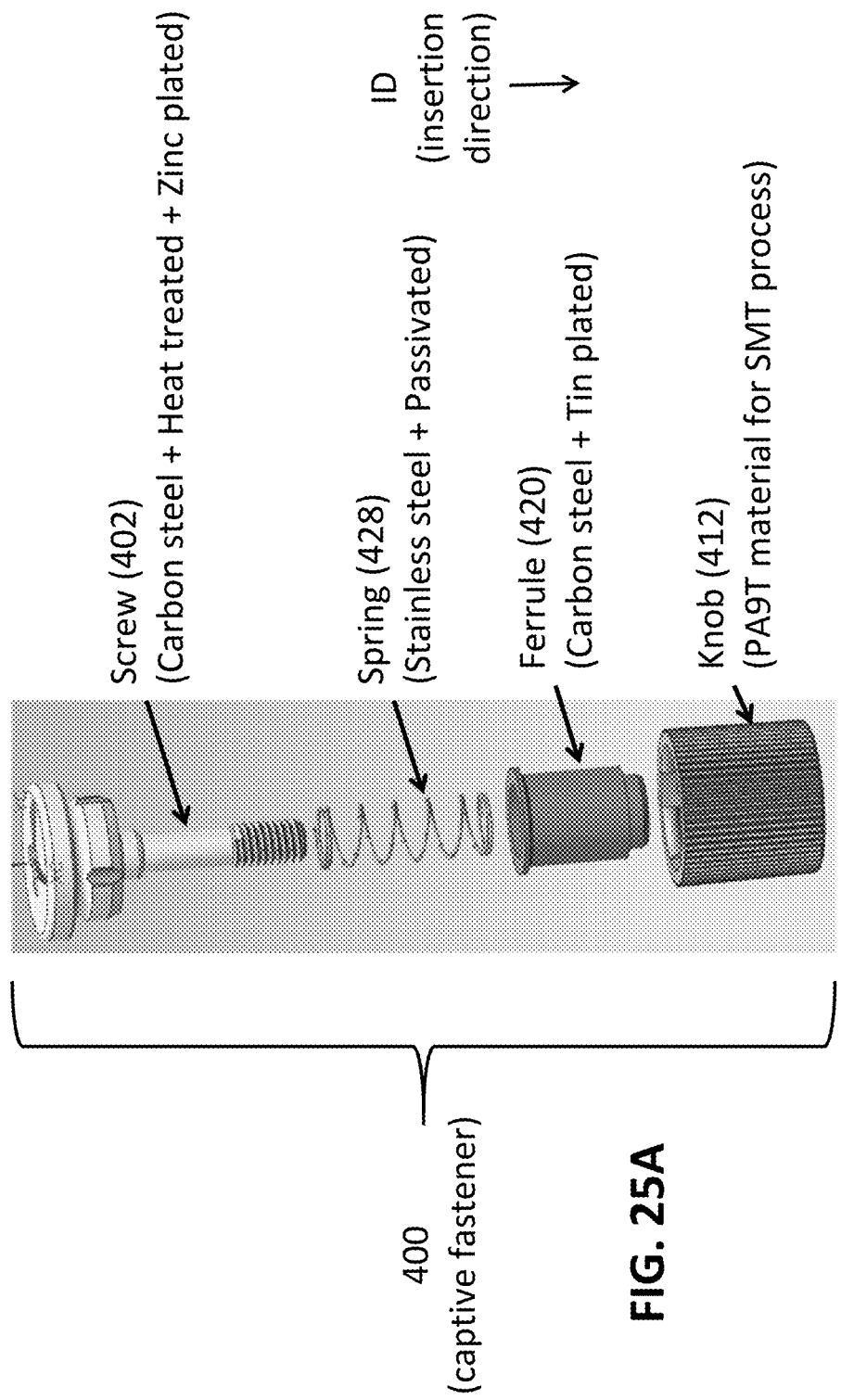
Figures 26A, 26B:
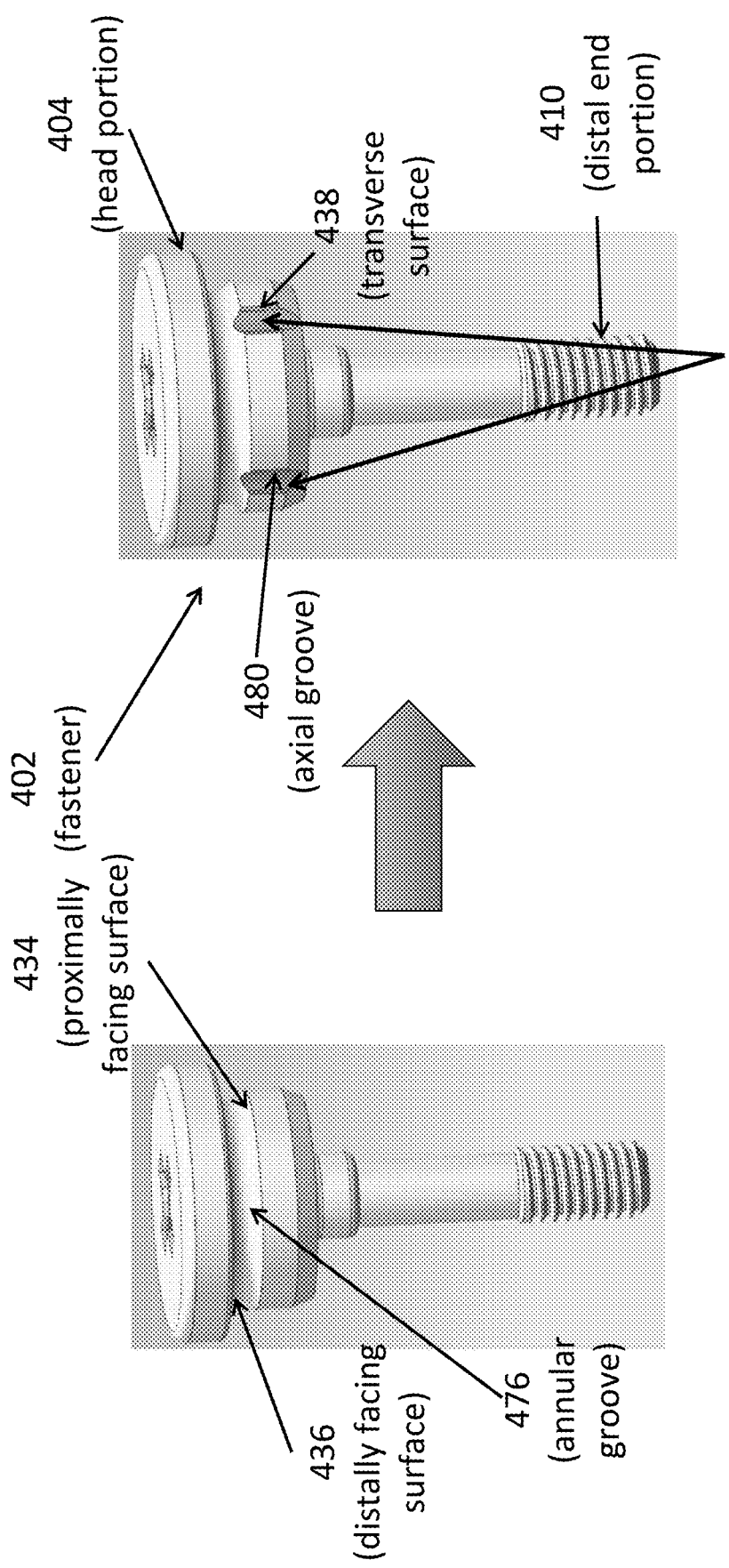
Figures 27A, 27B:
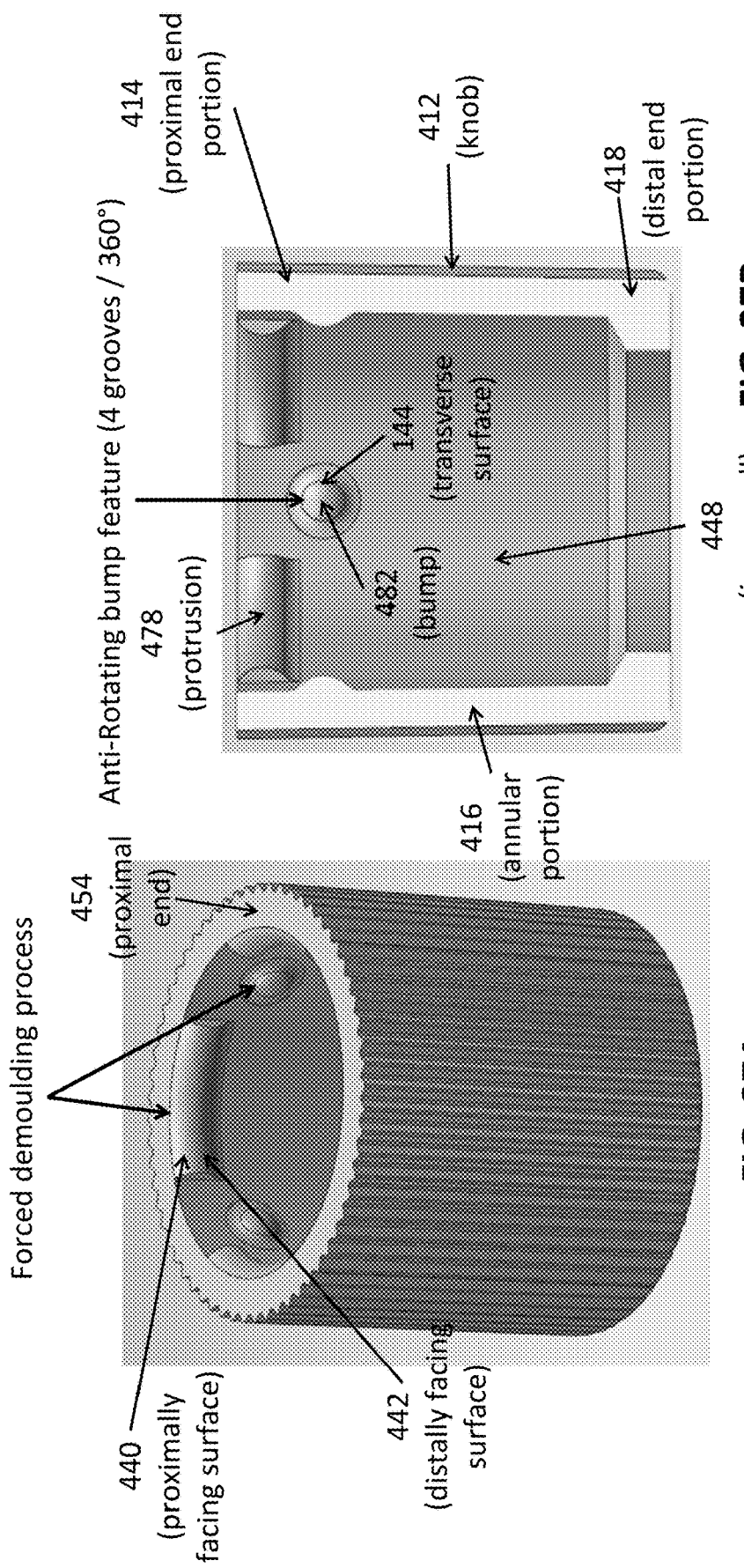
Figure 30:
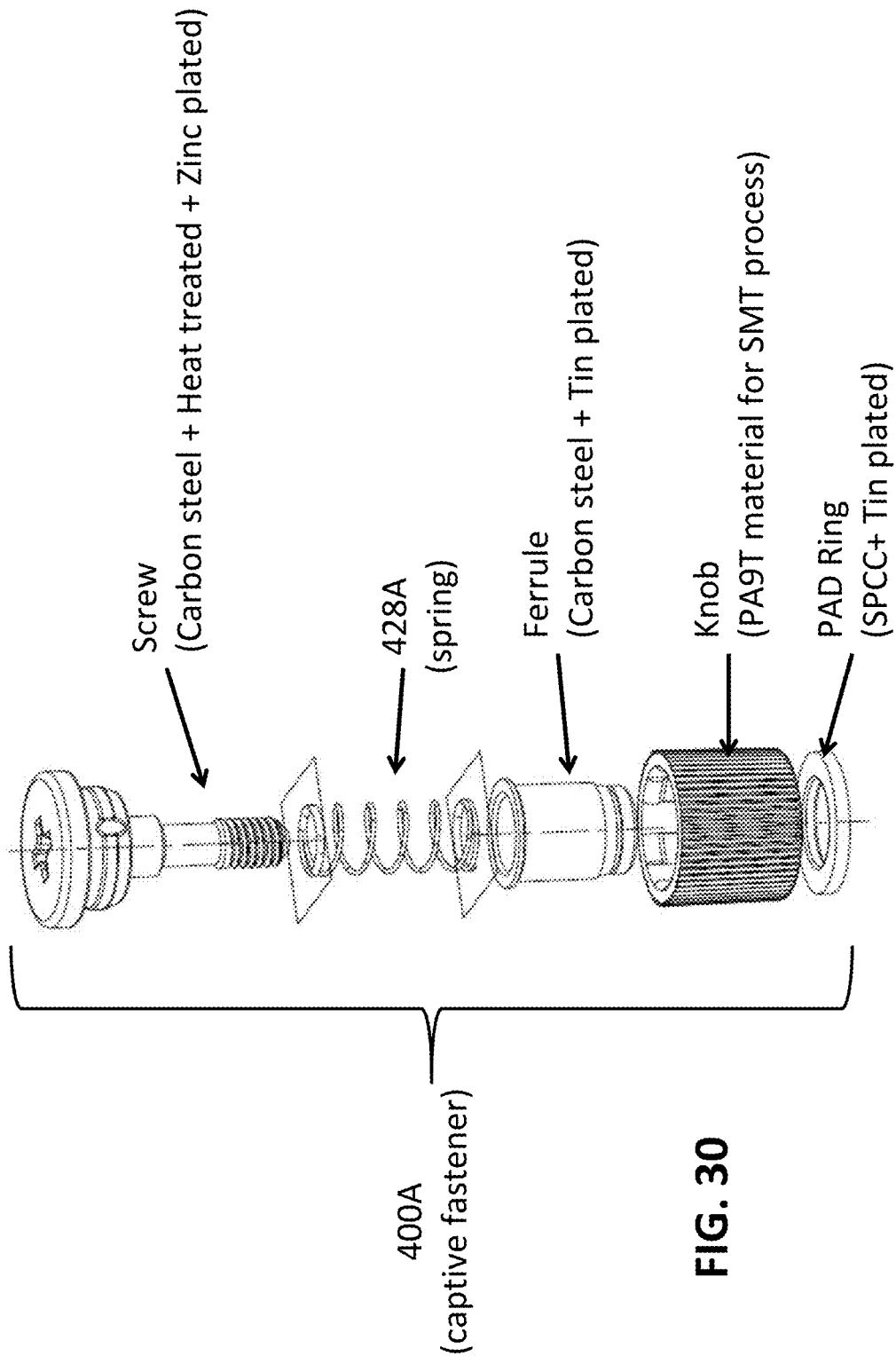
Figure 32C:
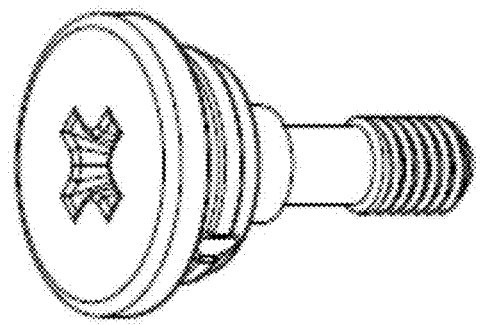
Figure 32A:
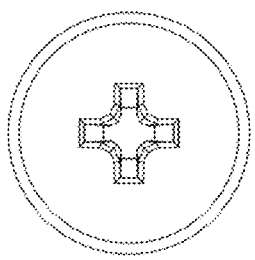
Figure 32B:
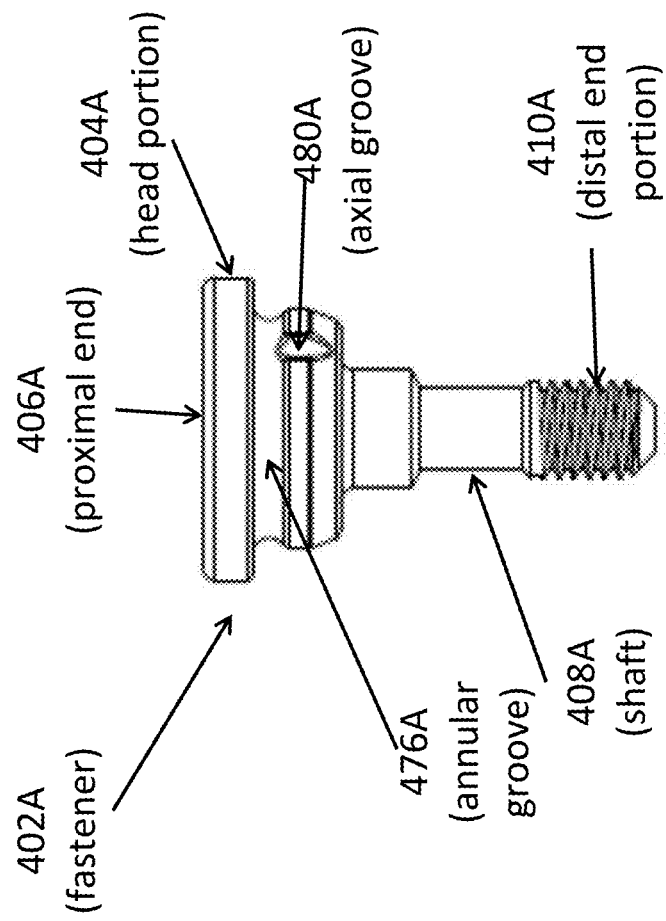
Figure 33C:
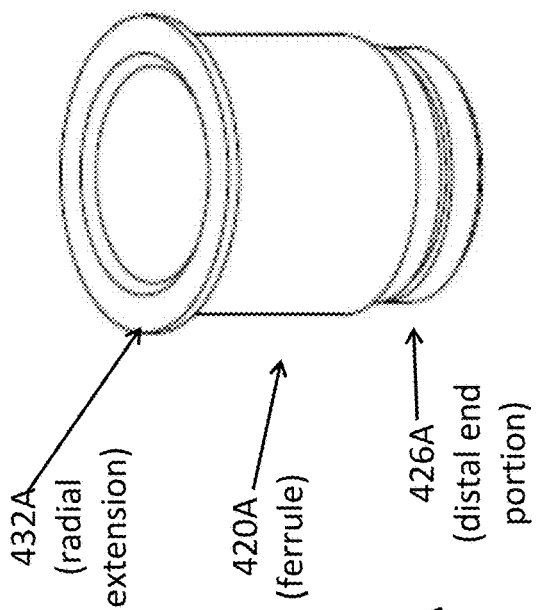
Figure 33B:
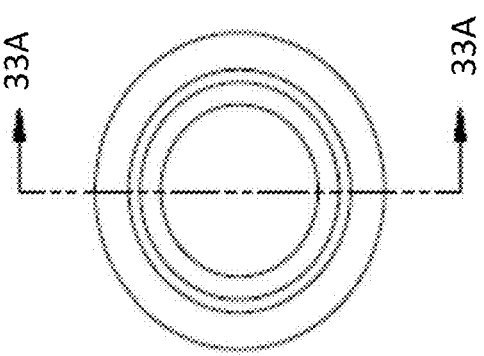
Figure 33A:
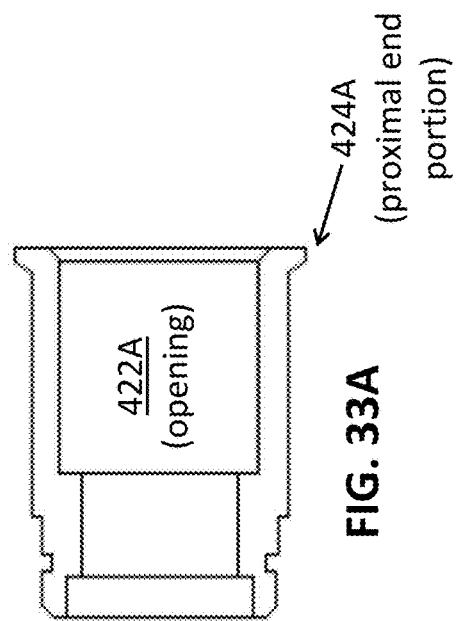
Figure 34C:
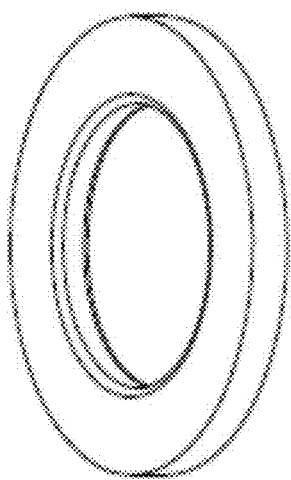
Figure 34B:
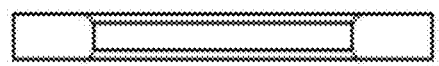
Figure 34A:
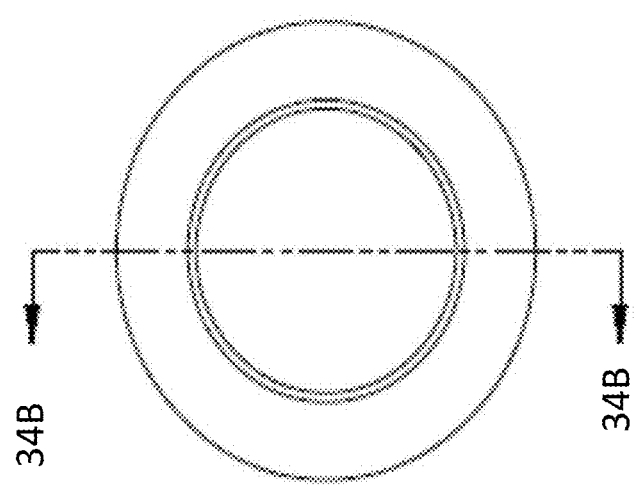
Figure 35B:
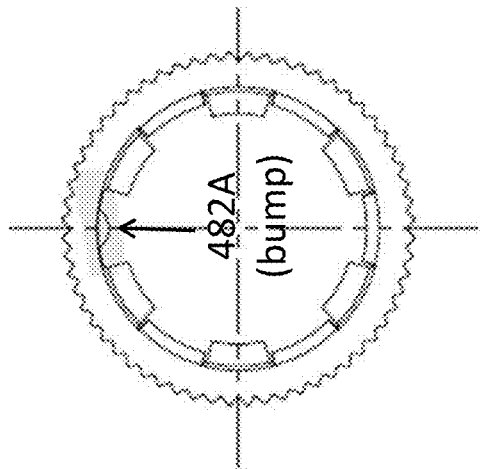
Figure 35A:
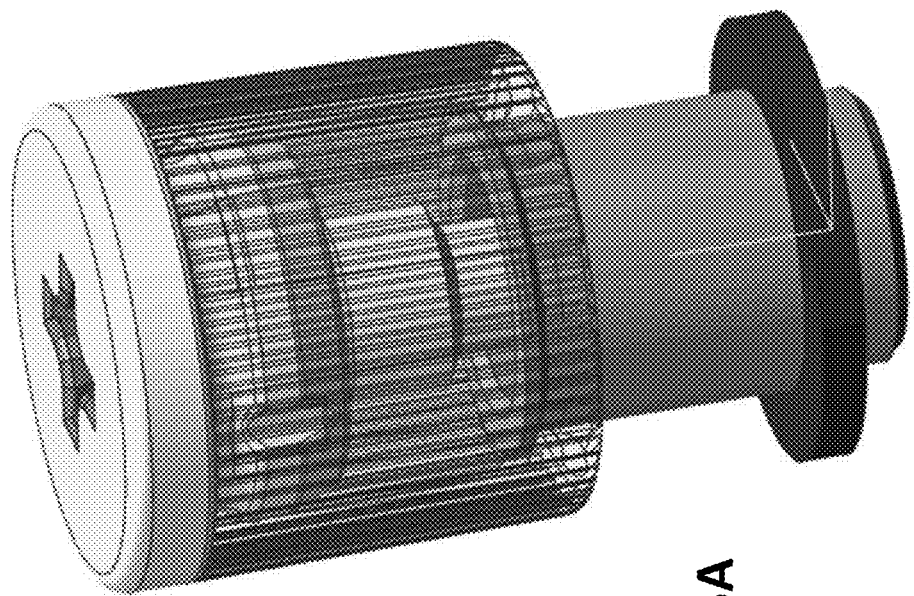
Figure 36D:
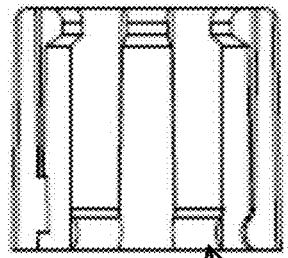
Figure 36C:
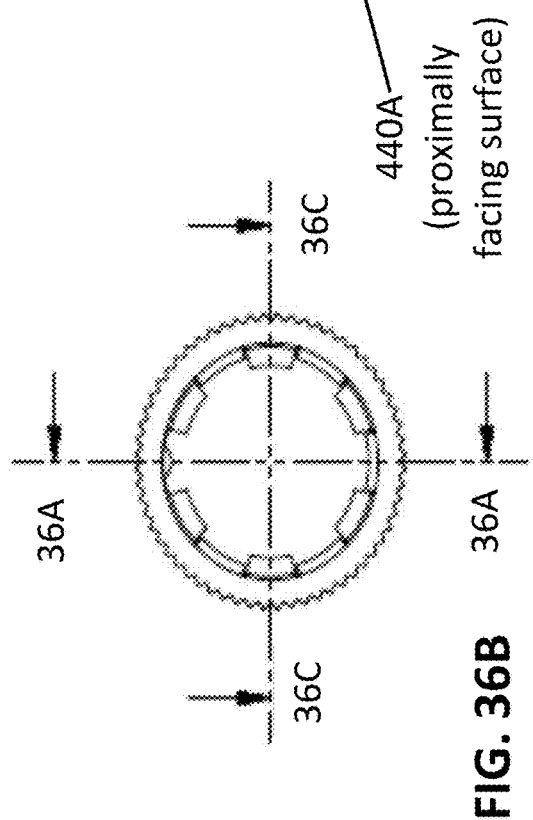
Figure 36A:
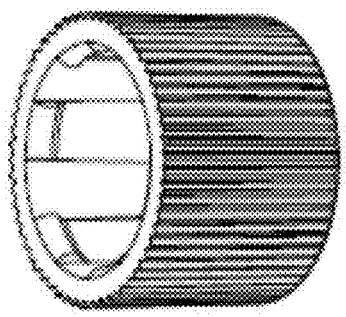
Figure 36B:
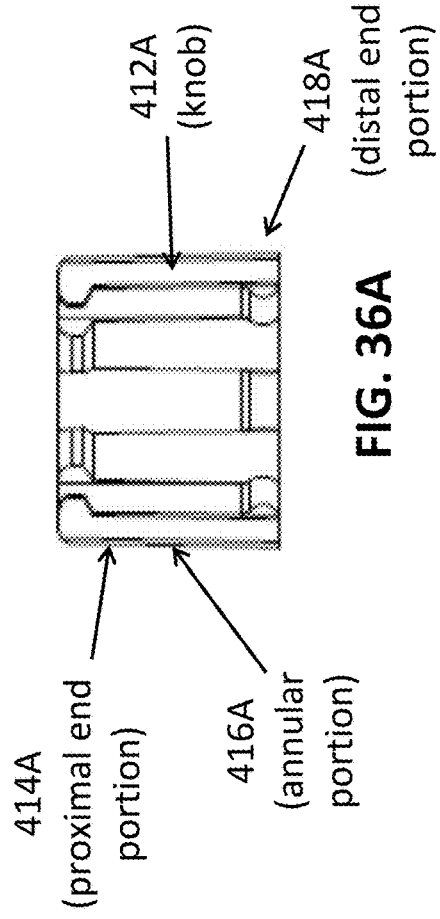

Referring specifically to particular figures illustrating the third embodiment and variations thereof, FIGS. 19A and 19B are perspective views of a captive fastener according to a third embodiment of the invention. FIGS. 20A through 23B are views of the captive fastener shown in FIGS. 19A and 19B, including components and variations of the captive fastener. The insertion direction ID is a proximal direction as indicated in FIG. 20B.

In the fourth embodiment and variations thereof illustrated in FIGS. 24A to 36C relating to the captive fastener 400, the head portion 404 of the fastener 402 defines an annular groove 476, 476A providing the proximally facing surface 434 and the distally facing surface 436 of the head portion 404 of the fastener 402, with the knob 412 having an inner wall 448 having an inwardly extending protrusion 478 providing the proximally facing surface 440 of the knob 412 and the distally facing surface 442 of the knob 412.

The inwardly extending protrusion 478 of the knob 412 is positioned to extend into the annular groove 476, 476A of the head portion 404 of the fastener 402, thereby permitting a pressed insertion of the head portion 404 of the fastener 402 within the inner wall 448 of the knob 412 and resisting withdrawal of the head portion 404 of the fastener 402 from the knob 412. The annular groove 476, 476A defined in the head portion 404 of the fastener 402 is a continuous groove.

The head portion 404 of the fastener 402 further defines at least one axial groove 480, 480A providing the transverse surface 438 of the fastener 402. The knob 412 also includes an inwardly extending bump providing the transverse surface 444 of the knob 412, the inwardly extending bump of the knob 412 being positioned to extend into the axial groove of the head portion 404 of the fastener 402, thereby restricting the rotational movement of the knob 412 relative to the fastener 402 about the fastener axis FA.

Referring specifically to particular figures illustrating the fourth embodiment and variations thereof, FIGS. 24A and 24B are top and cross-sectional side views of a captive fastener according to a fourth embodiment of the invention. FIGS. 25A through 36D are views of the captive fastener shown in FIGS. 24A and 24B, including components and variations of the captive fastener. Captive fastener 400A differs from captive fastener 400 primarily in that that the knob of captive fastener 400A includes a single bump-style protrusion to provide the transverse surface of the knob. Also, captive fastener 400A includes a ferrule 420A that uses a ring or washer 421A for engagement to a panel. FIGS. 31B, 31C, and 31D illustrate positions of the captive fastener 400A with the assembled ferrule 420A.

In addition to captive fasteners in which the knob is mechanically engaged or coupled to the head portion of the fastener, embodiments of the invention also include captive fasteners in which the knob is deformed into engagement with the head portion of the fastener, such as by heat stake assembly. In such embodiments, the captive fasteners can be assembled by coupling separate, pre-formed components (as with mechanically engaged or coupled components). Also, such embodiments permit the forming of the captive fasteners using processes operating along a common fastener axis FA and components assembled along a common insertion direction ID.

Referring generally to the embodiments shown in FIGS. 37A through 57D for illustration, the proximal end portion 514, 614, 714 of the knob 512, 612, 712 is deformed into the engagement with the head portion 504, 604, 704 of the fastener 502, 602, 702. Specifically, the head portion 504, 604, 704 of the fastener 502, 602, 702 has a proximally facing surface 534, 634, 734 facing toward the proximal end of the fastener 502, 602, 702, a distally facing surface 536, 636, 736 facing toward the distal end portion 510, 610, 710 of the fastener 502, 602, 702, and a transverse surface 538, 638, and 738 extending transverse to the proximally facing surface 534, 634, 734 of the head portion 504, 604, 704 of the fastener 504, 604, 704 and the distally facing surface 536, 636, 736 of the head portion 504, 604, 704 of the fastener 502, 602, 702.

The knob 512, 612, 712 has an engagement surface and a transverse surface 544, 644, 744 extending transverse to the engagement surface of the knob 512, 612, 712. The engagement surface of the knob 512, 612, 712 is deformable from (1) an extended position, in which the engagement surface of the knob 512, 612, 712 is disengaged from the head portion 504, 604, 704 of the fastener 502, 602, 702, thereby permitting movement of the head portion 504, 604, 704 of the fastener 502, 602, 702 relative to the knob 512, 612, 712 along the fastener axis FA, and (2) a deformed position, radially inward from the extended position, in which the engagement surface of the knob 512, 612, 712 engages the head portion 504, 604, 704 of the fastener 502, 602, 702, thereby restricting movement of the head portion 504, 604, 704 of the fastener 502, 602, 702 relative to the knob 512, 612, 712 along the fastener axis FA.

The transverse surface 538, 638, 738 of the head portion 504, 604, 704 of the fastener 502, 602, 702 abuts the transverse surface 544, 644, 744 of the knob 512, 612, 712, thereby restricting rotation of the knob 512, 612, 712 relative to the fastener 502, 602, 702 about the fastener axis FA.

In the fifth embodiment and variations thereof illustrated in FIGS. 37A to 43D relating to the captive fastener 500, the knob 512 includes an extension or tab or protrusion of knob material such as a leg 546 defining the engagement surface (a radially inner facing surface of the pre-deformed leg 546). The leg 546 of the knob 512 is deformable radially inwardly relative to the fastener axis FA to move the engagement surface of the knob 512 from the extended position to the deformed position, thereby resisting withdrawal of the head portion 504 of the fastener 502 from the knob 512.

The knob 512 includes an inner wall 548 defining the proximally facing surface 540. The engagement surface of the leg 546 of the knob 512 provides the distally facing surface 542 of the knob 512. The distally facing surface 542 of the engagement surface of the knob 512 abuts the proximally facing surface 534 of the head portion 504 of the fastener 502, and the proximally facing surface 540 of the inner wall 548 of the knob 512 abuts the distally facing surface 536 of the head portion 504 of the fastener 502, thereby restricting movement of the head portion 504 of the fastener 502 relative to the knob 512 along the fastener axis FA.

A perimeter edge of the head portion 504 of the fastener 502 defines the transverse surface 538 of the head portion 504 of the fastener 502. The transverse surface 544 of the knob 512 is provided by a recess defined in an inner wall 548 of the knob 512. The transverse surface 538 of the head portion 504 of the fastener 502 extends into the recess defined in the inner wall 548 of the knob 512, and the transverse surface 538 of the head portion 504 of the fastener 502 abuts the transverse surface 544 of the knob 512, thereby restricting rotational movement of the knob 512 relative to the fastener 502 about the fastener axis FA.

Figures 38A, 38B:
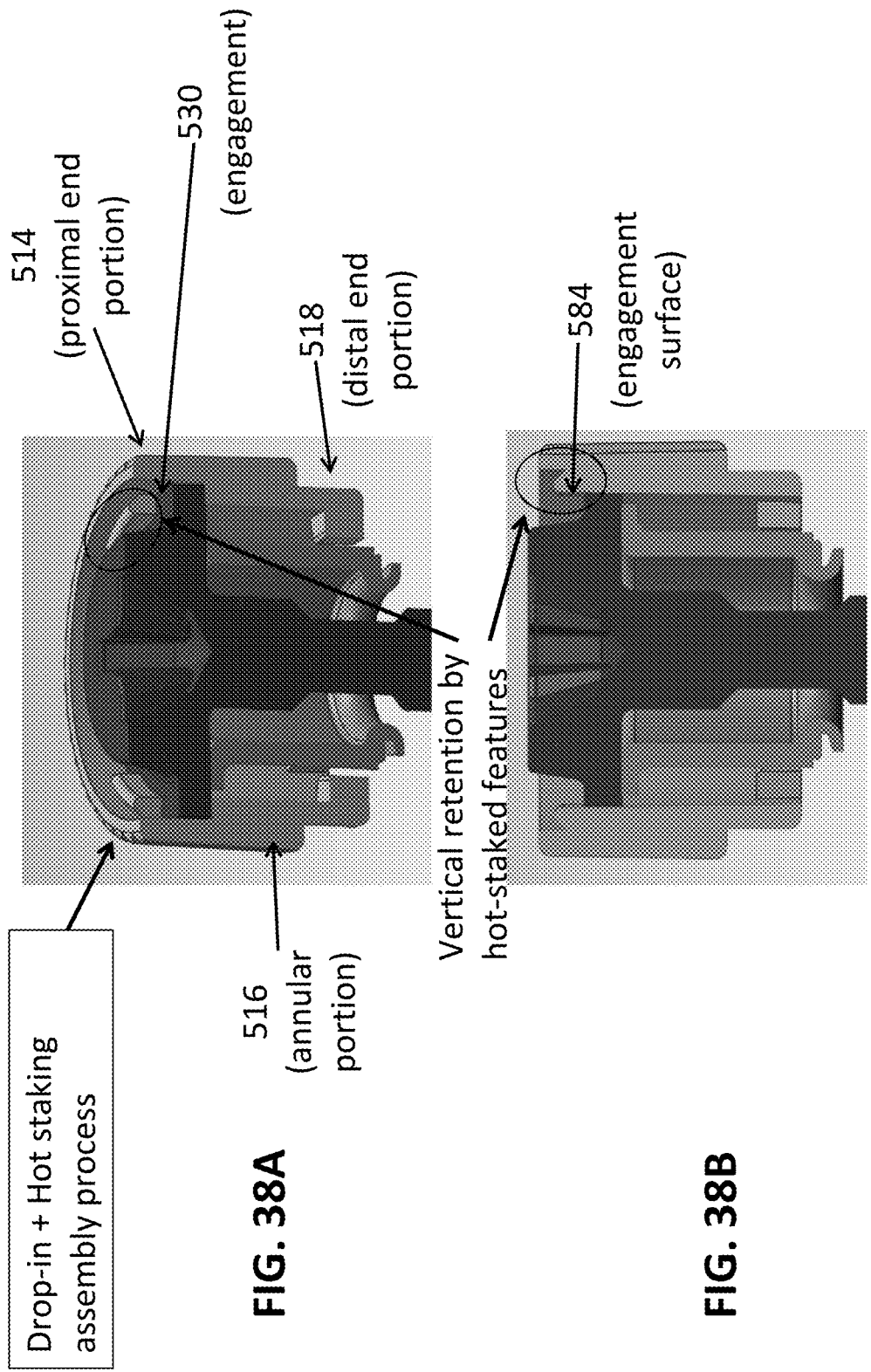
Figure 39:
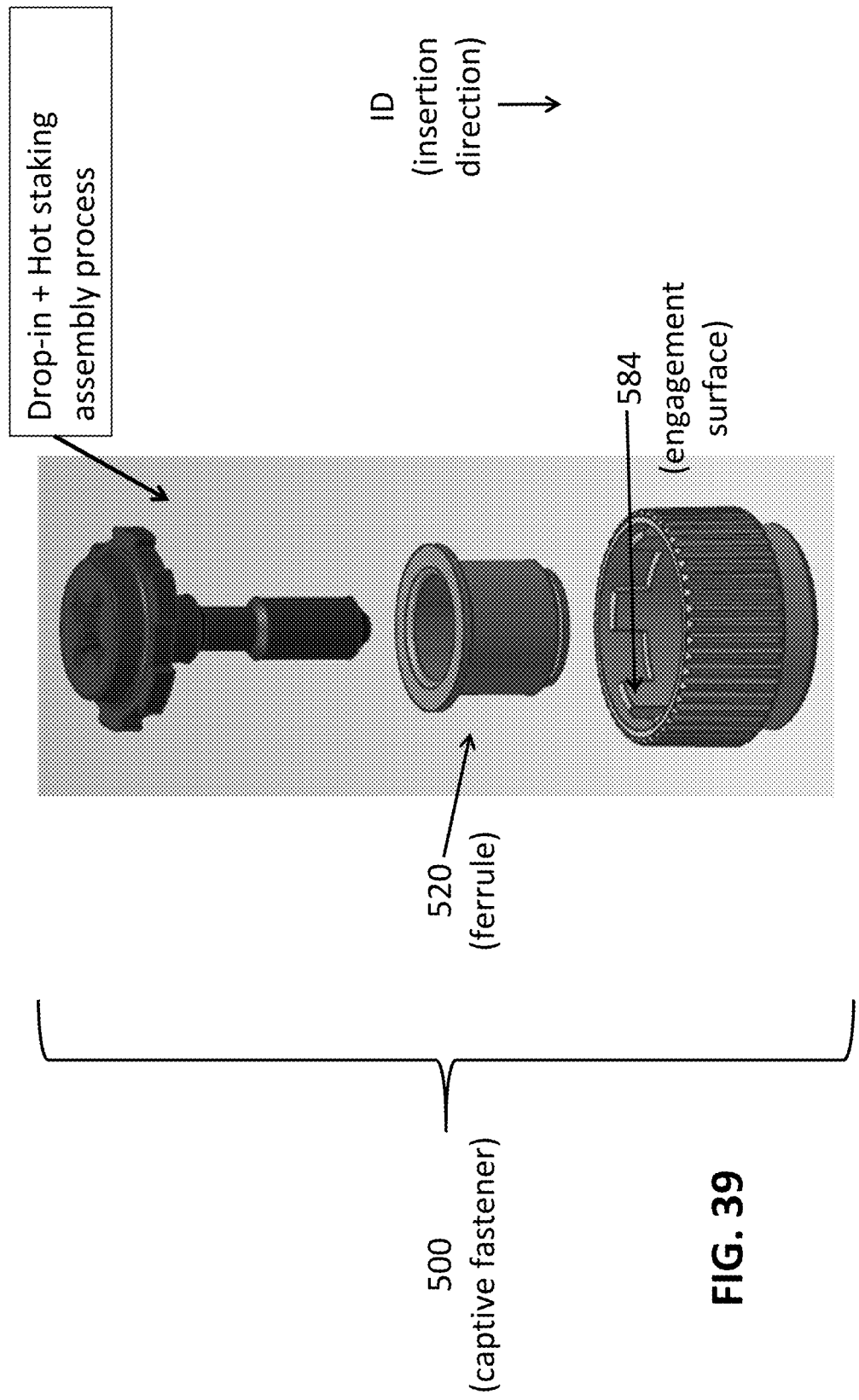
Figures 40A, 40B:
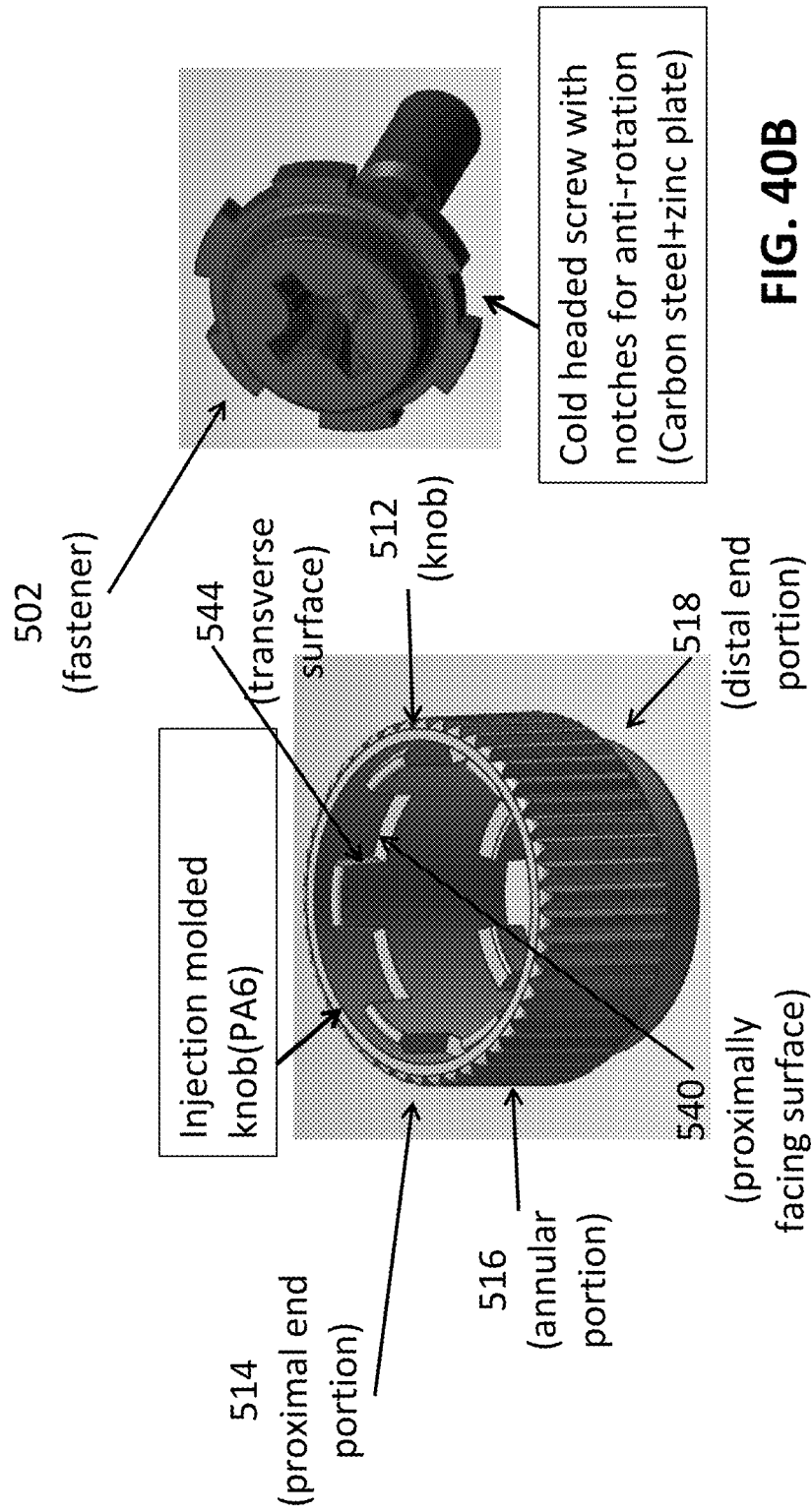
Figure 41D:
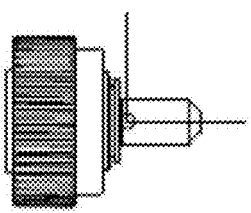
Figure 41C:
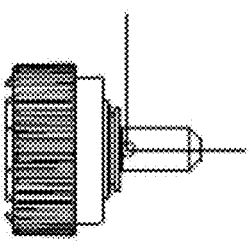
Figure 41B:
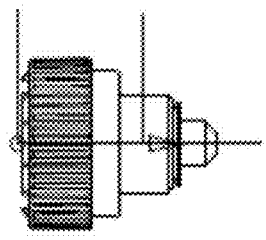
Figure 41A:
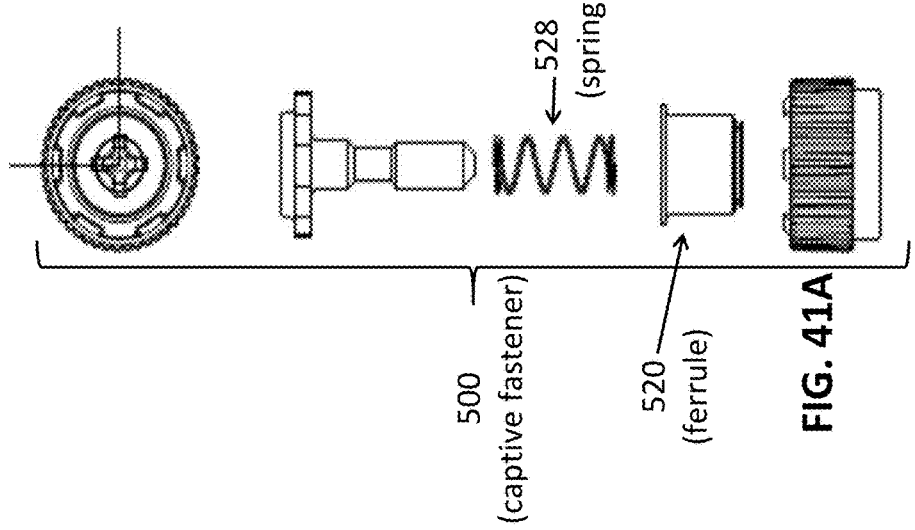

Referring specifically to particular figures illustrating the fifth embodiment and variations thereof, FIGS. 37A through 37C are side and top views of a captive fastener according to a fifth embodiment of the invention. FIGS. 38A through 43D are views of the captive fastener shown in FIGS. 37A through 37C, including components and variations of the captive fastener. In FIG. 38B, the engagement surface 584 is not yet deformed into engagement with the head portion of the fastener. Instead, it is upright and positioned to allow insertion of the fastener into the knob in the distal direction. After deformation, as shown in FIG. 38A, the engagement surface 584 provides engagement 530 to prevent unintended removal of the fastener from the knob. FIGS. 41C and 41D are side views of a captive fastener 500 according to the fifth embodiment of the invention, before and after deformation, respectively. Also, FIG. 41B shows the knob before deformation, albeit in a configuration with the knob extended from the ferrule. Specifically, in FIG. 41C the very top portions of the engagement surfaces of the knob can be seen extending upwardly. In FIG. 41D, however, the engagement surfaces have been deformed downwardly and inwardly to engage the head portion of the fastener. Accordingly, FIG. 41C is before the deformation assembly process and FIG. 41D is after the deformation assembly process is completed.

In the sixth embodiment and variations thereof illustrated in FIGS. 44A to 50E relating to the captive fastener 600, the knob 612 includes a proximal annular edge portion 686 defining the engagement surface. The proximal annular edge portion 686 of the knob 612 is deformable radially inwardly to deform the engagement surface from the extended position to the deformed position, thereby resisting withdrawal of the head portion 604 of the fastener 602 from the knob 612.

Figures 44A, 44B:
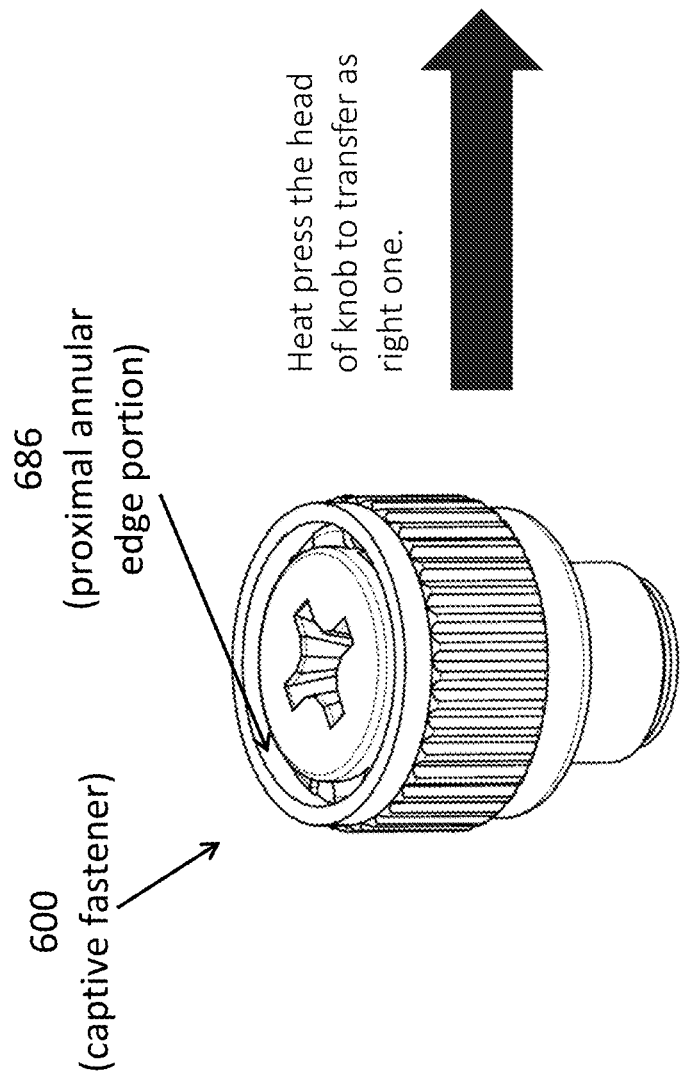
FIGS. 44A and 44B are top views of a captive fastener according to a sixth embodiment of the invention, before and after deformation, respectively.
Figure 45:
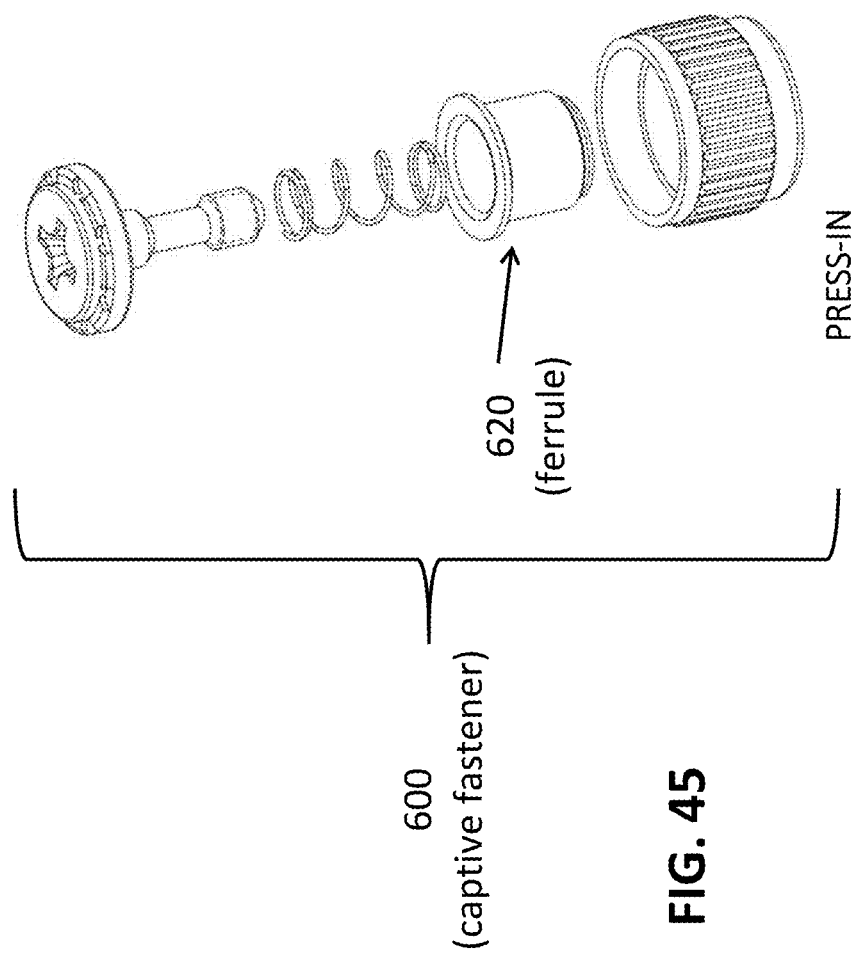

In FIG. 44A, the proximal annular edge portion 686 is not yet deformed, thus allowing insertion of the fastener into the knob from the proximal end of the knob and along a distal insertion direction ID. In FIG. 44B, the proximal annular edge portion 686 is deformed against the proximally facing surface of the head portion of the fastener, thus preventing withdrawal of the fastener from the knob from the proximal end of the knob and along a distal insertion direction ID.

The knob 612 includes an inner wall 648 defining the proximally facing surface 640. The engagement surface of the proximal annular edge portion of the knob 612 abuts the proximally facing surface 634 of the head portion 604 of the fastener 602, and the proximally facing surface 640 of the inner wall 648 of the knob 612 abuts the distally facing surface 636 of the head of the fastener 602, thereby restricting movement of the head portion 604 of the fastener 602 relative to the knob 612 along the fastener axis FA.

The knob 612 has an inner wall 648 defining the proximally facing surface 640. The engagement surface of the proximal annular edge portion 686 of the knob 612 provides the distally facing surface 642 of the knob 612. The distally facing surface 642 of the engagement surface abuts the proximally facing surface 634 of the head portion 604 of the fastener 602, and the proximally facing surface 640 of the inner wall 648 of the knob 612 abuts the distally facing surface of the head portion 604 of the fastener 602, thereby restricting movement of the head portion 604 of the fastener 602 relative to the knob 612 along the fastener axis FA.

The proximally facing surface 634 of the head portion 604 of the fastener 602 provides the transverse surface 638 of the head portion 604 of the fastener 602, and the engagement surface of the proximal annular edge portion of the knob 612 is deformed to provide the transverse surface 644 of the knob 612. The transverse surface 644 of the knob 612 is formed on the engagement surface of the knob 612 upon deforming the engagement surface from the extended position to the deformed position, thereby restricting rotation of the knob 612 relative to the fastener 602 about the fastener axis FA.

Figure 46C:
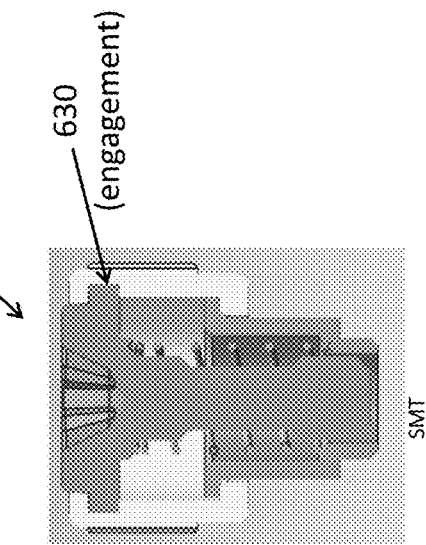
Figure 46B:
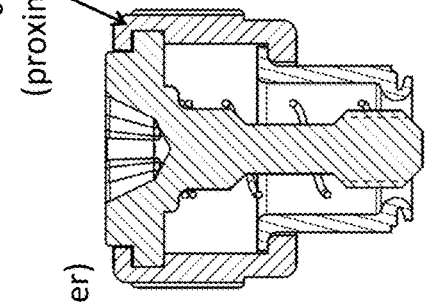
Figure 46A:
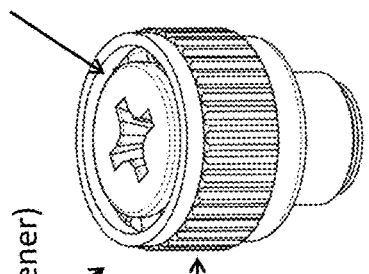
Figure 46D:
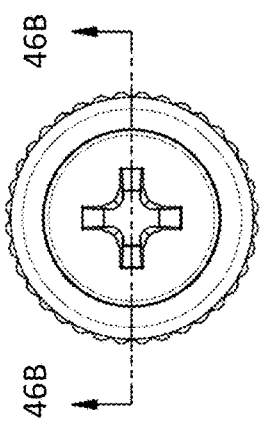
Figure 47:
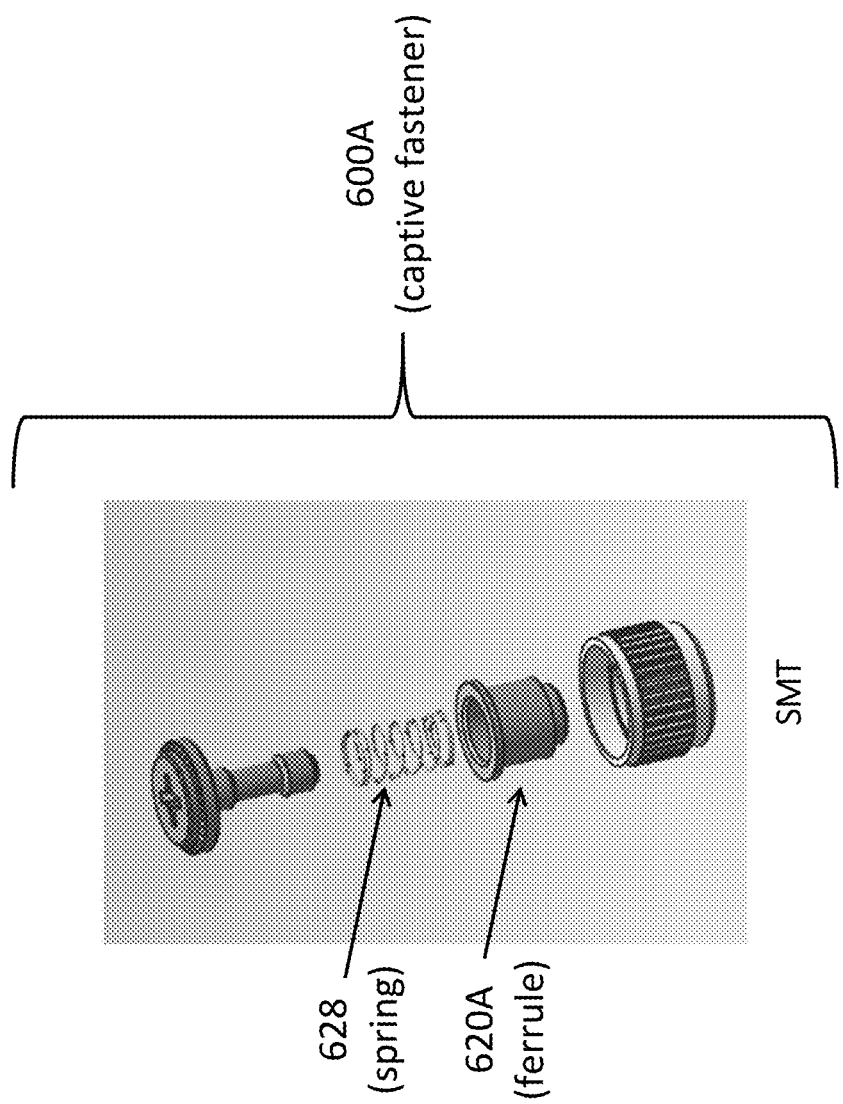
Figure 48D:
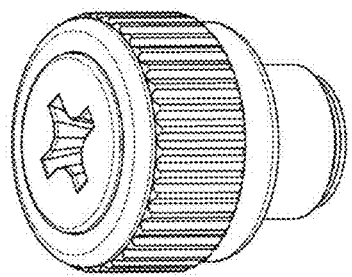
Figure 48C:
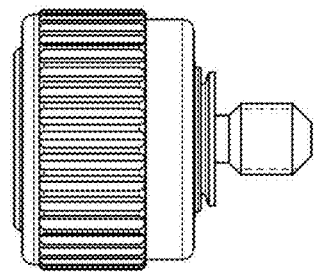
Figure 48B:
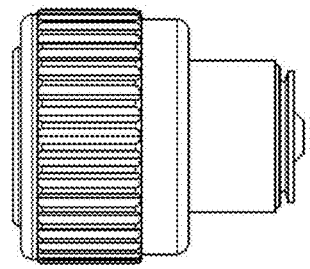
Figure 48A:
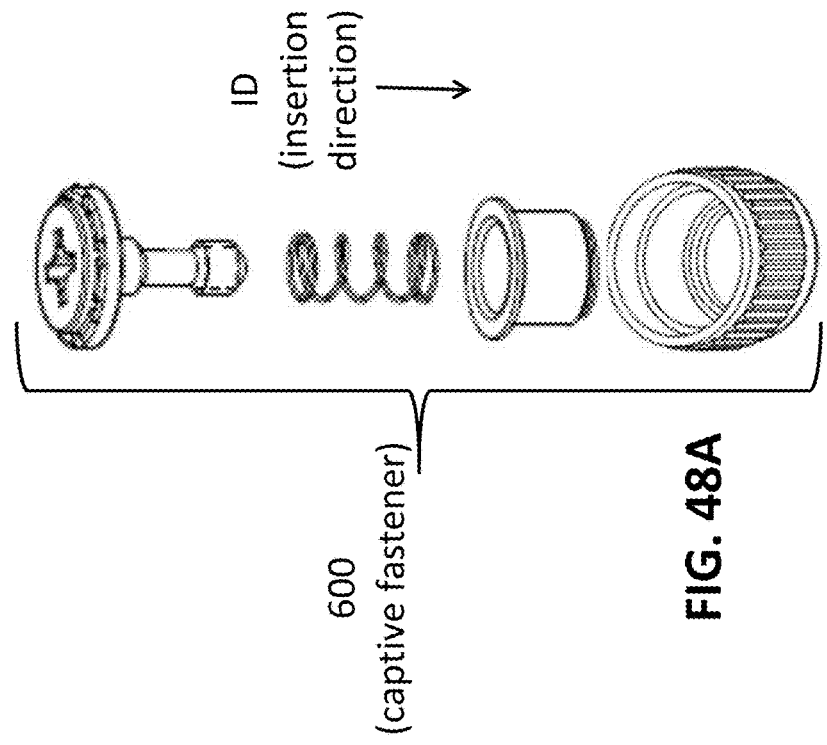

Referring specifically to particular figures illustrating the sixth embodiment and variations thereof, FIGS. 44A and 44B are top views of a captive fastener according to a sixth embodiment of the invention, before and after deformation, respectively. FIGS. 45 through 50E are views of the captive fastener shown in FIGS. 44A and 44B, including components and variations of the captive fastener. As shown in FIGS. 46B and 46C, the captive fastener 600 can be configured with a press-in style ferrule or with an SMT ferrule. Additionally, each of the captive fastener embodiments illustrated in the figures can be configured with any type of ferrule. Accordingly, none of the embodiments are limited to the types of ferrules illustrated in the figures and can utilize any style of ferrule, including flare ferrules, SMT ferrules, press-in ferrules and other ferrule styles.

In the seventh embodiment and variations thereof illustrated in FIGS. 51A to 57D relating to the captive fastener 700, the knob 712 comprises a proximal component 788 and a distal component 790. The proximal component 788 defines the engagement surface of the knob 712 and the distal component 790 defines the transverse surface 744 of the knob 712. The proximal component 788 of the knob 712 is heat bonded to the distal component 790 of the knob 712, thereby resisting separation of the proximal component 788 of the knob 712 from the distal component 790 of the knob 712 and withdrawal of the head portion 704 of the fastener 702 from the knob 712.

The proximal component of the knob 712 has an annular protrusion 792 that extends in a general direction along or parallel to the fastener axis FA. The annular protrusion 792 is deformed as the engagement surface of the proximal component 788 of the knob 712 is deformed from the extended position to the deformed position.

As described above, the proximal component 788 of the knob 712 is heat bonded to the distal component 790 of the knob 712. The heat bonding process can include any bonding process, such as for example thermal bonding or melt bonding or ultrasonic bonding or welding or sonic welding or other forms of bonding metallic or non-metallic materials. For example, ultrasonic welding is suitable for bonding thermoplastic materials. In one example, a tool and/or die can be moved along the fastener axis into contact with the knob in order to bring about the deformation or bonding of the knob component or components.

Additionally, for example in connection with the fifth, sixth, and seventh embodiments, such a tool and/or die can be moved along the fastener axis into contact with the knob in order to bring about the deformation or bonding of the knob component or components to engage the fastener within the knob. The tool or die can be shaped to form a surface of the knob or to permanently move a portion of the knob into an engagement position.

The distal component 790 of the knob 712 has an inner wall 748 defining the proximally facing surface 740. The engagement surface of the proximal component of the knob 712 provides the distally facing surface 742 of the knob 712. The distally facing surface 742 of the engagement surface abuts the proximally facing surface 734 of the head portion 704 of the fastener 702, and the proximally facing surface 740 of the inner wall 748 of the knob 712 abuts the distally facing surface 736 of the head portion 704 of the fastener 702, thereby restricting movement of the head portion 704 of the fastener 702 relative to the knob 712 along the fastener axis FA.

A perimeter edge of the head portion 704 of the fastener 702 defines the transverse surface 738 of the head portion 704 of the fastener 702. The transverse surface 744 of the knob 712 being provided by a recess defined in an inner wall 748 of the knob 712. The transverse surface 738 of the head portion 704 of the fastener 702 extends into the recess defined in the inner wall 748 of the knob 712, and the transverse surface 738 of the head portion 704 of the fastener 702 abuts the transverse surface 744 of the knob 712, thereby restricting rotational movement of the knob 712 relative to the fastener 702 about the fastener axis FA.

Figure 51C:
FIGS. 51A through 51C are top, side, and perspective views of a captive fastener according to a seventh embodiment of the invention.
Figure 51B:
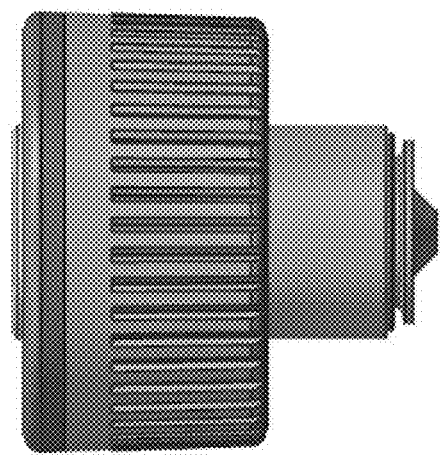
Figure 51A:
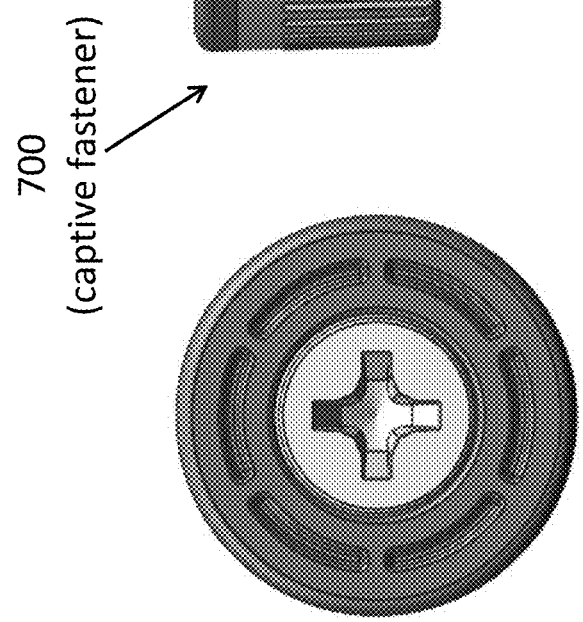
Figure 54A:
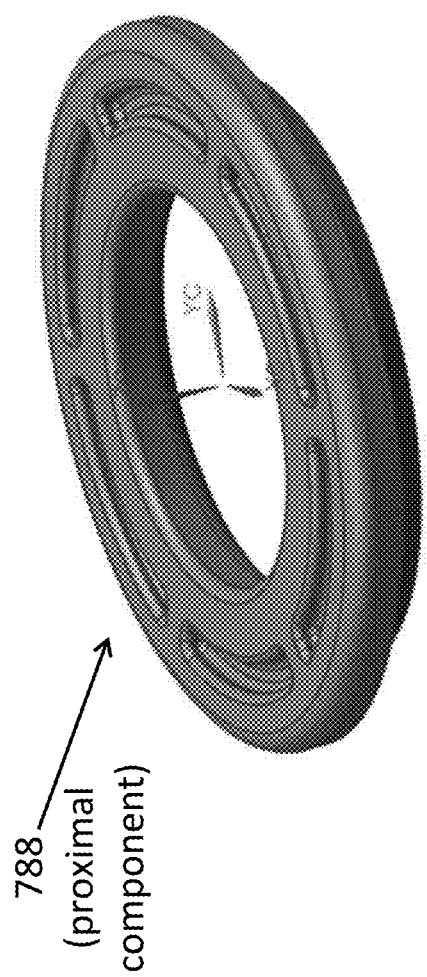
Figure 54B:
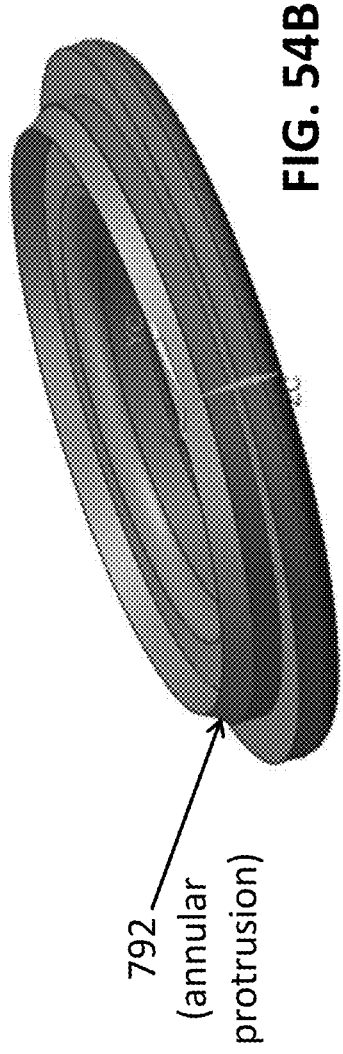
Figure 55:
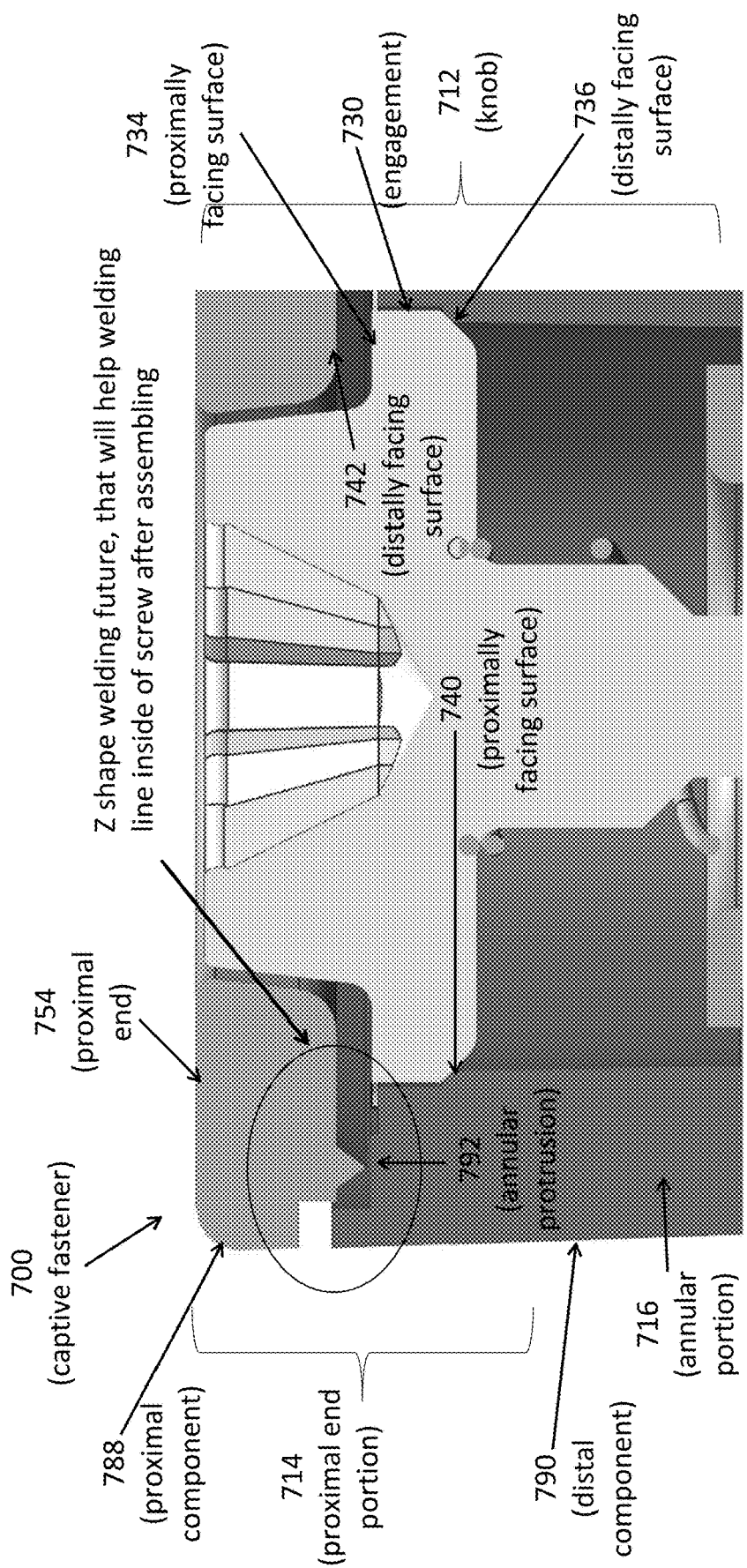
Figure 56D:
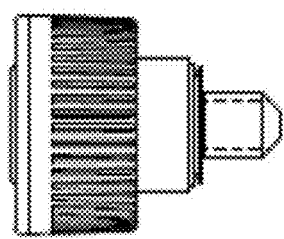
Figure 56C:
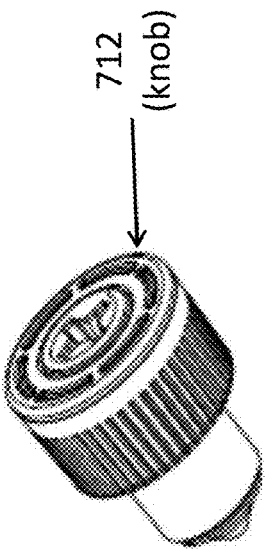
Figure 56B:
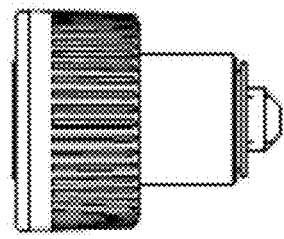
Figure 56A:
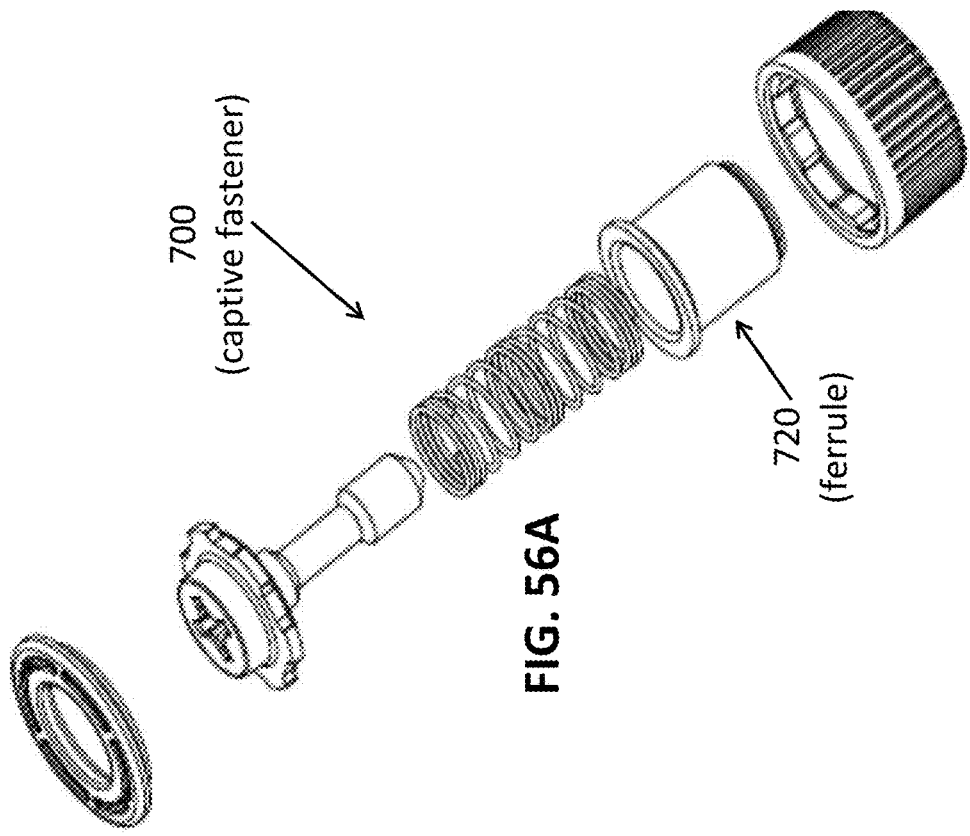

Referring specifically to particular figures illustrating the sixth embodiment and variations thereof, FIGS. 51A through 51C are top, side, and perspective views of a captive fastener according to a seventh embodiment of the invention. FIGS. 52A through 57D are views of the captive fastener shown in FIG. 51A, including components and variations of the captive fastener.

A method of assembling the captive fastener by mechanically engaging the proximal end portion 114, 214, 314, 414, of the knob 112, 212, 312, 412 to the head portion 104, 204, 304, 404 of the fastener 102, 202, 302, 402 will now be described.

The method includes moving at least one of the proximally facing surface 140, 240, 340, 440 of the knob 112, 212, 312, 412 and the distally facing surface 142, 242, 342, 442 of the knob 112, 212, 312, 412 radially outwardly relative to the fastener axis FA to the extended position, in which at least one of the proximally facing surface 140, 240, 340, 440 of the knob 112, 212, 312, 412 or the distally facing surface 142, 242, 342, 442 of the knob 112, 212, 312, 412 is disengaged from the head portion 104, 204, 304, 404 of the fastener 102, 202, 302, 402.

The method also includes inserting the head portion 104, 204, 304, 404 of the fastener 102, 202, 302, 402 into the proximal end portion 114, 214, 314, 414 of the knob 112, 212, 312, 412.

The method further includes returning the at least one of the proximally facing surface 140, 240, 340, 440 of the knob 112, 212, 312, 412 and the distally facing surface 142, 242, 342, 442 of the knob 112, 212, 312, 412 radially inwardly relative to the fastener axis FA from (1) the extended position, to (2) the engaging position, such that the proximally facing surface 140, 240, 340, 440 of the knob 112, 212, 312, 412 engages the distally facing surface 136, 236, 336, 436 of the head portion 104, 204, 304, 404 of the fastener 102, 202, 302, 402 and the distally facing surface 142, 242, 342, 442 of the knob 112, 212, 312, 412 engages the proximally facing surface 134, 234, 334, 434 of the head portion 104, 204, 304, 404 of the fastener 102, 202, 302, 402, thereby restricting movement of the head portion 104, 204, 304, 404 of the fastener 102, 202, 302, 402 relative to the knob 112, 212, 312, 412 along the fastener axis FA.

The method also includes abutting the transverse surface 138, 238, 338, 438 of the head portion 104, 204, 304, 404 of the fastener 102, 202, 302, 402 against the transverse surface 144, 244, 344, 444 of the knob 112, 212, 312, 412, thereby restricting rotational movement of the knob 112, 212, 312, 412 relative to the fastener 102, 202, 302, 402 about the fastener axis FA.

The method further includes positioning the spring 128, 228, 328, 428 to bias the knob 112, 212, 312, 412 or the fastener 102, 202, 302, 402 proximally and to inhibit tilting of the knob 112, 212, 312, 412 or the fastener 102, 202, 302, 402 relative to the fastener axis FA.

The method also includes associating the ferrule 120, 220, 320, 420 with the knob 112, 212, 312, 412 such that the opening defined in the ferrule 120, 220, 320, 420 extends along the fastener axis FA and receives the shaft of the fastener 102, 202, 302, 402, and such that the proximal end portion 124, 224, 324, 424 of the ferrule 120, 220, 320, 420 prevents separation of the knob 112, 212, 312, 412 from the ferrule 120, 220, 320, 420 along the fastener axis FA.

In a first embodiment of this method, the moving step includes moving a leg 146 defining the distally facing surface 142 of the knob 112 or the proximally facing surface 140 of the knob 112 radially outwardly to the extended position, thereby permitting insertion of the head portion 104 of the fastener 102 into the knob 112. Also, the returning step includes returning the leg 146 from the extended position to the engaging position, thereby resisting withdrawal of the head portion 104 of the fastener 102 from the knob 112.

The returning step includes snap-in engagement of the head portion 104 of the fastener 102 by the leg 146 of the knob 112 in the engaging position, thereby resisting withdrawal of the head portion 104 of the fastener 102 from the knob 112.

In a second embodiment of this method, the method further comprises mechanically coupling an outer component 262 of the knob 212 to an inner component 260 of the knob 212 or to the head portion 204 of the fastener 202, thereby preventing separation of the outer component 262 of the knob 212 from the inner component 260 of the knob 212 along the fastener axis FA.

The method also includes moving a facing surface 264 of the outer component 262 of the knob 212 radially outwardly to an extended position, thereby permitting insertion of the inner component 260 of the knob 212 into the outer component 262 of the knob 212, and from the extended position to an engaging position, thereby resisting withdrawal of the inner component 260 of the knob 212 from the outer component 262 of the knob 212.

In a third embodiment of the method, the inserting step including press inserting the head portion 304 of the fastener 302 into an annular groove 370, 370A defined in an inner wall 348 of the knob 312.

The press inserting of the inserting step includes inserting the head portion 304 of the fastener 302 through a tapered region 372, 372A of the inner wall 348 of the knob 312 adjacent the annular groove 370, 370A, thereby permitting pressed insertion of the head portion 304 of the fastener 302 into the annular groove 370, 370A defined in the inner wall 348 of the knob 312.

In a fourth embodiment of this method, the inserting step includes extending an inwardly extending protrusion 478 of the knob 412 into an annular groove 476, 476A of the head portion 404 of the fastener 402, thereby permitting pressed insertion of the head portion 404 of the fastener 402 into the inner wall 448 of the knob 412 and resisting withdrawal of the head portion 404 of the fastener 402 from the knob 412.

This embodiment of the method also includes extending an inwardly extending bump of the knob 412 into an axial groove 480 of the head portion 404 of the fastener 402, thereby restricting the rotational movement of the knob 412 relative to the fastener 402 about the fastener axis FA.

A method of assembling the captive fastener by deforming, such as by heat-stake assembly for example, the proximal end portion 514, 614, 714 of the knob 512, 612, 712 into the engagement with the head portion, 504, 604, 704 of the fastener 502, 602, 702 is also provided.

The method includes inserting the head portion 504, 604, 704 of the fastener 502, 602, 702 into the proximal end portion 514, 614, 714 of the knob 512, 612, 712.

The method includes deforming the engagement surface of the knob 512, 612, 712 radially inwardly relative to the fastener axis FA from (1) the extended position, in which the engagement surface of the knob 512, 612, 712 is disengaged from the head portion 504, 604, 704 of the fastener 502, 602, 702, to (2) the deformed position, in which the engagement surface of the knob 512, 612, 712 engages the head portion 504, 604, 704 of the fastener 502, 602, 702, such that the proximally facing surface 540, 640, 740 of the knob 512, 612, 712 engages the distally facing surface 536, 636, 736 of the head portion 504, 604, 704 of the fastener 502, 602, 702 and the engagement surface of the knob 512, 612, 712 engages the proximally facing surface 534, 634, 734 of the head portion 504, 604, 704 of the fastener 502, 602, 702, thereby restricting movement of the head portion 504, 604, 704 of the fastener 502, 602, 702 relative to the knob 512, 612, 712 along the fastener axis FA.

The method also includes abutting the transverse surface 538, 638, 738 of the head portion 504, 604, 704 of the fastener 502, 602, 702 against the transverse surface 544, 644, 744 of the knob 512, 612, 712, thereby restricting rotational movement of the knob 512, 612, 712 relative to the fastener 502, 602, 702 about the fastener axis FA.

The method of this embodiment further includes positioning the spring to bias the knob 512, 612, 712 or the fastener 502, 602, 702 proximally and to inhibit tilting of the knob 512, 612, 712 or the fastener 502, 602, 702 relative to the fastener axis FA.

The method also includes associating the ferrule 520, 620, 720 with the knob 512, 612, 712 such that the opening defined in the ferrule 520, 620, 720 extends along the fastener axis FA and receives the shaft of the fastener 502, 602, 702, and such that the proximal end portion 524, 624, 724 of the ferrule 520, 620, 720 prevents separation of the knob 512, 612, 712 from the ferrule 520, 620, 720 along the fastener axis FA.

According to the fifth embodiment, the method includes abutting the distally facing surface 542 of the engagement surface against the proximally facing surface 534 of the head portion 504 of the fastener 502, thereby restricting movement of the head portion 504 of the fastener 502 relative to the knob 512 along the fastener axis FA.

The method of this embodiment also includes abutting the proximally facing surface 540 of the inner wall 548 of the knob 512 against the distally facing surface 536 of the head portion 504 of the fastener 502, thereby restricting movement of the head portion 504 of the fastener 502 relative to the knob 512 along the fastener axis FA.

According to the sixth embodiment of this method, the deforming step includes deforming a proximal annular edge portion of the knob 612 defining the engagement surface radially inwardly to move the engagement surface from the extended position to the deformed position, thereby resisting withdrawal of the head portion 604 of the fastener 602 from the knob 612.

Method can further include abutting the proximal annular edge portion 686 of the knob 612 against the proximally facing surface 634 of the head portion 604 of the fastener 602, and abutting the proximally facing surface 640 of the inner wall 648 of the knob 612 against the distally facing surface 636 of the head of the fastener 602, thereby restricting movement of the head portion 604 of the fastener 602 relative to the knob 612 along the fastener axis FA.

According to the seventh embodiment of the method, the method includes heat bonding a proximal component 788 of the knob 712 to a distal component 790 of the knob 712, thereby resisting separation of the proximal portion of the knob 712 from the distal component of the knob 712 and withdrawal of the head portion 704 of the fastener 702 from the knob 712.

In this embodiment, the method further comprises deforming an annular protrusion of the proximal component of the knob 712 as the engagement surface of the proximal component of the knob 712 is moved from the extended position to the deformed position.

Generally, a method of assembling the captive fastener along the insertion direction and the fastener axis is provided. The method includes providing the fastener, the knob, the spring and the ferrule as separate components; positioning the proximal end portion of the ferrule to extend within the knob in the insertion direction and along the fastener axis; inserting the spring within the knob in the insertion direction and along the fastener axis; inserting the head portion of the fastener within the knob for engagement to the knob in the insertion direction and along the fastener axis; and engaging the proximal portion of the knob and the head portion of the fastener to resist axial movement of the knob relative to the fastener along the fastener axis, rotational movement of the knob relative to the fastener about the fastener axis, and pivotal movement of the knob relative to the fastener axis; wherein the insertion direction of the ferrule, the insertion direction of the spring, and the insertion direction of the head portion of the fastener are the same insertion direction.

The insertion direction can be a distal direction. Also, the method can also include deforming the distal end portion of the ferrule from a retracted condition in which the distal end portion of the ferrule is sized to extend through the knob and an extended condition in which the distal end portion of the ferrule is enlarged and configured for the engagement to the panel. Also, the engaging step can include snap-in engagement of the proximal portion of the knob and the head portion of the fastener. Further, the engaging step can be completed without permanently deforming the knob.

Advantages associated with embodiments of this invention include one or more of the following benefits: lower manufacturing or assembly cost, reduced tilting of fastener or screw heads relative to the fastener axis, the ability to use an injection molded knob component, the availability of snap-in assembly processes, the availability of hot-staking assembly processes, and/or the ability to use existing stamped ferrule configurations. Other advantages will be understood by those of skill in the field of fastener technologies.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A captive fastener attachable to a panel along a fastener axis, the captive fastener comprising:
   a fastener having a head portion at a proximal end of the fastener and a shaft extending from the head portion and along the fastener axis to a distal end portion of the fastener;
   a knob formed separately from the fastener and assembled to the fastener, the knob having a proximal end portion engaged to the head portion of the fastener and an annular portion extending radially around the fastener axis and the shaft of the fastener and distally from the head portion of the fastener to a distal end portion of the knob, the knob further comprising a proximal component and a distal component, the proximal component of the knob being heat bonded to the distal component of the knob, thereby resisting separation of the proximal component of the knob from the distal component of the knob and withdrawal of the head portion of the fastener from the knob;
   a ferrule associated with the knob, the ferrule defining an opening extending along the fastener axis and receiving the shaft of the fastener, the ferrule having a proximal end portion configured to prevent separation of the knob from the ferrule along the fastener axis and a distal end portion configured for engagement to the panel; and
   a spring positioned to bias the knob or the fastener proximally relative to the ferrule and to inhibit tilting of the knob or the fastener relative to the fastener axis;
   the proximal end portion of the ferrule having been positioned to be associated with the knob in an insertion direction along the fastener axis;
   the head portion of the fastener having been inserted within the knob for engagement to the knob in the insertion direction; and
   the engagement between the proximal portion of the knob and the head portion of the fastener being configured to resist axial movement of the knob relative to the fastener along the fastener axis, rotational movement of the knob relative to the fastener about the fastener axis, and pivotal movement of the knob relative to the fastener axis.

2. The captive fastener of claim 1, the fastener being metallic.

3. The captive fastener of claim 1, the knob being non-metallic.

4. The captive fastener of claim 1, the proximal end portion of the ferrule and the head portion of the fastener having been inserted within the knob in the insertion direction, the insertion direction being a distal direction from the proximal end portion of the knob along the fastener axis.

5. The captive fastener of claim 1, the proximal end portion of the ferrule and the head portion of the fastener having been inserted within the knob in the insertion direction, the insertion direction being a proximal direction from the distal end portion of the knob along the fastener axis.

6. The captive fastener of claim 1, the proximal end portion of the ferrule including a radial extension extending radially outwardly relative to the fastener axis for engagement with the knob to prevent the separation of the knob from the ferrule.

7. The captive fastener of claim 6, the radial extension of the proximal end portion of the ferrule being deformed from
   an extended position, in which the proximal end portion of the ferrule is insertable within the knob, thereby permitting movement of the proximal end portion of the ferrule into the knob in the insertion direction along the fastener axis, to
   an engaging position, in which the proximal end portion of the ferrule cannot be removed from within the knob in a direction opposite the insertion direction, thereby preventing the separation of the knob from the ferrule along the fastener axis.

8. The captive fastener of claim 1, the proximal end portion of the knob being mechanically engaged to the head portion of the fastener, wherein:
   the head portion of the fastener has a proximally facing surface facing toward the proximal end of the fastener, a distally facing surface facing toward the distal end portion of the fastener, and a transverse surface extending transverse to the proximally facing surface and the distally facing surface of the head portion of the fastener;
   the knob has a proximally facing surface facing toward a proximal end of the knob, a distally facing surface facing toward a distal end of the knob, and a transverse surface extending transverse to the proximally facing surface and the distally facing surface of the knob;
   at least one of the proximally facing surface of the knob and the distally facing surface of the knob being movable radially relative to the fastener axis between
      an engaging position, in which the proximally facing surface of the knob engages the distally facing surface of the head portion of the fastener and the distally facing surface of the knob engages the proximally facing surface of the head portion of the fastener, thereby restricting movement of the head portion of the fastener relative to the knob along the fastener axis, and an extended position, in which at least one of the proximally facing surface of the knob or the distally facing surface of the knob is disengaged from the head portion of the fastener, thereby permitting movement of the head portion of the fastener relative to the knob along the fastener axis; and the transverse surface of the head portion of the fastener abuts the transverse surface of the knob, thereby restricting rotational movement of the knob relative to the fastener about the fastener axis.

9. The captive fastener of claim 8, the knob comprising a leg defining the distally facing surface of the knob or the proximally facing surface of the knob, the leg of the knob being moveable radially outwardly to move the distally facing surface of the knob or the proximally facing surface of the knob from the engaging position to the extended position, thereby permitting insertion of the head portion of the fastener into the knob, and from the extended position to the engaging position, thereby resisting withdrawal of the head portion of the fastener from the knob.

10. The captive fastener of claim 9, the knob comprising an inner wall defining the proximally facing surface of the knob or the distally facing surface of the knob, thereby restricting movement of the head of the fastener relative to the knob along the fastener axis.

11. The captive fastener of claim 10, the leg of the knob defining the distally facing surface of the knob, the inner wall of the knob defining the proximally facing surface of the knob, the distally facing surface of the leg of the knob abutting the proximally facing surface of the head portion of the fastener, and the proximally facing surface of the inner wall of the knob abutting the distally facing surface of the head of the fastener.

12. The captive fastener of claim 9, the knob comprising two or more legs, at least one of the legs defining the transverse surface of the knob.

13. The captive fastener of claim 12, the legs being separated by a gap.

14. The captive fastener of claim 13, the transverse surface of the head portion of the fastener extending into the gap and the transverse surface of the head portion of the fastener abuts the transverse surface of the leg of the knob, thereby restricting rotational movement of the knob relative to the fastener about the fastener axis.

15. The captive fastener of claim 9, the knob being configured for snap-in engagement of the head portion of the fastener by the leg of the knob in the engaging position, thereby resisting withdrawal of the head portion of the fastener from the knob.

16. The captive fastener of claim 15, the leg of the knob further defining a ramped surface tapering from a radially outward portion of the leg to a radially inward portion of the leg, the ramped surface of the leg of the knob being positioned to facilitate the movement of the leg of the knob radially outwardly during the insertion of the head portion of the fastener into the knob.

17. The captive fastener of claim 16, the ramped surface of the leg of the knob facing a proximal end of the knob, the proximal end portion of the ferrule and the head portion of the fastener having been inserted within the knob in the insertion direction, the insertion direction being a distal direction from the proximal end portion of the knob along the fastener axis.

18. The captive fastener of claim 9, the knob further comprising an annular wall positioned radially outwardly from the leg of the knob and at least partially enclosing the leg of the knob, the annular wall defining a radially outwardly facing surface positioned for gripping the knob.

19. The captive fastener of claim 8, the knob comprising an inner component and an outer component fixed to the inner component, the inner component of the knob defining at least one of the distally facing surface of the knob or the proximally facing surface of the knob, and the outer component of the knob defining a radially outwardly facing surface positioned for gripping the knob.

20. The captive fastener of claim 19, the inner component of knob including a leg defining the distally facing surface of the knob or the proximally facing surface of the knob, the leg of the inner component of the knob being moveable radially outwardly to move the distally facing surface of the knob or the proximally facing surface of the knob from the engaging position to the extended position, thereby permitting insertion of the head portion of the fastener into the knob, and from the extended position to the engaging position, thereby resisting withdrawal of the head portion of the fastener from the knob.

21. The captive fastener of claim 19, the inner component of the knob comprising an inner wall defining the proximally facing surface of the knob or the distally facing surface of the knob, thereby restricting movement of the head of the fastener relative to the knob along the fastener axis.

22. The captive fastener of claim 19, the outer component of the knob having a facing surface positioned for mechanical coupling of the outer component of the knob to the inner component of the knob or to the head portion of the fastener, thereby preventing separation of the outer component of the knob from the inner component of the knob along the fastener axis.

23. The captive fastener of claim 22, the facing surface of the outer component of the knob being a distally facing surface positioned to contact the proximally facing surface of the head portion of the fastener.

24. The captive fastener of claim 22, the facing surface of the outer component of the knob being a proximally facing surface positioned to contact a distal end portion of the inner component of the knob.

25. The captive fastener of claim 24, the facing surface of the outer component of the knob being moveable radially outwardly from an engaging position to contact the distal end portion of the inner component of the knob to an extended position, thereby permitting insertion of the inner component of the knob into the outer component of the knob, and from the extended position to the engaging position, thereby resisting withdrawal of the inner component of the knob from the outer component of the knob.

26. The captive fastener of claim 25, the knob being configured for snap-in engagement of the inner component of the knob in the outer component of the knob with the facing surface of the outer component of the knob in the engaging position, thereby resisting withdrawal of the inner component of the knob from the outer component of the knob.

27. The captive fastener of claim 19, the outer component of the knob having a transverse surface positioned for contact with the inner component of the knob or the head portion of the fastener, thereby preventing rotation of the outer component of the knob relative to the inner component of the knob about the fastener axis.

28. The captive fastener of claim 8, the knob comprising an inner wall defining an annular groove sized to accommodate the head portion of the fastener and defining the distally facing surface of the knob and the proximally facing surface of the knob, thereby resisting withdrawal of the head portion of the fastener from the knob upon insertion of the head portion of the fastener into the annular groove defined in the inner wall of the knob.

29. The captive fastener of claim 28, the annular groove defined in the inner wall of the knob being a continuous groove such that at least one of the distally facing surface of the knob and the proximally facing surface of the knob is a continuous surface.

30. The captive fastener of claim 28, the inner wall of the knob further defining a tapered region adjacent the annular groove and tapering from a larger portion sized to accommodate the head portion of the fastener to a smaller portion sized to resist passage of the head portion of the fastener, thereby permitting a pressed insertion of the head portion of the fastener into the annular groove defined in the inner wall of the knob.

31. The captive fastener of claim 30, the smaller portion of the tapered region of the inner wall of the knob defining gaps extending into the annular groove, thereby facilitating the pressed insertion of the head portion of the fastener into the annular groove defined in the inner wall of the knob.

32. The captive fastener of claim 30, the tapered region defined in the inner wall of the knob being positioned adjacent the proximally facing surface defined by the annular groove of the knob, thereby permitting the pressed insertion of the head portion of the fastener into the annular groove defined in the inner wall of the knob in the insertion direction, the insertion direction being a proximal direction from the distal end portion of the knob along the fastener axis.

33. The captive fastener of claim 28, a perimeter edge of the head portion of the fastener defining the transverse surface of the head portion of the fastener, the transverse surface of the knob being formed within the annular groove defined in the inner wall of the knob upon the insertion of the head portion of the fastener into the annular groove.

34. The captive fastener of claim 8, the head portion of the fastener defining an annular groove providing the proximally facing surface and the distally facing surface of the head portion of the fastener, the knob comprising an inner wall having an inwardly extending protrusion providing the proximally facing surface of the knob and the distally facing surface of the knob, the inwardly extending protrusion of the knob being positioned to extend into the annular groove of the head portion of the fastener, thereby permitting a pressed insertion of the head portion of the fastener within the inner wall of the knob and resisting withdrawal of the head portion of the fastener from the knob.

35. The captive fastener of claim 34, the annular groove defined in the head portion of the fastener being a continuous groove.

36. The captive fastener of claim 34, the head portion of the fastener further defining at least one axial groove providing the transverse surface of the fastener, the knob further comprising an inwardly extending bump providing the transverse surface of the knob, the inwardly extending bump of the knob being positioned to extend into the axial groove of the head portion of the fastener, thereby restricting the rotational movement of the knob relative to the fastener about the fastener axis.

37. A method of assembling the captive fastener of claim 8 by mechanically engaging the proximal end portion of the knob to the head portion of the fastener, the method comprising:

moving at least one of the proximally facing surface of the knob and the distally facing surface of the knob radially outwardly relative to the fastener axis to the extended position, in which at least one of the proximally facing surface of the knob or the distally facing surface of the knob is disengaged from the head portion of the fastener;

inserting the head portion of the fastener into the proximal end portion of the knob;

returning the at least one of the proximally facing surface of the knob and the distally facing surface of the knob radially inwardly relative to the fastener axis from the extended position, to the engaging position, such that the proximally facing surface of the knob engages the distally facing surface of the head portion of the fastener and the distally facing surface of the knob engages the proximally facing surface of the head portion of the fastener, thereby restricting movement of the head portion of the fastener relative to the knob along the fastener axis;

abutting the transverse surface of the head portion of the fastener against the transverse surface of the knob, thereby restricting rotational movement of the knob relative to the fastener about the fastener axis;

positioning the spring to bias the knob or the fastener proximally and to inhibit tilting of the knob or the fastener relative to the fastener axis; and associating the ferrule with the knob such that the opening defined in the ferrule extends along the fastener axis and receives the shaft of the fastener, and such that the proximal end portion of the ferrule prevents separation of the knob from the ferrule along the fastener axis.

38. The method of claim 37, the moving step comprising moving a leg defining the distally facing surface of the knob or the proximally facing surface of the knob radially outwardly to the extended position, thereby permitting insertion of the head portion of the fastener into the knob, and the returning step comprising returning the leg from the extended position to the engaging position, thereby resisting withdrawal of the head portion of the fastener from the knob.

39. The method of claim 38, the returning step comprising snap-in engagement of the head portion of the fastener by the leg of the knob in the engaging position, thereby resisting withdrawal of the head portion of the fastener from the knob.

40. The method of claim 37, further comprising mechanically coupling an outer component of the knob to an inner component of the knob or to the head portion of the fastener, thereby preventing separation of the outer component of the knob from the inner component of the knob along the fastener axis.

41. The method of claim 40, further comprising moving a facing surface of the outer component of the knob radially outwardly to an extended position, thereby permitting insertion of the inner component of the knob into the outer component of the knob, and from the extended position to an engaging position, thereby resisting withdrawal of the inner component of the knob from the outer component of the knob.

42. The method of claim 37, the inserting step including press inserting the head portion of the fastener into an annular groove defined in an inner wall of the knob.

43. The method of claim 42, the press inserting of the inserting step including inserting the head portion of the fastener through a tapered region of the inner wall of the knob adjacent the annular groove, thereby permitting pressed insertion of the head portion of the fastener into the annular groove defined in the inner wall of the knob.

44. The method of claim 37, the inserting step including extending an inwardly extending protrusion of the knob into an annular groove of the head portion of the fastener, thereby permitting pressed insertion of the head portion of the fastener into the inner wall of the knob and resisting withdrawal of the head portion of the fastener from the knob.

45. The method of claim 44, further comprising extending an inwardly extending bump of the knob into an axial groove of the head portion of the fastener, thereby restricting the rotational movement of the knob relative to the fastener about the fastener axis.

46. The captive fastener of claim 1, the proximal end portion of the knob being deformed into the engagement with the head portion of the fastener, wherein:
the head portion of the fastener has a proximally facing surface facing toward the proximal end of the fastener, a distally facing surface facing toward the distal end portion of the fastener, and a transverse surface extending transverse to the proximally facing surface of the head portion of the fastener and the distally facing surface of the head portion of the fastener;
the knob has an engagement surface and a transverse surface extending transverse to the engagement surface of the knob, the engagement surface of the knob being deformable from
an extended position, in which the engagement surface of the knob is disengaged from the head portion of the fastener, thereby permitting movement of the head portion of the fastener relative to the knob along the fastener axis; and
a deformed position, radially inward from the extended position, in which the engagement surface of the knob engages the head portion of the fastener, thereby restricting movement of the head portion of the fastener relative to the knob along the fastener axis, and
the transverse surface of the head portion of the fastener abuts the transverse surface of the knob, thereby restricting rotation of the knob relative to the fastener about the fastener axis.

47. The captive fastener of claim 46, the knob comprising a leg defining the engagement surface, the leg of the knob being deformable radially inwardly relative to the fastener axis to move the engagement surface of the knob from the extended position to the deformed position, thereby resisting withdrawal of the head portion of the fastener from the knob.

48. The captive fastener of claim 47, the knob comprising an inner wall defining the proximally facing surface, the engagement surface of the leg of the knob providing the distally facing surface of the knob, the distally facing surface of the engagement surface of the knob abutting the proximally facing surface of the head portion of the fastener, and the proximally facing surface of the inner wall of the knob abutting the distally facing surface of the head portion of the fastener, thereby restricting movement of the head portion of the fastener relative to the knob along the fastener axis.

49. The captive fastener of claim 47, a perimeter edge of the head portion of the fastener defining the transverse surface of the head portion of the fastener, the transverse surface of the knob being provided by a recess defined in an inner wall of the knob, the transverse surface of the head portion of the fastener extending into the recess defined in the inner wall of the knob, and the transverse surface of the head portion of the fastener abuts the transverse surface of the knob, thereby restricting rotational movement of the knob relative to the fastener about the fastener axis.

50. The captive fastener of claim 46, the knob comprising a proximal annular edge portion defining the engagement surface, the proximal annular edge portion of the knob being deformable radially inwardly to deform the engagement surface from the extended position to the deformed position, thereby resisting withdrawal of the head portion of the fastener from the knob.

51. The captive fastener of claim 50, the knob comprising an inner wall defining the proximally facing surface, the engagement surface of the proximal annular edge portion of the knob abutting the proximally facing surface of the head portion of the fastener, and the proximally facing surface of the inner wall of the knob abutting the distally facing surface of the head of the fastener, thereby restricting movement of the head portion of the fastener relative to the knob along the fastener axis.

52. The captive fastener of claim 50, the knob having an inner wall defining the proximally facing surface, the engagement surface of the proximal annular edge portion of the knob providing the distally facing surface of the knob, the distally facing surface of the engagement surface abutting the proximally facing surface of the head portion of the fastener, and the proximally facing surface of the inner wall of the knob abutting the distally facing surface of the head portion of the fastener, thereby restricting movement of the head portion of the fastener relative to the knob along the fastener axis.

53. The captive fastener of claim 50, the proximally facing surface of the head portion of the fastener provides the transverse surface of the head portion of the fastener, and the engagement surface of the proximal annular edge portion of the knob is deformed to provide the transverse surface of the knob, the transverse surface of the knob being formed on the engagement surface of the knob upon deforming the engagement surface from the extended position to the deformed position, thereby restricting rotation of the knob relative to the fastener about the fastener axis.

54. The captive fastener of claim 46, the proximal component defining the engagement surface of the knob and the distal component defining the transverse surface of the knob.

55. The captive fastener of claim 54, the proximal component of the knob having an annular protrusion extending along the fastener axis, the annular protrusion being deformed as the engagement surface of the proximal component of the knob is deformed from the extended position to the deformed position.

56. The captive fastener of claim 54, the distal component of the knob having an inner wall defining the proximally facing surface, the engagement surface of the proximal component of the knob providing the distally facing surface of the knob, the distally facing surface of the engagement surface abutting the proximally facing surface of the head portion of the fastener, and the proximally facing surface of the inner wall of the knob abutting the distally facing surface of the head portion of the fastener, thereby restricting movement of the head portion of the fastener relative to the knob along the fastener axis.

57. The captive fastener of claim 54, a perimeter edge of the head portion of the fastener defining the transverse surface of the head portion of the fastener, the transverse surface of the knob being provided by a recess defined in an inner wall of the knob, the transverse surface of the head portion of the fastener extending into the recess defined in the inner wall of the knob, and the transverse surface of the head portion of the fastener abuts the transverse surface of the knob, thereby restricting rotational movement of the knob relative to the fastener about the fastener axis.

58. A method of assembling the captive fastener of claim 46 by deforming the proximal end portion of the knob into the engagement with the head portion of the fastener, the method comprising:
    inserting the head portion of the fastener into the proximal end portion of the knob;
    deforming the engagement surface of the knob radially inwardly relative to the fastener axis from
        the extended position, in which the engagement surface of the knob is disengaged from the head portion of the fastener, to
        the deformed position, in which the engagement surface of the knob engages the head portion of the fastener, such that the proximally facing surface of the knob engages the distally facing surface of the head portion of the fastener and the engagement surface of the knob engages the proximally facing surface of the head portion of the fastener, thereby restricting movement of the head portion of the fastener relative to the knob along the fastener axis;
    abutting the transverse surface of the head portion of the fastener against the transverse surface of the knob, thereby restricting rotational movement of the knob relative to the fastener about the fastener axis;
    positioning the spring to bias the knob or the fastener proximally and to inhibit tilting of the knob or the fastener relative to the fastener axis; and
    associating the ferrule with the knob such that the opening defined in the is ferrule extends along the fastener axis and receives the shaft of the fastener, and such that the proximal end portion of the ferrule prevents separation of the knob from the ferrule along the fastener axis.

59. The method of claim 58, further comprising abutting the distally facing surface of the engagement surface against the proximally facing surface of the head portion of the fastener, thereby restricting movement of the head portion of the fastener relative to the knob along the fastener axis.

60. The method of claim 59, further comprising abutting the proximally facing surface of the inner wall of the knob against the distally facing surface of the head portion of the fastener, thereby restricting movement of the head portion of the fastener relative to the knob along the fastener axis.

61. The method of claim 58, the deforming step including deforming a proximal annular edge portion of the knob defining the engagement surface radially inwardly to move the engagement surface from the extended position to the deformed position, thereby resisting withdrawal of the head portion of the fastener from the knob.

62. The method of claim 61, further comprising abutting the proximal annular edge portion of the knob against the proximally facing surface of the head portion of the fastener, and abutting the proximally facing surface of the inner wall of the knob against the distally facing surface of the head of the fastener, thereby restricting movement of the head portion of the fastener relative to the knob along the fastener axis.

63. The method of claim 58, further comprising heat bonding a proximal component of the knob to a distal component of the knob, thereby resisting separation of the proximal portion of the knob from the distal component of the knob and withdrawal of the head portion of the fastener from the knob.

64. The method of claim 63, further comprising deforming an annular protrusion of the proximal component of the knob as the engagement surface of the proximal component of the knob is moved from the extended position to the deformed position.

65. A method of assembling the captive fastener of claim 1 along the insertion direction and the fastener axis, the method comprising:
    providing the fastener, the knob, the spring and the ferrule as separate components;
    positioning the proximal end portion of the ferrule to extend within the knob in the insertion direction and along the fastener axis;
    inserting the spring within the knob in the insertion direction and along the fastener axis;
    inserting the head portion of the fastener within the knob for engagement to the knob in the insertion direction and along the fastener axis; and
    engaging the proximal portion of the knob and the head portion of the fastener to resist axial movement of the knob relative to the fastener along the fastener axis, rotational movement of the knob relative to the fastener about the fastener axis, and pivotal movement of the knob relative to the fastener axis;
    wherein the insertion direction of the ferrule, the insertion direction of the spring, and the insertion direction of the head portion of the fastener are the same insertion direction.

66. The method of claim 65, the insertion direction being a distal direction.

67. The method of claim 65, further comprising deforming the distal end portion of the ferrule from a retracted condition in which the distal end portion of the ferrule is sized to extend through the knob and an extended condition in which the distal end portion of the ferrule is enlarged and configured for the engagement to the panel.

68. The method of claim 65, the engaging step comprising snap-in engagement of the proximal portion of the knob and the head portion of the fastener.

69. The method of claim 68, the engaging step being completed without permanently deforming the knob.

70. The captive fastener of claim 1, the proximal component of the knob being heat bonded to the distal component of the knob by thermal bonding, melt bonding, ultrasonic bonding, welding, or sonic welding.

71. The captive fastener of claim 70, the proximal component of the knob being heat bonded to the distal component of the knob by ultrasonic welding.

* * * * *

UNITED STATES PATENT AND TRADEMARK OFFICE
CERTIFICATE OF CORRECTION

| | |
|---|---|
| PATENT NO. | : 12,203,500 B2 |
| APPLICATION NO. | : 17/917809 |
| DATED | : January 21, 2025 |
| INVENTOR(S) | : Jingyao Peng et al. |

It is certified that error appears in the above-identified patent and that said Letters Patent is hereby corrected as shown below:

In the Claims

In Column 31, Line 29 in Claim 58 the phrase "the is" should read -- the --.

Signed and Sealed this
Eighteenth Day of March, 2025

Coke Morgan Stewart
*Acting Director of the United States Patent and Trademark Office*